United States Patent
Benyukhis

(10) Patent No.: US 6,268,571 B1
(45) Date of Patent: Jul. 31, 2001

(54) COUNTING AND COMBINATORIAL WEIGHING METHOD AND APPARATUS

(76) Inventor: David Benyukhis, 1234 St. John's Pl., Brooklyn, NY (US) 11213

( * ) Notice: Subject to any disclaimer, the term of this patent is extended or adjusted under 35 U.S.C. 154(b) by 0 days.

(21) Appl. No.: 09/602,121

(22) Filed: Jun. 23, 2000

(51) Int. Cl.[7] .................................................. G01G 19/32
(52) U.S. Cl. ........................................................ 177/25.18
(58) Field of Search ................................ 177/25.18, 116, 177/119, 154, 155, 156

(56) References Cited

U.S. PATENT DOCUMENTS

| | | | |
|---|---|---|---|
| 3,707,172 | * 12/1972 | Obara | 177/160 |
| 4,094,368 | 6/1978 | Sann et al. | 177/128 |
| 4,549,617 | 10/1985 | Matsumoto et al. | 177/1 |
| 4,618,013 | * 10/1986 | Yamano et al. | 177/25.18 |
| 4,661,917 | * 4/1987 | Haze et al. | 177/25.18 |
| 4,678,046 | 7/1987 | Mosher | 177/1 |
| 4,765,423 | * 8/1988 | Karpa | 177/154 |
| 4,812,701 | * 3/1989 | Izumi | 177/25.18 |
| 4,813,503 | * 3/1989 | Douglas et al. | 177/25.18 |
| 4,828,054 | * 5/1989 | Mosher | 177/25.18 |
| 5,035,294 | 7/1991 | Volk, Jr. | 177/70 |
| 5,466,894 | * 11/1995 | Naef | 177/59 |
| 5,621,194 | * 4/1997 | Koyama et al. | 177/25.18 |
| 5,736,683 | 4/1998 | Howard | 177/25.18 |
| 5,779,541 | * 7/1998 | Helfrich | 177/116 |
| 5,894,111 | * 4/1999 | Kawanishi | 177/25.18 |
| 6,060,667 | * 5/2000 | Pollock | 177/121 |

* cited by examiner

Primary Examiner—Randy W. Gibson

(57) ABSTRACT

A counting and combinatorial weighing method for obtaining a collected batch of ingredients of a plurality of types, having a predetermined fractional weight. The method provides a plurality of weighing machines, each of them is for one corresponding group of different ingredients including at least one main ingredient and a plurality of incorporated ingredients. The method comprises the steps of modeling a weighing system, simultaneous weighing according to target weight values the n equal partial batches of the main ingredient within all the n associated weighing scale modules of each weighing machine. The partial batches are discharged into a discharging device, and the total weight is counted. These weighing and counting steps are repeated in succession up to k times, thus the total weight being less than the predetermined fractional weight is obtained. Further batches of at least the n different incorporated ingredients within each of the weighing machines are weighed and discharged to the discharging device and all these total weights obtained are counted. Then n combinatorial partial batches of each main ingredient are weighed in a final combinatorial weighing step according to a counted combinatorial partial batch target weight. When no the best combination is found for the certain type of main ingredients, the single combinatorial partial batch is discharged from the weighing scale module assigned to weigh a correctional partial batch, which is then counted, weighed, and discharged. Related methods contemplate to weigh and discharge the partial batches of at least one incorporated ingredient in an iterative manner alternately with the partial batches of the main ingredient. Each weighing scale module is assembled with at least one common main ingredient feeder and at least one different incorporated ingredient feeder. At least one weighing scale module, assigned to weigh a correctional partial batch, is assembled additionally with a complementary correctional feeder.

23 Claims, 20 Drawing Sheets

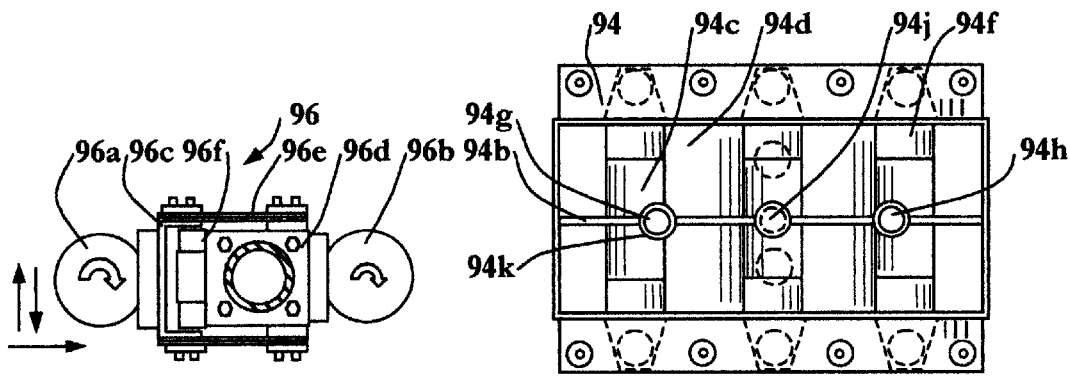
*FIG. 15*  *FIG. 14*
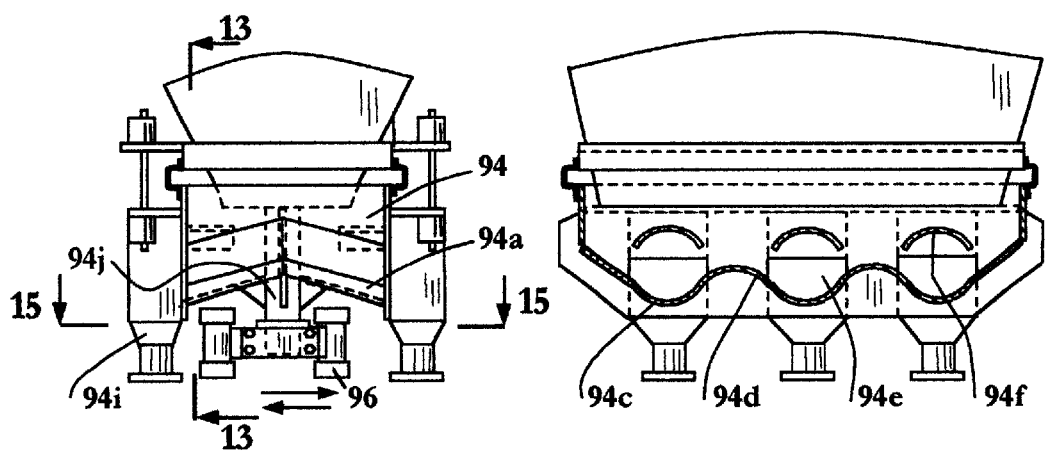
*FIG. 12*  *FIG. 13*

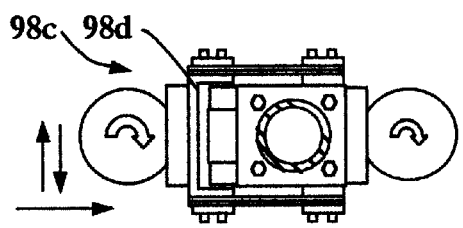
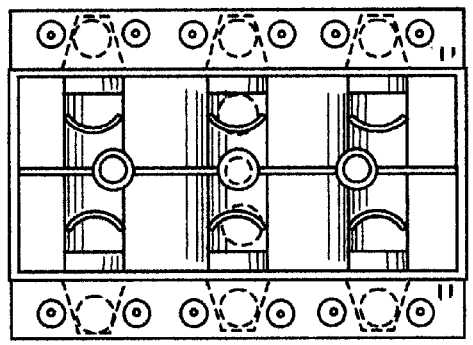
*FIG. 15a*         *FIG. 14a*
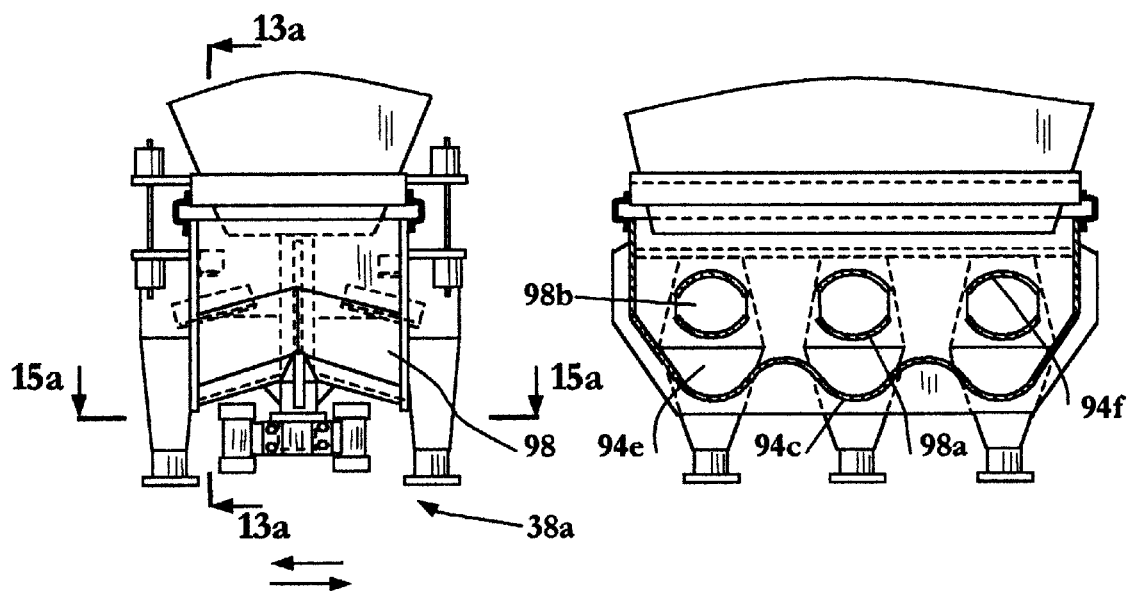
*FIG. 12a*         *FIG. 13a*

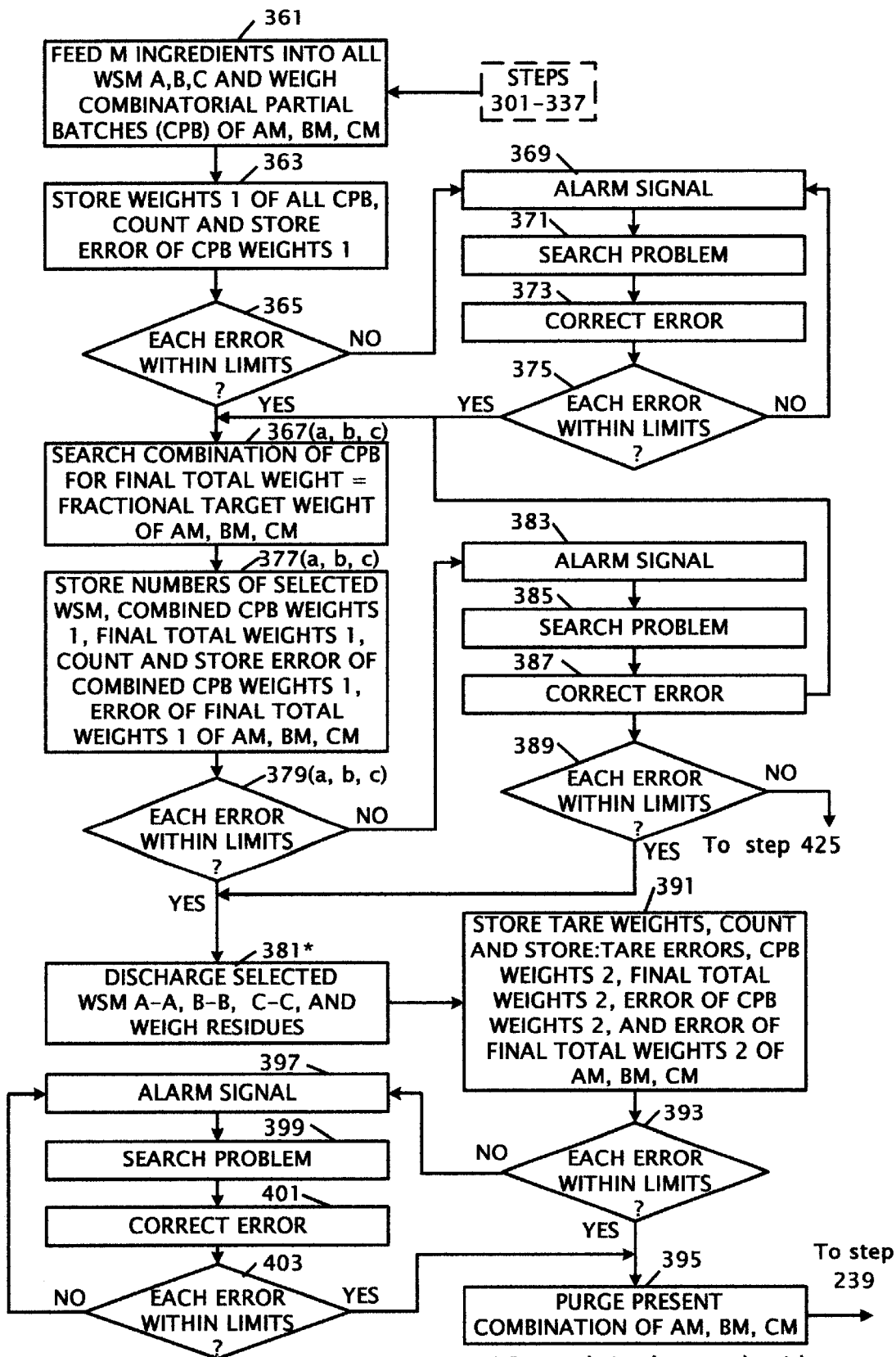
FIG. 17d  * Proceed simultaneously with step 447, if the last is executed as well.

COUNTING AND COMBINATORIAL WEIGHING METHOD AND APPARATUS

BACKGROUND OF THE INVENTION

The present invention relates to weighing methods and systems for a collected batch of a plurality of solid, flowing ingredients, and more particularly, to a computerized high accuracy industrial weighing system incorporating a plurality of weighing machines for weighing and transferring the ingredients batches in an efficient manner into a mixer.

A common method of weighing collected batch of a plurality of ingredients, known in the art of industrial weighing technology, includes the steps of alternate, in succession, weighing each of a plurality of ingredients within a single weighing hopper. The collected batch is weighed according to a target weight value set for each type of ingredients then discharged for transferring into a mixer.

A batch weighing device, well known in the prior art, generally includes a plurality of separate storage hoppers or bins. Each storage hopper is provided with a screw auger or the like for conveying the desired amount of each individual ingredient into a common weighing hopper to create a batch of selected amounts of selected ingredients. A weighing hopper is generally supported by three or four load cells so that its weight may be accurately monitored, and the cumulative weight of a mixture determines the amount of each ingredient to be added to the hopper. The great advantage of this method is the simplicity of the related weighing system. There is only one feeder for each ingredient and one weighing hopper for a plurality of ingredients. The adverse effect on the overall economy of this method is that a smaller quantity of ingredient being measured, the lesser accurate measurement is made. Thus, if the collected batch includes ingredients of the relatively large and the relatively small weight, a measuring error of small weight ingredients would be out of the normal tolerance limits.

Another well known in the art weighing system is so called the loss-in-weight system. The related method includes the steps of weighing each ingredient within a single weighing hopper, and a plurality of ingredients within a plurality of associated weighing hoppers. The collected batch is weighed according to target weight value set for each type of ingredients then discharged by discharging feeders associated with weighing hoppers for transferring into the mixer. First advantage of this system is its simplicity. There is one weighing hopper with one discharging feeder for each ingredient. Second advantage is alleviating the problems of ingredient sticking and late ingredient in flight. For example, the weighing system described and claimed in U.S. Pat. No. 5,035,294 entitled "In place bin weighing device for batch weigher" to Volk, Jr. (1991) intended advantageously to add some new feature to the known weighing system as using a single load cell with the supporting flexures to accurately weigh a bin (weighing hopper). Some disadvantages of this system are the substantial reduction in the net weighing range, causing by a relatively heavy discharging feeder associated with a weighing hopper, and the decrease in weighing accuracy. Particularly, some additional disadvantages of the weighing system described and claimed in U.S. Pat. No. 5,035,294 are the deficiency of overload preventive ability, difficulties to detach the load cell when necessary to change the last. Additionally, there is some lack of a framework to serve the upper part of bins or detach the bin.

In the weighing system described and claimed in U.S. Pat. No. 4,094,368 entitled "Load cell overload protection system for weighing scales" to Sann et al. (1978) most disadvantages of the weighing system described and claimed in U.S. Pat. No. 5,035,294 are eliminated, but still there is necessary to simplify a force-transmitting system, to integrate a load receiving structure within a self-sufficient weighing scale unit forming an entire functionally and metrologically accomplished and transportable weighing scale module.

Over the past three decades, many advances have been made in improving the efficiency of described above common methods and systems due to the computer control techniques. However, high weighing accuracy is not achieved at weighing a collected batch of a plurality of different ingredients including ingredients of the relatively large and relatively small weight, hygroscopic, adhesive, and fluid ingredients.

Actually, the most advanced weighing methods and systems are known in the technology of computerized combinatorial weighing. The advantage of combinatorial weighing is the increase in a speed. However, the greatest advantage of combinatorial weighing is the substantial increase in weighing accuracy because of peculiar to combinatorial weighing an averaging mechanism, which exactly responds to probabilistic nature of weighing errors. The methods and systems of combinatorial weighing can be applied to industrial weighing of the collected batch of different ingredients. Particularly, for the ingredients of the wide range of the weights and properties these methods alleviate the problems of ingredient sticking and the late ingredient in flight and eliminate an influence of a low resolution at weight measuring.

However, major obstacles for using combinatorial weighing are an enormous number of feeder and weighing hopper units per each ingredient and the relatively small capacity of weighing hoppers. In fact, the combinatorial system described and claimed in U.S. Pat. No. 5,736,683 entitled "Multiple hopper weighing and transfer system" to Howard (1998) intended three hoppers in each lane of a weighing machine. While there is the advanced opportunity to obtain more batches for combinatorial process or to increase the batch weight, still a number of components including drives, is truly large.

Partially, the last problem was abated in the combinatorial system described and claimed in U.S. Pat. No. 4,678,046 entitled "Combination weighing apparatus for two combined products" to Mosher (1987). This system is adapted to weigh quantities of two or more different types of products and mix them together. The system includes a plurality of weighing scales divided into two groups, one group weighing quantities of a first type of product and the other group weighing quantities of a second type of product. A computer is provided to search the first group of scales and select a combination, which contains a combined quantity of the first type of product near in the weight to the predetermined fractional target weight, and search the second group of scales and select a combination, which contains a quantity of the second type of product near in the weight to the difference between the target weight for both products and the weight of product within the combination of scales selected from the first group. The selected scales of both groups empty into a common discharge chute after weighing and searching are completed. The scales of both groups are dumped at times such that both products arrive in the common discharge chute at the same time, mingle, and mix with each other. There are only one dome-shaped vibratory feeder with a partition and one common chute for two groups of different type products. However, two loading conveyors, at least five vibrating chutes, and five weighing hoppers serve each product.

Another combinatorial weighing method and system described and claimed in U.S. Pat. No. 4,549,617 entitled "Combinatorial weighing and combinatorial counting method and apparatus" to Matsumoto et al. (1985). These combinatorial weighing method and apparatus are offered for obtaining a batch of articles of a plurality of categories, each category of articles in the batch having the predetermined weight or made up of a predetermined number of articles. The method includes the steps of setting a target value for each category of articles, and supplying a plurality of weighing machines, groups of which are provided for each category of articles, with the articles of the category corresponding thereto. For each category of articles and from all combinations of the weighing machines supplied with the category of articles, a best combination is selected, whose total value (the weight or a number) is equal to the target value set for that category or closest to the target value within the preset allowable limits. Then, the articles from those weighing machines, corresponding to the best combination obtained for each category of articles are discharged, so that a batch composed of the discharged articles is obtained. These method and system sufficiently operate with considerable quantities of articles and the weighing machines of several groups. However, still a number of components of the weighing machines is relatively large.

Another obstacle for using combinatorial weighing is deficiency of environment defending devices in the combinatorial weighing system. Air collecting and dust preventing devices must be provided for industrial weighing to prevent dust particles of flows of ingredients enter the environment.

Thus, the analysis of technical field gives the impetus to offer my counting and combinatorial weighing method and apparatus.

As will be shown further, most disadvantages and obstacles of combinatorial weighing machines for an accommodation them for industrial weighing plurality different ingredients are alleviated in present the counting and combinatorial weighing method and apparatus, in accordance with the referred above analysis.

BRIEF SUMMARY OF THE INVENTION

Accordingly, a major object of the present invention is to provide, in the industrial weighing system, the counting and combinatorial weighing method and apparatus suitable for obtaining a collected batch of ingredients of the relatively large and the relatively small weight, with weight actual values within the tolerance limits of the highest accuracy.

Another object of the present invention is to provide the counting and combinatorial weighing method and apparatus suitable for obtaining the weight of the collected batch of ingredients substantially greater than the total weight capacity of all the weighing scale modules in the weighing apparatus.

Still another object of the present invention is to provide the counting and combinatorial weighing method and apparatus suitable for obtaining the collected batch of ingredients including ingredients of the adverse specific properties regarding weighing accuracy with weight actual values within the tolerance limits of the highest accuracy.

A further object of the present invention is to provide the counting and combinatorial weighing method and apparatus suitable for obtaining the collected batch of ingredients of the relatively large and the relatively small weights within the weighing scale modules of the relatively small volume capacity and the tare weight with the high resolution and wide measuring range.

Another major object of the present invention is to provide the counting and combinatorial weighing method and apparatus suitable for obtaining the collected batch of ingredients substantially to decrease numbers of both the feeders and related weighing scale modules per each ingredient thus to alleviate the cost problem.

Still another object of the present invention is to provide the counting and combinatorial weighing method and apparatus suitable for obtaining the collected batch of ingredients to alleviate the deterioration problem by simultaneous weighing an ingredient of the relatively large weight within a plurality of the weighing scale modules.

A further object of the present invention is to expand the application area of the counting and combinatorial weighing method and apparatus for obtaining the collected batch of ingredients with the highest accuracy and the great throughput to the industrial technological processes.

An additional object of the present invention is to provide the counting and combinatorial weighing method and apparatus to eliminate granulation or some other kind of preparation of ingredients for the industrial technological processes wherein it is possible and thus farther to decrease the energy and cost problems.

A further object of the present invention is to provide the counting and combinatorial weighing method and apparatus in the industrial weighing processes to prevent dust particles of flows of ingredients to impair the environment.

An additional object of the present invention is to provide software for modeling and remodeling the weighing system easy to operate and accurately to respond upon a change in the technological conditions of the industrial technological process.

Another object of the present invention is to provide the advantageous feeder, forming a plurality of flowing streams of the main ingredient, directly connected with the associated storage hopper and all of the weighing scale modules of the weighing machine substantially to simplify the weighing system.

Still another object of the present invention is to provide the advantageous feeder, forming a plurality of flowing streams of the main ingredient, directly connected with the associated storage hopper and all of the weighing scale modules of the weighing machine to enhance the storage hopper and thus to improve the weighing process.

A further object of the present invention is to provide the advantageous feeder, forming a plurality of flowing streams of the main ingredient of the relatively lower volumetric density and lower movement velocity substantially to increase the feeder throughput capacity.

Another object of the present invention is to provide the advantageous feeders, forming a plurality of flowing streams of the main ingredient, suitable for various arrangements of the weighing system.

Still another object of the present invention is to provide an advantageous vibratory drive to increase the throughput capacity of the main ingredient feeder and thus to decrease the energy and cost problems.

A further object of the present invention is to provide an advantageous vibratory drive to decrease the throughput capacity of the main ingredient feeder for feeding the partial batch into the associated weighing scale modules upon combinatorial and/or correctional weighing steps.

Another object of the present invention is to provide for a plurality of incorporated ingredients a plurality of feeders, directly connected with the relative weighing scale modules of the weighing machine in series with the main ingredient feeder substantially to reduce a number of the weighing scale modules per each ingredient.

Still another object of the present invention is to provide a rigid support frame of the weighing machine for supporting each of a plurality of the weighing scale modules detachably connected to and easy be detached from the support frame preserving its rigidity.

A further object of the present invention is to provide, for weighing the substantially small partial batches of ingredients in an iterative manner, a plurality of the weighing scale modules of the relatively small size and thus small inner surface and height, to alleviate the problems of ingredient sticking and the late ingredient in flight.

Another object of the present invention is to provide the weighing scale module, which is self-sufficient to integrate a load receiving assembly and a pillar being a part of the weighing machine support frame, to afford an adjustment, a test, and the metrological verification prior to assembly with the other weighing machine components.

Still another object of the present invention is to provide the self-sufficient weighing scale module, which comprises simple overload-preserving devices for diverting the excessively large forces away from the load cell and other related parts at transportation and exploitation.

A further object of the present invention is to provide the self-sufficient weighing scale module, which easy being attached to or detached from the weighing machine support frame.

Another object of the present invention is to provide for the weighing scale module, in a cup unit, an air duct and an outlet cap, which are so arranged advantageously to alleviate an influence of the air pressure upon the weight measuring process.

Still another object of the present invention is to provide a complementary correctional feeder for feeding the partial batch into the associated weighing scale modules upon the correctional weighing steps with the substantially low throughput capacity.

Further objects of the present invention will become apparent to those skilled in this art from the following description wherein there is shown and described a preferred embodiment of this invention, simply by way of illustration of one of the modes best suited to carry out the invention.

BRIEF DESCRIPTION OF THE SEVERAL VIEWS OF THE DRAWINGS

The accompanying drawings, incorporated in and forming a part of the specification, illustrate several aspects of the present invention and together with the description serve to explain the principles of the invention. In the drawings, closely related figures have the same number but different alphabetic suffixes.

FIGS. 12 and 12a are front elevational views of a rectangular and a two-tier rectangular main ingredient feeders, respectively, for the rectangular arrangement of the weighing machine;

FIGS. 13 and 13a are side elevational sectional views taken along the plane of lines 13—13 and 13a—13a in FIGS. 12 and 12a, respectively;

FIGS. 14 and 14a are top views of the rectangular and two-tier rectangular main ingredient feeders shown in FIGS. 12 and 12a, respectively, detailing rectangular bowls;

FIGS. 15 and 15a are partial cross-sectional views taken along the plane of lines 15—15 and 15a—15a in FIG. 12 and 12a, respectively, detailing vibratory drives;

FIGS. 17a–17e are a flow chart illustrating a method, by which the counting and combinatorial weighing apparatus operates.

Figure 1:
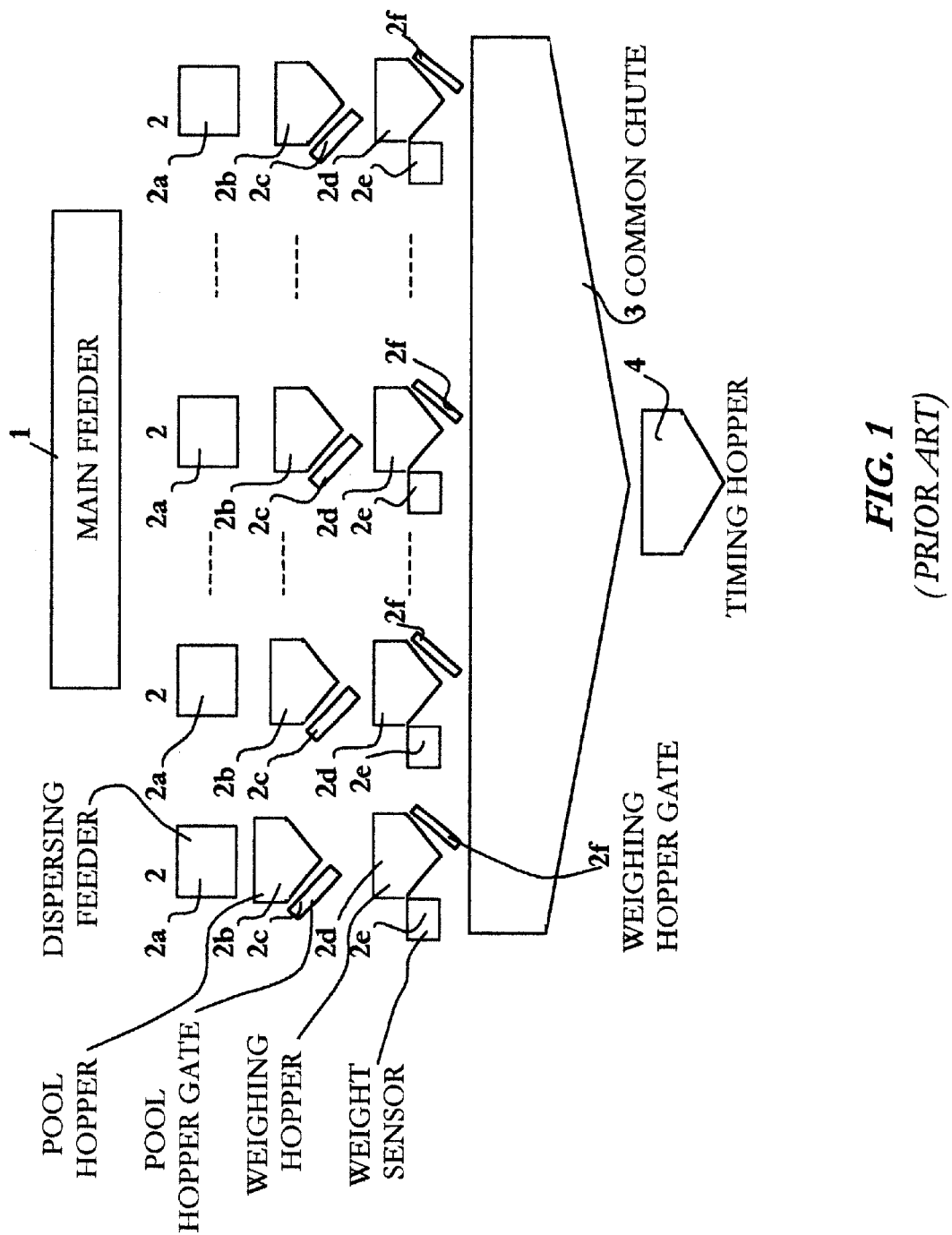
FIGS. 1 and 2 schematic diagrams of conventional combinatorial weighing apparatus and system, respectively, and useful in describing a prior art combinatorial weighing method and system for articles belonging to a plurality of different categories.

| REFERENCE NUMERALS IN DRAWINGS | |
|---|---|
| 1 | main feeder |
| 2 | weighing station |
| 2a | dispersing feeder |
| 2b | pool hopper |
| 2c | pool hopper gate |
| 2d | weighing hopper |
| 2e | weight sensor |
| 2f | weighing hopper gate |
| 3 | common chute |
| 4 | timing hopper |
| 11 | combination control unit |
| 12 | multiplexer |

-continued

| | REFERENCE NUMERALS IN DRAWINGS |
|---|---|
| 13 | analog-to-digital converter |
| 14 | weight setting unit |
| 15 | weight setting unit |
| 16 | weight setting unit |
| 17 | drive control unit |
| 24 | memory |
| 30a | weighing apparatus |
| 30b | weighing apparatus |
| 32a, | ... |
| 32c | weighing machine |
| 32d, | ... |
| 32f | weighing machine |
| 34a | support frame |
| 34b | support frame |
| 36 | weighing scale module |
| 38 | main ingredient feeder |
| 38a | main ingredient two-tier feeder |
| 40 | main ingredient feeder |
| 42a, | ... |
| 42f | incorporated ingredient feeder |
| 42g | complementary correctional feeder |
| 44 | cutoff assembly |
| 44a | gate unit |
| 44b | cup unit |
| 44c | inlet piece |
| 44d | air duct |
| 44e | outlet |
| 44f | air drive |
| 46 | ingredients discharging device |
| 46a | common chute |
| 46b | intermediate connection |
| 46c | ceiling portion |
| 46d | inlet piece |
| 46e | air connecting pipe |
| 46f | outlet opening |
| 46g | activator |
| 46h | exhaust discharge |
| 48 | air collecting device |
| 48a | air tube |
| 50 | dust preventing device |
| 50a, | ... |
| 50g | elastic cover |
| 50h, | ... |
| 50n | clamping band |
| 52 | auxiliary cutoff assembly |
| 54a | tube |
| 54b | tube |
| 54c | tube |
| 56 | control computer system |
| 56a | computer |
| 56b | controller |
| 56c | software unit |
| 58a | lower base frame |
| 58b | upper base frame |
| 58c | upright support structure |
| 60a | lower base frame |
| 60b | upper base frame |
| 60c | upright support structure |
| 62 | pillar |
| 62a | lower plate |
| 62b | upper plate |
| 62c | brace |
| 62d | support arm |
| 62e | rib |
| 62f | flange element |
| 64 | hub flange |
| 66a | bolt |
| 66b | bolt |
| 68 | upper end |
| 70 | aid carrier |
| 72 | balance load |
| 74 | plate |
| 76 | bolt |
| 78 | load cell |
| 80 | first force-transmitting device |
| 80a | connection member |
| 80b | nut |

-continued

| | REFERENCE NUMERALS IN DRAWINGS |
|---|---|
| 80c | spherical washer |
| 80d | spherical washer |
| 80e | slit |
| 82 | second force-transmitting device |
| 82a | leaf springs device |
| 82b | flange element |
| 84 | load-receiving assembly |
| 84a | force-output element |
| 84b | weighing hopper |
| 84c | automatic valve |
| 84d | air drive |
| 84e | lower plate |
| 84f | upper plate |
| 84g | rib |
| 84h | outlet cap |
| 84i | activator |
| 84j | flange element |
| 86 | first overload-preserving device |
| 86a | screw stop |
| 86b | screwed ring |
| 86c | lock nut |
| 86d | thrust collar |
| 86e | screw |
| 86f | threaded aperture |
| 88 | second overload-preserving device |
| 88a | aid beam |
| 88b | flange element |
| 88c | bolt |
| 88d | abutment stop |
| 90a, | ... |
| 90c | storage hopper |
| 90d, | ... |
| 90u | storage hopper |
| 92a, | ... |
| 92c | storage hopper |
| 92d, | ... |
| 92u | storage hopper |
| 94 | rectangular bowl |
| 94a | gable-shaped bottom |
| 94b | partition |
| 94c | hollow |
| 94d | convexity |
| 94e | main discharge |
| 94f | convex divider |
| 94g | first auxiliary discharge |
| 94h | second auxiliary discharge |
| 94i | main nozzle |
| 94j | flange portion |
| 94k | auxiliary nozzle |
| 96 | vibratory drive |
| 96a | unbalancing vibratory motor |
| 96b | unbalancing vibratory motor |
| 96c | motor plate |
| 96d | flange unit |
| 96e | leaf springs device |
| 96f | shock absorber |
| 98 | two-tier rectangular bowl |
| 98a | upper hollow |
| 98b | upper discharge |
| 98c | vibratory drive |
| 98d | motor plate |
| 100 | circular bowl |
| 102 | tore-shaped bottom |
| 104 | convex cap |
| 106 | divider |
| 108 | main discharge |
| 110 | auxiliary discharge |
| 112 | main nozzle |
| 114 | auxiliary nozzle |
| 116 | flange element |
| 118 | vibratory drive |
| 120 | support floor |
| 122 | ingredients discharging device |
| 124 | conveyor |
| 126a, | ... |
| 126c | conveyor |

DETAILED DESCRIPTION OF THE INVENTION

Referring to FIG. 1 showing an apparatus for practicing the conventional combinatorial weighing method and system applied to articles belonging to a plurality of different categories. Numeral 1 denotes a main feeder of vibratory conveyance type. Articles to be weighed are introduced into main feeder 1 and imparted with vibratory motion for a predetermined length of time so as to be dispersed from the main feeder. Numerals 2, denote n-number of weighing stations, which are so arranged as to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. Dispersing feeder 2a comprises an independently vibratable conveyance device for feeding the articles by means of vibration, or an independently operable shutter. In either case, each dispersing feeder 2a is so arranged that the articles received from main feeder 1 can be introduced into corresponding pool hopper 2b disposed therebelow. Pool hopper gate 2c is provided on each pool hopper 2b in such a manner that the articles received in pool hopper 2b are released into weighing hopper 2d when pool hopper gate 2c is opened. Each weighing machine consists of weighing hopper 2d and weight sensor 2e of its own, the later being attached to weighing hopper 2d. Weight sensor 2e is operable to measure the weight of the articles introduced into the corresponding weighing hopper, and to apply an electrical signal indicative of the measured weight to a combination control unit, shown in FIG. 3. The combination control unit then selects the combination of weighing machines (known as the "best" combination) that gives the total weight equal to a target value or closest to the target value within the preset allowable limits (as described in U.S. Pat. No. 4,549,617). Each weighing hopper 2d is provided with its own weighing hopper gate 2f.

A drive control unit 17 (FIG. 3), upon receiving the signals from each of the weighing sensors 2e, produces a signal to open only the weighing hopper gates 2f of those weighing machines that give the best combination. These gates 2f discharge the articles into a common chute 3 where they are collected together. Common chute 3 is so arranged as to receive the articles from any of the perimetrically arrayed weighing hoppers 2d via weighing hopper gates 2f, which are located above the common chute substantially along its outer rim. The articles received by common chute 3 at the centrally located lower end thereof by falling under their own weight or by being forcibly shifted along the inclined wall of the common chute by a mechanical device (not shown). The common chute is provided with a timing hopper 4 at the lower end thereof for temporarily holding the collected articles. The arrival of an externally applied signal from a packaging machine or the like causes timing hopper 4 to release the retained articles from the system.

Figure 2:
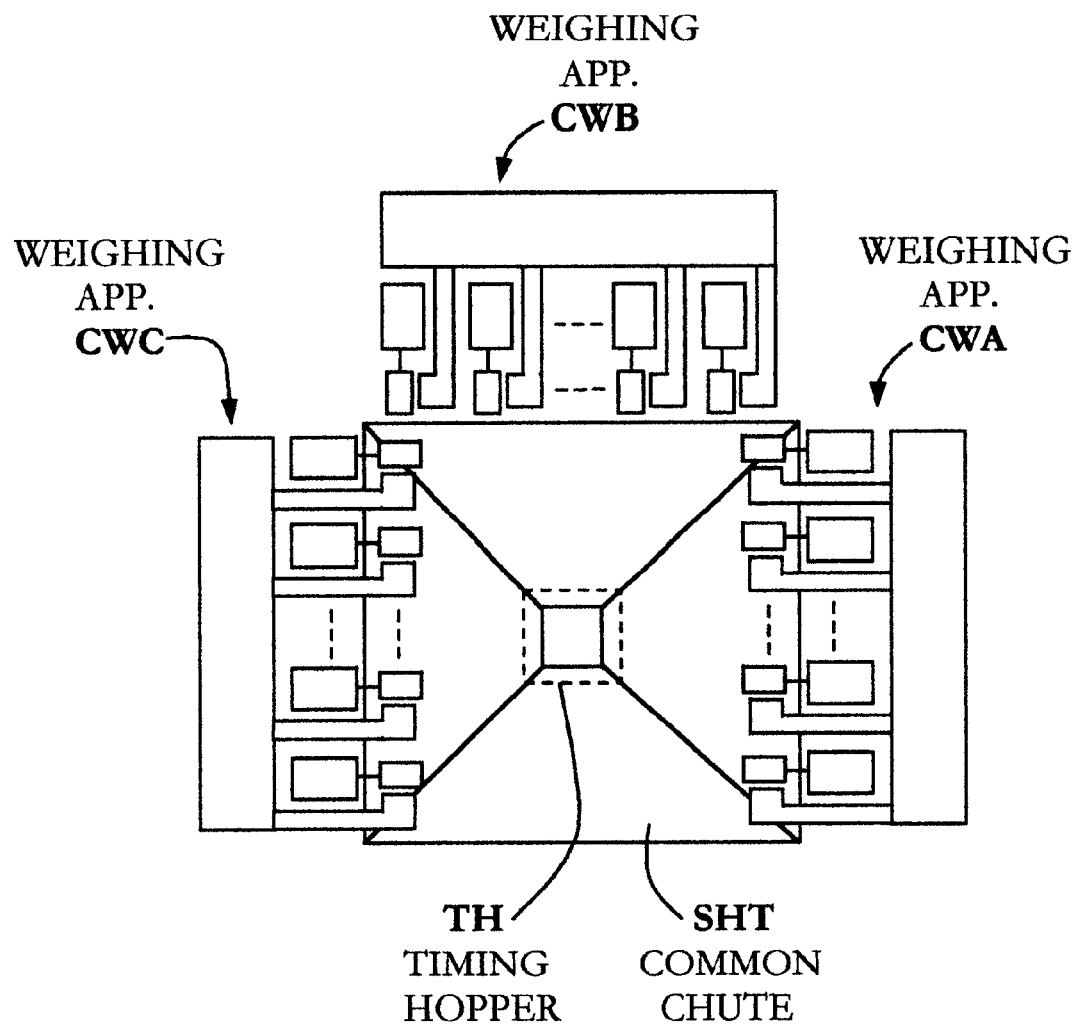

Reference will be had to FIG. 2 illustrating the conventional combinatorial weighing system mentioned above. The apparatus includes first, second, and third weighing apparatus CWA, CWB, CWC for weighing three (in this embodiment) different varieties of articles AA, BA, CA, the common chute SHT for collecting the articles discharged from the first, second, and third weighing apparatus CWA, CWB, CWC, and the timing hopper TH for temporarily holding the collected articles. The timing hopper responds to an externally applied signal from a packaging machine or the like by discharging the retained articles from the system.

Each weighing apparatus CWA, CWB, CWC has the construction shown in FIG. 1.

Figure 3:
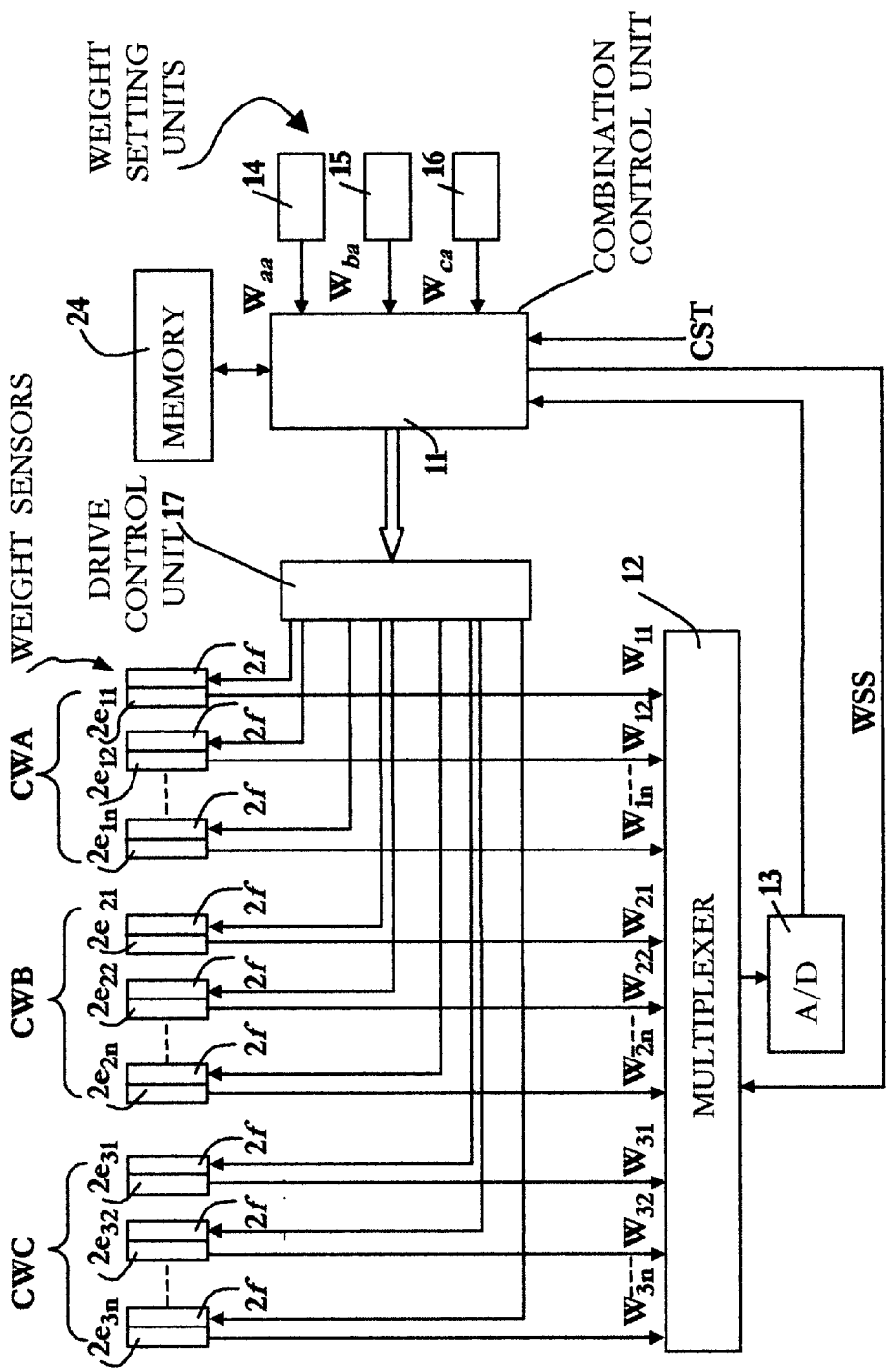
FIG. 3 is a block diagram of the conventional combinatorial weighing apparatus for practicing the method and system described with reference to FIGS. 1 and 2.

A block diagram of the circuitry for realizing the system of FIG. 2 is illustrated in FIG. 3. A combination control unit 11, constituted by a microcomputer or the like, is adapted to store weight values W11, W12, ... W1n, W21, W22, ... W2n, W31, W32, ... W3n provided by weight sensors $2e_{11}$, $2e_{12}$, ... $2e_{1n}$ of weighing apparatus CWA, by weight sensors $2e_{21}$, $2e_{22}$, ... $2e_{2n}$ of weighing apparatus CWB, and by weight sensors $2e_{31}$, $2e_{32}$, ... $2e_{3n}$ of weighing apparatus CWC, respectively, to find the best combination for each category of articles by computing combinations of the articles in each category in the same fashion as described in connection with FIG. 1, and to store the best combination. A multiplexer 12, which receives a selection signal WSS produced by control unit 11, provides an analog-to-digital converter 13 (hereafter referred to as A/D converter 13) successively with selected ones of weight values $W_{ij}$ (i=1, 2, 3; j=1, 2, ... n) from the weight sensors $2e_{ij}$, these weight values being selected by the multiplexer on the basis of the selection signal WSS. A/D converter 13 converts the analog weight value $W_{ij}$ obtained via the multiplexer into a digital value, and a signal indicative of this value is sent to combination control unit 11 where the digital value is stored in an internal memory. The weight signals from all of the weight sensors in the weighing apparatus CWA, CWB, CWC are stored in combination control unit 11, and the latter computes combinations on the basis of target values set in weight setting units 14, 15, 16. Specifically, weight setting unit 14 stores a target weight value $W_{aa}$ for the articles AA, weight setting unit 15 a target weight value $W_{ba}$ for the articles BA, and weight setting unit 16 a target weight value $W_{ca}$ for the articles CA.

In operation, the articles AA, BA, CA are fed into each of the corresponding weighing hoppers 2d and pool hoppers 2b of each weighing apparatus CWA, CWB, CWC, respectively. When a packaging machine (not shown) is ready to begin packaging articles, a start signal CST is applied to combination control unit 11. Control unit 11 responds to the start signal CST by applying the selection signal WSS to multiplexer 12. When the signal WSS arrives, multiplexer 12 responds by first successively providing A/D converter 13 with the output weight values W11, W12, ... W1n of weight sensors $2e_{11}$, $2e_{12}$, ... $2e_{1n}$ that are weighing the articles AA in apparatus CWA. A/D converter 13 successively converts the weight values W11, W12, ... W1n into digital values and applies these values to combination control unit 11 where they are stored in the unit's internal memory. When the weight values W11, W12, ... W1n from all of the weight sensors $2e_{11}$, $2e_{12}$, ... $2e_{1n}$ belonging to the first weighing apparatus CWA have been stored in combination control unit 11, the latter computes combinations (as shown in description of U.S. Pat. No. 4,549,617) on the basis of the target value $W_{aa}$, set in setting unit 14. Control unit 11 then finds the best combination resulting from the combinatorial computation and stores, in a best combination memory 24, the bit pattern (best combination pattern) corresponding to the best combination.

When the best combination for the articles AA has been found by the combinatorial computations performed for those articles, processing shifts to combinatorial computations performed for the articles BA. That is, combination control unit 11 produces the selection signal WSS and successively reads in the output weight values W21, W22, ... W2n from the weight sensors $2e_{21}$, $2e_{22}$, ... $2e_{2n}$, that are weighing the articles BA. Thenceforth, when the best combination of the articles BA is found by combinatorial computations just as described above, processing shifts to combinatorial computations performed for the articles CA.

When the combinatorial computations for the plurality of different articles AA, BA, CA end, combination control unit 11 provides a drive control unit 17 with the best combination pattern for each of the article categories AA, BA, CA, these best combination patterns having been stored in memory 24. Drive control unit 17 responds by opening the weighing hopper gates 2f of those weighing machines designated by the best combination pattern, whereby the articles are discharged into common chute SHT (FIG. 2) and retained temporarily in timing hopper TH. Thus, a batch made up of the articles in each category can be obtained, with the AA, BA, CA-category articles having the prescribed weights $W_{aa}$, $W_{ba}$, $W_{aa}$ respectively.

In the foregoing, the target weights for the articles in each category were set in setting units 14, 15, and 16. It is also possible, however, to set the weights ratios of the articles AA, BA, CA and set the gross target weight of a batch separately, and then find the target weight value of the articles in each category from the weight ratio and gross target weight. In the embodiment described and illustrated above, the target weights were set for the articles in each category.

Assume now that for a certain category of the articles no combination can be found that gives the weight of articles equal to the target weight or closest to the target weight within the preset allowable limits. In such case combination control unit 11 executes processing to revise the target weight in a similar manner as shown in description of U.S. Pat. No. 4,549,617, when no combination that gives a number of articles equal to target number or closest to target number within the preset allowable limits. Specifically, in order to change the target weight $W_{aa}$. for articles AA without changing the overall weight of articles when the articles AA, BA, CA are collected together in a batch, the target weight for one of the other categories, say the articles BA, is changed compulsorily (the target weight $W_{ca}$ for the other articles CA is left unaltered). When this has been accomplished, control unit 11 computes the best combinations based on the revised target weights $W_{aa}$, $W_{ba}$, and on $W_{ca}$. These best combinations are stored in the combination pattern storage areas of memory 24. Control unit 11 then selects, from among all combinations of the best combinations patterns chosen from one after another of the storage areas of memory 24, that combination whose total weight value is equal or closest to the target weight Wt set by the target weight setting units 14, 15, 16. This will end the revising process. Thereafter, control unit 11 opens the weighing hopper gates belonging to the weighing machines that correspond to the combination (of best combination patterns) whose the total weight is equal or closest to the target weight, thereby discharging the corresponding articles to provide the prescribed batch.

If combinations cannot be found giving values coinciding with any of the target weights $W_{aa}$, $W_{ba}$, $W_{ca}$ for the articles AA, BA, CA, then control unit 11 compulsory changes these target weights $W_{aa}$, $W_{ba}$, $W_{ca}$ to predetermined fixed values $W_{aa}$, $W_{ba}$, and $W_{ca}$, (without changing the overall weight of articles) to execute the revision process.

Figure 4:
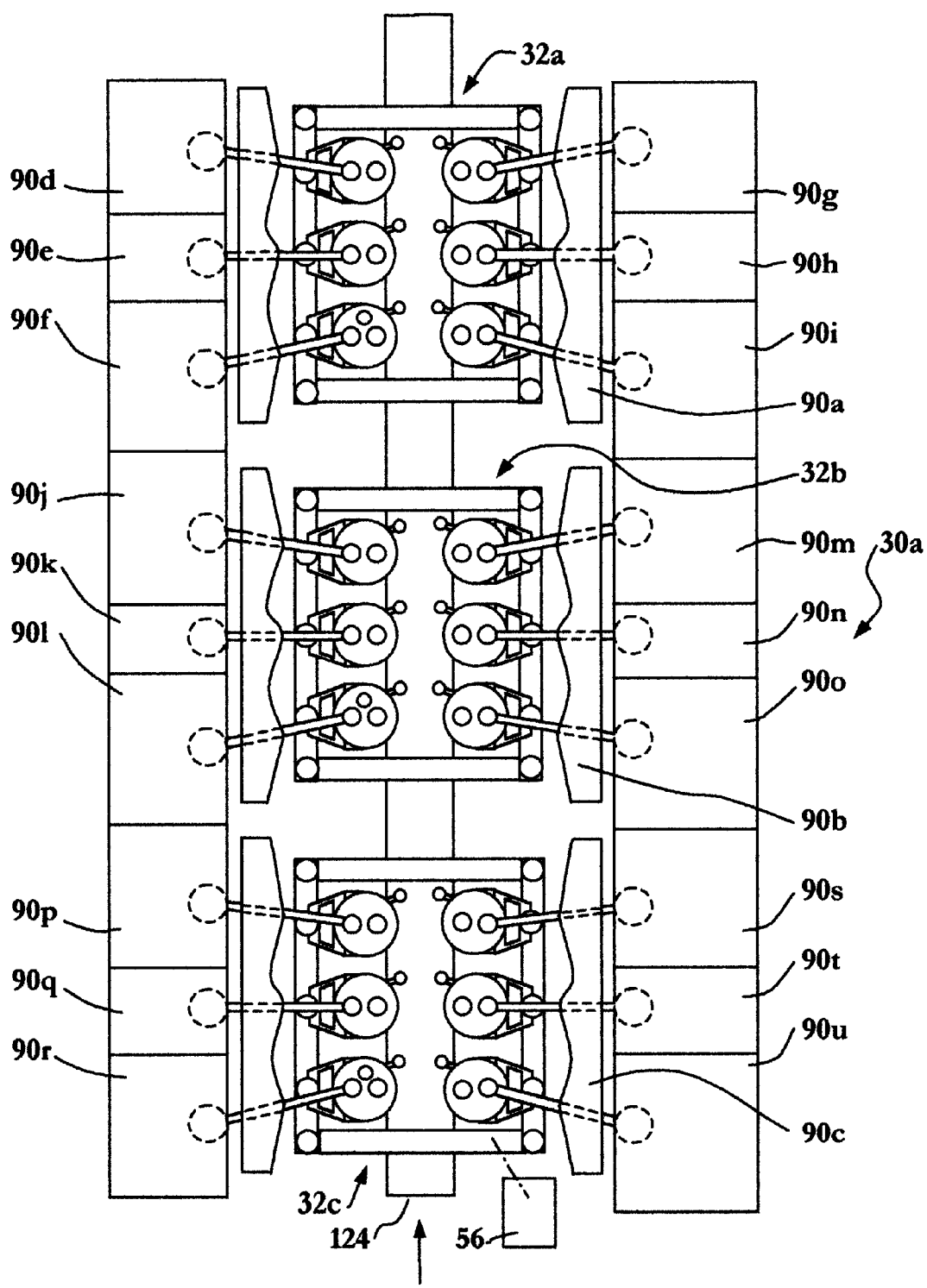
FIGS. 4 and 4a are schematic diagrams of counting and combinatorial weighing apparatus of rectangular and circular constructional arrangements, respectively, for practicing the method of the present invention.

Reference now made to FIG. 4 showing my counting and combinatorial weighing apparatus or weighing apparatus generally designated by the reference numeral 30a. The weighing apparatus comprises a weighing system or a plurality of weighing machines 32a, 32b, 32c of rectangular arrangement, and a control computer system 56 for control of the weighing machines. A plurality of storage hoppers 90a, 90b, 90c for main ingredients, 90d, 90e, ... 90u for incorporated ingredients and conveyor 124 for transferring a collected batch of a plurality of ingredients to a mixer (not shown) are provided for the weighing apparatus. Each of the weighing machines is provided for each corresponding group of ingredients including a main ingredient and a plurality of incorporated ingredients.

Figure 4A:
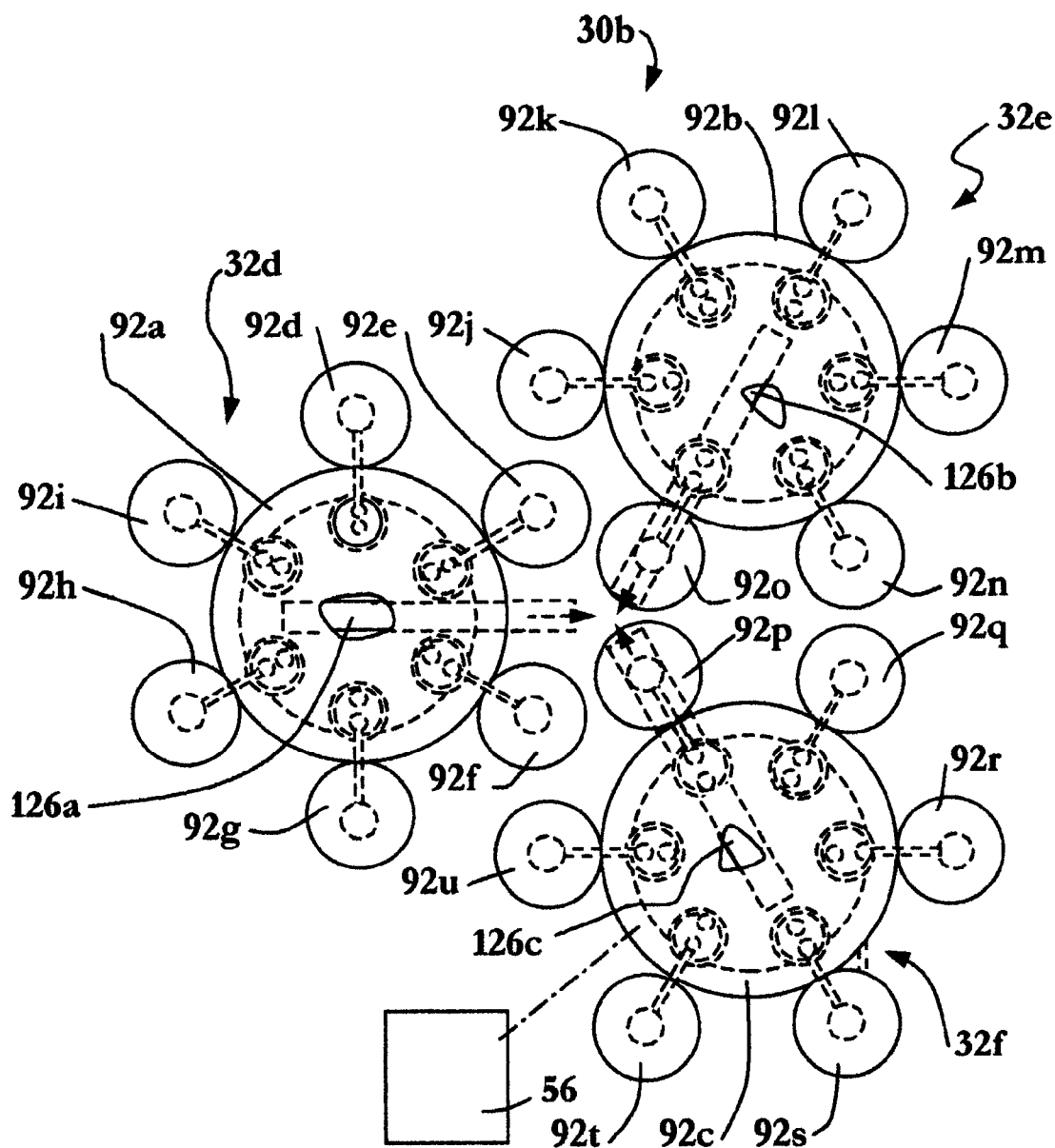

In an alternate embodiment as shown in FIG. 4a, a weighing apparatus generally designated by the reference numeral 30b comprises a weighing system or a plurality of weighing machines 32d, 32e, 32f of circular arrangement and control computer system 56 for a control of the weighing machines. A plurality of storage hoppers 92a, 92b, 92c for main ingredients and 92d, 92e, ... 92u for incorporated ingredients and a plurality of conveyors 126a, 126b, 126c are provided for this weighing apparatus, respectively.

A preferred embodiment of the weighing machine will be described referring to FIGS. 5, 6, and 7. Each of the weighing machines comprises a mountable rectangular rigid support frame 34a supporting a plurality of weighing scale modules 36. Each weighing scale module 36 is provided for counting and combinatorial weighing steps for a corresponding one and the same main ingredient and for a weighing step for at least one different incorporated ingredient. A main ingredient feeder 38 forms a plurality of flowing streams of the main ingredient and feeds each stream directly into relative weighing scale module 36. Accordingly, each of a plurality of incorporated ingredient feeders 42a, 42b, ... 42f forms a flowing stream of the one different incorporated ingredient to feed the stream directly into the corresponding weighing scale module. Additionally, a complementary correctional feeder 42g, provided for a correctional weighing step when no the best combination is found in the final combinatorial weighing step for the main ingredient, forms a flowing stream of the main ingredient and feeds assigned the weighing scale module. As shown, each weighing scale module 36 is sequentially connected to a cutoff assembly 44 and an ingredients discharging device 46, whose the inner space permanently connected with the inner space of weighing scale module 36 through an air collecting device 48 with a dust preventing device 50. Each of a plurality of auxiliary cutoff assemblies 52 for preliminary adjusting the throughput and cutting off the flowing streams of the main ingredient for particular situation is connected to main ingredient feeder 38 and to each of a plurality of tubes 54a or a tube 54b, respectively. Tube 54a is connected to cutoff assembly 44 for transferring the stream of the main ingredient directly into weighing scale module 36. Tube 54b is connected to complementary correctional feeder 42g for transferring the stream of the main ingredient directly into the latter.

Figure 8:
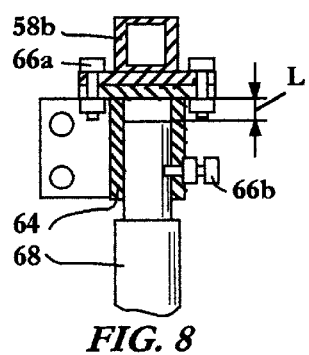
FIGS. 8 and 8a are partial elevational views of a pillar in cross section showing a connection of the pillar to a support frame of the weighing machine.
Figure 8A:
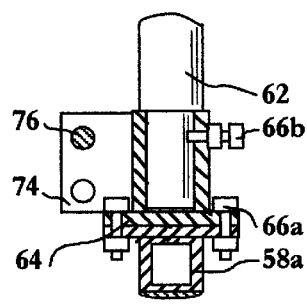

As shown, weighing machine 32a is operated by control computer system 56 for a control of the weighing system and comprises the support frame formed by horizontally spaced apart a lower base frame 58a and an upper base frame 58b connected to a rigid upright support structure 58c. Such an accommodation of construction units conveniently allows to arrange other weighing machine parts on the upper and lower base frames. In weighing scale module 36, pillar 62 is a part of upright support structure 58c and is connected to both lower and upper base frames 58a, 58b by means of movable hub flanges 64 as shown further on FIGS. 8 and 8a. After alignment, hub flanges 64 are fixed by bolts 66a and 66b. An upper end 68 of pillar 62 and hub flange 64 are so accomplished that hub flange 64 will be able to move down to provide a clearance L, when the weighing scale module has to be moved to or removed from the weighing machine.

Figure 9:
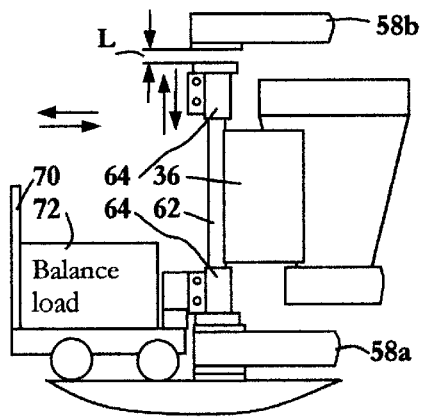
FIG. 9 is. a diagrammatic view of mounting of a weighing scale module in the weighing machine.

Thus, the weighing scale module is advantageously mounted within the support frame of the weighing machine. As shown further in FIG. 9, each of the weighing scale modules may be, for a restoration, conveniently rolled from the weighing machine to another place by an aid carrier 70. For this operation, aid carrier 70 is loaded by a balance load 72 and attached to a plate 74 (FIG. 8a) of hub flange 64 by bolts 76. Then hub flanges 64 are detached from both upper and lower base frames 58a, 58b.

Figure 5:
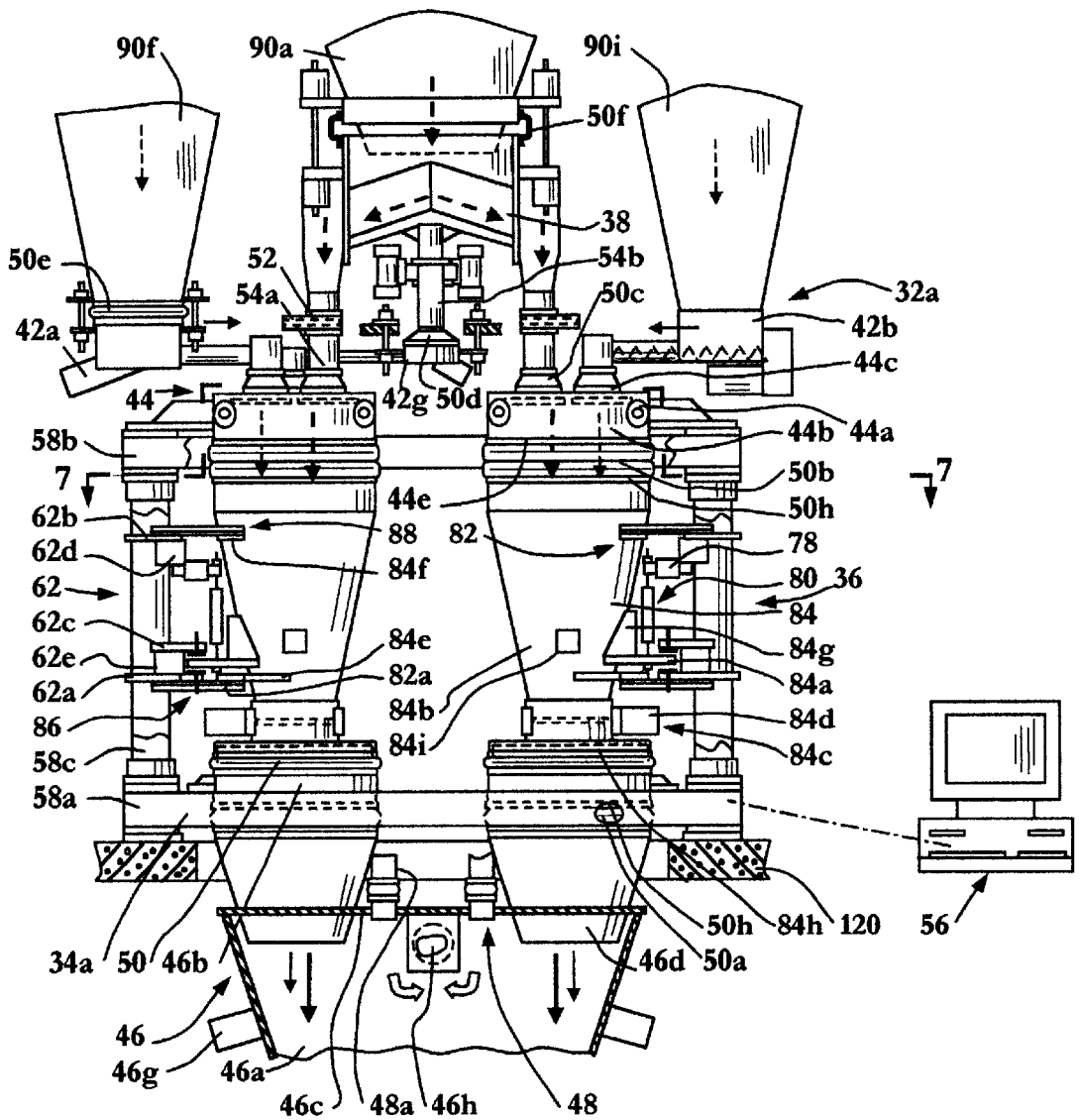
FIGS. 5 and 5a are front elevational views of one of a plurality of weighing machines of the counting and combinatorial weighing apparatus of the rectangular and circular constructional arrangements, respectively, for practicing the method of the present invention.
Figure 6:
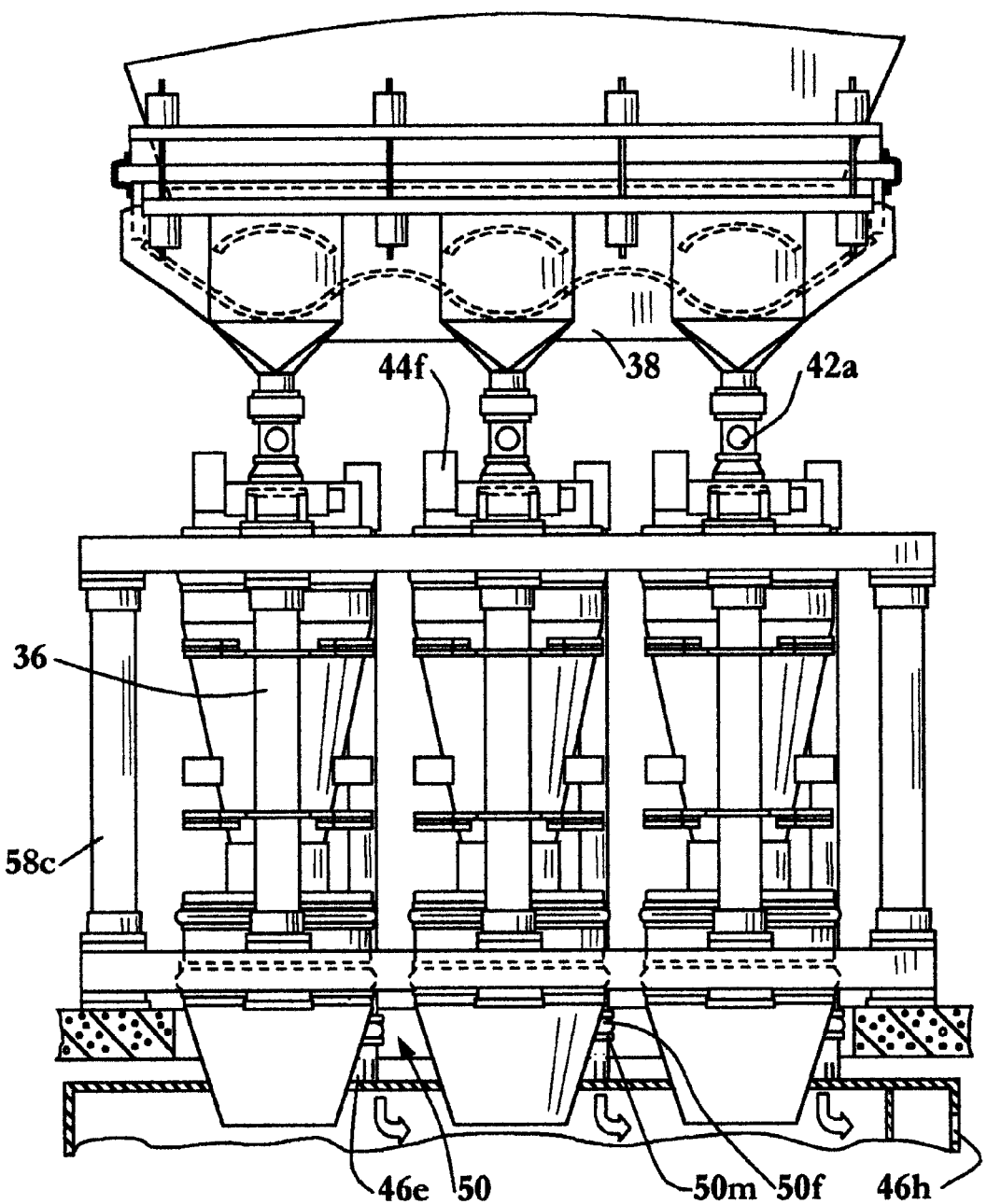
FIG. 6 is a side elevational view of the weighing machine shown in FIG. 5 illustrating a constructional arrangement of the main parts of the weighing machine.
Figure 7:
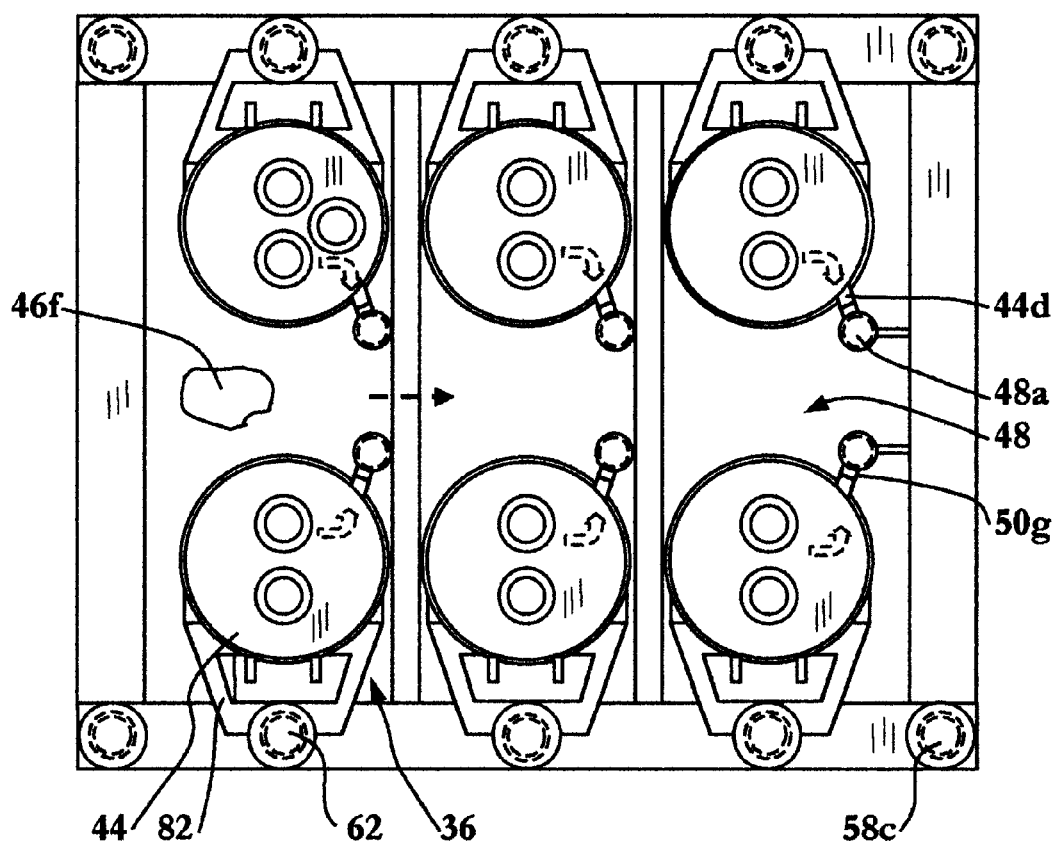
FIGS. 7 and 7a are top views taken along the plane of lines 7—7 and 7a—7a in FIGS. 5 and 5a, respectively, showing cutoff assemblies and air collecting devices of the weighing machines.
Figure 10:
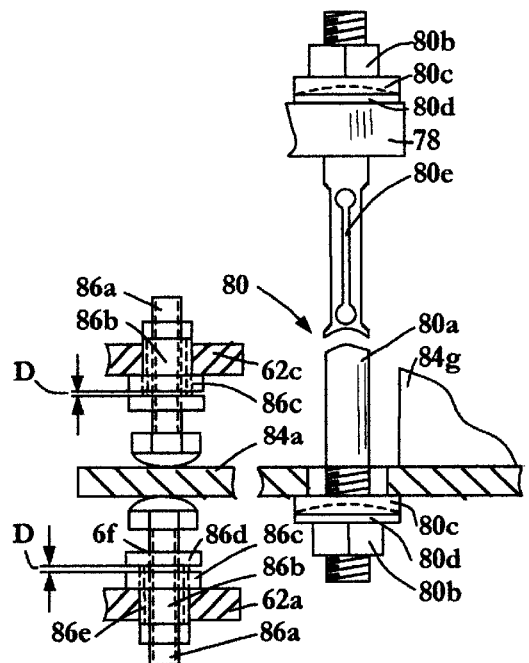
FIG. 10 is a partial elevational view of a first force-transmitting and a first overload-preserving devices in a transportation position, exposed for clarity in cross section.
Figure 11:
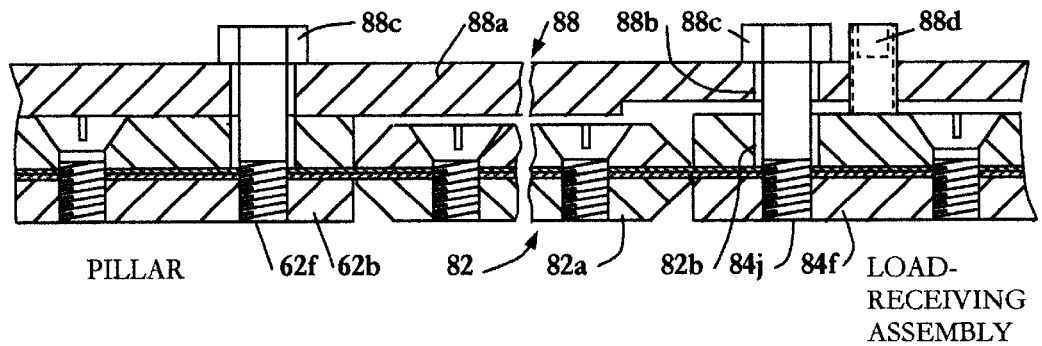
FIG. 11 is a partial elevational view of a second force-transmitting and a second overload-preserving devices in a transportation position, exposed for clarity in cross section.

As shown in FIGS. 5, 6, 7, the weighing scale module further comprises a load cell 78, a first force-transmitting device 80, a second force-transmitting device 82, a load-receiving assembly 84, a first overload-preserving device 86, and a second overload-preserving device 88, more detailed shown in FIGS. 10 and 11.

Who is skilled in the art will particularly appreciate that load cell 78 is of the maximal weight limit substantially smaller than the fractional weight of a main ingredient batch to weigh advantageously the main ingredient with the highest resolution and a minimal measuring error. The load cell may be of any suitable conventional type, for instance, an Omega's bending beam load cell, LCDB series or the like, characterized as having sufficient accuracy of 0.04% of weight capacity.

As shown in FIG. 5, second force-transmitting device 82 comprises two pairs of leaf springs devices 82a spaced apart on two horizontal planes and mutually connected the load-receiving assembly and the pillar. The leaf springs devices are so constructively arranged that pair of forces, tensile and compressing, being transmitted by them to the pillar to balance the moment of the weight of the load-receiving assembly, is counterbalanced by the pillar. The leaf springs devices are detachably fixed to rigid flat horizontal lower and upper plates 84e, 84f of the load-receiving assembly and related lower and upper plates 62a, 62b of the pillar.

Load-receiving assembly 84 further includes a weighing hopper 84b, which at its discharge opening is supplied with known in the art a butterfly-type gate valve or an automatic valve 84c with an air drive 84d and sensors (not shown). Automatic valve 84c is connected to an outlet cup 84h will be described further. Activators 84i are attached opposite each other to the weighing hopper outer walls to clean their inner surface. Who is skilled in the art particularly will appreciate that weighing hopper 84b is of substantially small volume than volume of the predetermined main ingredient batch and is of, accordingly, small inner surface and small height advantageously to alleviate the problems of ingredient sticking and the late ingredient in flight. Additionally, there is overall economy on the weighing apparatus cost and a plant area at an installation site. Assume now that the residue weight in each weighing hopper equals approximately near 0.5% the weighing scale module weight capacity. Then a residue error for the completed batch upon three sequenced weighing steps equals approximately near 0.05% the weight capacity of the weighing machine comprising the two weighing scale modules selected among the six others.

As shown in FIG. 10, first force-transmitting device 80 comprises a connection member 80a, which is suspended by a nut 80b with spherical washers 80c, 80d. The last is placed on the top face of the force-input element of the load cell mounted on a support arm 62d (FIG. 5) of the pillar of the weighing scale module. A slit 80e is provided on the upper end of connection member 80a, whose the lower end extends through a coaxially aligned aperture of a force-output element 84a of the load-receiving assembly, spherical washers 80c, 80d, and nut 80b. Thus, the connection member is flexible and reliable to support the load-receiving assembly, placed on the top of spherical washer 80c by the flat bottom face of related force-output element 84a rigidified by ribs 84g.

As shown in FIG. 10, first overload-preserving device 86 for protection against damage by any abnormal forces applied to the load cell and leaf springs further advantageously includes screw stops 86a coupled with screwed rings 86b having a thrust collar 86d. Screwed rings 86b coupled with lock nuts 86c. Screw stops 86a extend vertically through the threaded aperture 86f of screwed rings 86b, which have a screw 86e to set into coaxially aligned threaded apertures of lock nuts 86c, a lower plate 62a, and a brace 62c welded with a rib 62e (FIG. 5) to the pillar. Lower plate 62a and brace 62c are horizontally disposed in parallel, spaced apart planes so that force-output element 84a is confined between heads of screw stops 86a. The heads of screw stops 86a (FIG. 10) are set tightly to force-output element 84a.

Initially, for normal loading, each screw stop 86a is positioned so that its head is spaced a short distance aside force-output element 84a. The load-induced force as the weight is transferred through lower spherical washers 80c, 80d and nut 80b to connection member 80a without absorption by screw stop 86a. From the connection member, the load-induced force is transferred through upper nut 80b and upper spherical washers 80c, 80d to the force-input element of load cell 78. The latter, in response to this load-induced force, produces the electrical output applied to the related input of control computer system 56.

When the applied weight is equal to the half of a desired set force, lower nut 80b is then threaded up or down to lift or lower the load-receiving assembly to place the leaf springs devices approximately near horizontal planes. This adjustment will decrease a flexural deformation of the leaf springs devices and thus a measuring error.

When the load cell is preloaded by the maximal allowable weight, lower screw stop 86a is threaded up to set its head to the underside of force-output element 84a. Besides thrust collar 86d of lower screwed ring 86b is set tightly to lower lock nut 86c, which is set tightly to lower plate 62a. This adjustment will prevent further overloading of the load cell.

When the load cell is preloaded by the minimal allowable weight, upper screw stop 86a is threaded down to set its head for a short distance or clearance D to the upper side of force-output element 84a. Besides thrust collar 86d of upper screwed ring 86b is set tightly to upper lock nut 86c, which is set tightly to brace 62c. This adjustment will protect the leaf springs against their overflexion. Accordingly, the head of lower screw stop 86a is spaced a short distance or clearance D to the underside of force-output element 84a. Besides thrust collar 86d of lower screwed ring 86b is set tightly to lower lock nut 86c, which is set tightly to lower plate 62a. It will be appreciated that the clearances D may also be set by selectively adjusting screw stops 86a prior to assembly of weighing scale module 36 with any other parts of the weighing machine.

As the load is applied to the load-receiving assembly, the clearance D between the head of screw stop 86a and the underside of force-output element 84a becomes smaller. Thus, the preselected downward displacement of force-output element 84a under the influence of the abnormal force closes clearance D to set the underside of force-output element 84a onto the head of screw stop 86a. This establishes a stiff connection to divert the abnormal force through lower plate 62a of pillar 62 to a support floor 120 (FIG. 5)

of the weighing machine. This screw stop feature protects the load cells and other parts of the weighing machine from damage by extremely large forces and increases the reliability of the weighing system.

For transportation or the like to protect the load cell and the leaf springs devices, the weighing hopper is emptied. Next, zero clearances between the head of the stops and the force-output element and clearances D between the thrust collar of screwed rings and lock nuts are adjusted (FIG. 10).

To run under force at the installation site, clearances D between the head of the stops and the force-output element and zero clearances between the thrust collar of screwed rings and lock nuts are adjusted. Both described above adjustments are provided only by a turn of the screwed rings, thus the force-transmitting device and the load cell further require no their preloading and adjusting.

As shown in FIG. 11, the second overload-preserving device for protection against damage by any abnormal forces applied to the second force-transmitting device includes rigid aid beams 88a. Placed over leaf spring devices 82a, the aid beams are connected at one end to lower and upper plates 62a, 62b of the pillar (FIG. 5) and at their another end to lower and upper plates 84e, 84f of the load-receiving assembly, respectively, and rigidly fixed by bolts 88c and abutment stops 88d. For this connection, flange elements: 62f of the pillar, 84j of the load-receiving assembly, 82b of the leaf spring devices, and 88b of the aid beams are provided. Thus, the aid beams form a whole rigid structure detachably fixed the load-receiving assembly to the pillar.

For transportation or the like, the aid beams are fixed as described above. To run under force at the installation site, the necessary adjustment to recover flexibility of the leaf springs devices is provided as bolts 88c and abutment stops 88d adjacent to the load-receiving assembly are detached. Thus, the force-transmitting devices and the load cell further require no preloading and adjusting.

From the weighing machine construction thus described, it will be appreciated that both the pillar and the load-receiving assembly form rigid console structure advantageously adapted to carry exerted forces without any harmful deformation. A vertical load-induces force as a tensile force is effectively applied to the force-input element of the load cell and is there a measure of the weight of the load-receiving assembly. A horizontal pair of forces is transmitted from the load-receiving assembly to the pillar to counter-balance the weight of the load-receiving assembly.

From the foregoing description it will be appreciated that each complete assembled weighing scale module is supported through the pillar and the lower hub flanges by the lower base frame of the weighing machine support frame. In turn, the upper frame of the weighing machine support frame is supported by means of the pillars and the upper hub flanges as parts of the upright support structure. The last and both the base frames form the combined three-dimensional rigid weighing machine support frame having enough rigidity even though any one of the weighing scale modules will be detached from the weighing machine.

From the foregoing description it will be appreciated that the weighing scale module is self-sufficient in sense that it may be fully pre-assembled as a complete unit, includes all of the parts necessary to preload the load cell, to adjust, test, and metrologically verify the weighing scale module. The test and metrological verification of the weighing scale module may be accomplished upon loading a control load and further feeding any relevant ingredient into the load-receiving assembly of the weighing scale module in real modes.

Preloading the load cell prior to assembly of the weighing scale module with the other parts of the weighing machine is easily, quickly, and accurately accomplished by mounting the weighing scale module on the aid carrier or other suitable support floor. A control load, whose amount corresponds to a desired preloaded force, is then hung to the load receiving assembly to apply downward pulling force to the load cell.

Additionally, there is a significant advantage in case of a replacement for the defective weighing scale module in the weighing machine at a customer's site. The replacement weighing scale module is assembled, adjusted, and metrologically verified at the manufacturing plant prior to shipment. This eliminates the need in making an adjustment in the replacement weighing scale module at the customer's site.

In addition, the weighing scale module is self-sufficient particularly in sense that it ensures normal measuring and the overload protection of both the load cell and leaf springs devices at preloading, adjusting, testing and metrological verifying the weighing scale module.

It will be appreciated that described construction gives a significant advantage because, in such form, the weighing scale module is fully transportable as the screw stops are set for zero clearances and the aid beams are attached to both the pillar and the load-receiving assembly over the leaf springs devices. Then the weighing scale module may be advantageously shipped as the fully accomplished unit to the customer to be quickly assembled with other components of the weighing machine. Thus, no adjustments are required at the installation site, and then the preliminary defined necessary clearances may be easy set again.

Moreover, the weighing scale module rigidly assembled with any suitable support floor and supplied with its own digital indicating weight-measuring unit may be used as a completed weighing scale, in which a protection of the load cell and other parts is desired. It will efficiently increase the manufacturing lots of these weighing scale modules provided for both the industrial weighing scales and weighing machines.

The reader will appreciate that the weighing scale modules of such construction give the possibility to build them for the maximal weighing capacities in the wide range approximately of 10 LB–1000 LB, changing only the size of components. Accordingly, for instance, in the weighing machine having the six weighing scale modules, there is the advantageous possibility to achieve the maximal weighing capacities in the range of 60 LB–6000 LB per the weighing machine. Thus, the maximal throughput capacities at three sequenced counting weighing steps may be in the range approximately of 200 LB–20000 LB per a weighing machine work cycle. Accordingly, the maximal throughput capacity of my weighing apparatus consisting of the three weighing machines is substantially large. An adequate change of size of the weighing machine components may be provided, when a change of the weighing machine capacity is desired, but a number of weighing steps is limited.

Reference is now made to FIGS. 12, 13, 14, 15 showing vibratory main ingredient feeder 38 for the weighing machine of a rectangular arrangement. The main ingredient feeder forms a double-sided plurality of flowing streams for feeding all the weighing scale modules upon the counting and combinatorial weighing steps. These flowing streams are of the relatively large throughput for the counting weighing steps and the relative small throughput for the final combinatorial weighing step. Also, the main ingredient feeder forms at least one additional flowing stream of the relatively substantially small throughput for a correctional weighing step, when no the best combination is found in the final combinatorial weighing step for the certain main ingredient.

Who is skilled in the art will particularly appreciate, that the main ingredient feeder requires no additional feeder units to feed the weighing scale modules because it is directly detachably connected to corresponding storage hopper 90a and, through a plurality of ingredients cutoff assemblies 44, to the weighing scale modules. Main ingredient feeder 38 comprises a rectangular bowl 94, which includes a gable-shaped bottom 94a and a partitions 94b fixed along an edge of a gable to form double-sided direction flowing streams. Gable-shaped bottom 94a is of wave-shaped surface formed by a plurality of hollows 94c and adjacent convexities 94d. Each hollow 94c efficiently forms and conveys a single stream of main ingredient towards the corresponding weighing scale module. The convexities decrease the mass of ingredient in the rectangular bowl, increase an overall rigidity of the gable-shaped bottom, and thus increase the throughput capacity of the main ingredient feeder. On opposite flank sides of the rectangular bowl, a plurality of main discharges 94e and a plurality of convex dividers 94f are so disposed that each of the convex dividers overlaps the main discharge and partially the hollow to avoid clogging main discharges 94e or an uncontrollable flowing stream. On gable-shaped bottom 94a, a first auxiliary discharge 94g, forming a stream for the correctional weighing step, and a second auxiliary discharge 94h for the revision of ingredient condition are disposed. Each of the main discharges and the auxiliary discharge are surrounded by a main nozzle 94i and an auxiliary nozzle 94k, respectively, which are attached with corresponding opening of auxiliary cutoff assembly 52 (FIG. 5) to cut off flows of ingredient for the particular occasion and preliminary adjust the throughput capacity of a stream of the main ingredient at the installation site.

To transfer the double-range vibration motional force to the rectangular bowl directly, a centrally positioned rigid flange portion 94j, welded to partitions 94b and the underneath of gable-shaped bottom 94a, is advantageously assembled with a vibratory drive 96. The last includes two unbalancing vibratory motors 96a, 96b of the relatively large and the relatively small centrifugal forces, respectively, a motor plate 96c, a flange unit 96d, a pair of leaf springs devices 96e, and a pair of shock absorbers 96f. Motor plate 96c is attached to unbalancing vibratory motor 96a, flange unit 96d is attached to unbalancing vibratory motor 96b and rigidly fixed to the flange portion 94j to support vibratory drive 96. A pair of leaf springs devices 96e is fixed to motor plate 96c at one end and to flange unit 96d at another end. Shock absorbers 96f are mounted on the flange unit to except an overflexion of the leaf springs when the vibratory drive is switched off. Both the unbalancing vibratory motors are disposed so that their rotational axes are on a vertical symmetry plane of the bowl, and the pair of leaf springs are disposed symmetrically to the motors rotational axis. Those who skilled in the art will appreciate the simplicity and effectiveness such improved vibratory drive. The last, due to transferring the relatively large centrifugal force to the bowl in the longitudinal direction of the leaf springs, advantageously provides ingredient double-sided direction streams of the relatively large throughput strictly linearly from partition 94b towards all main nozzles 94i. Also, to alleviate the late, in flight ingredient problem due to transferring the relatively small centrifugal force to the bowl radially in the circular motion, there are advantageously provided ingredient double-sided direction streams of the relatively small throughput towards all main nozzles 94i and a one stream towards auxiliary nozzle 94k. In addition, it will be appreciated that due to shock absorbers 96f, the leaf springs are preserved from damage, and releasing time of reciprocation is decreased when the vibratory drive is switched off.

In a second embodiment for the rectangular arrangement of the weighing machine as shown in FIGS. 12a, 13a, 14a, and 15a, a main ingredient two-tier feeder is designated by the reference numeral 38a. This feeder is provided to weigh the main ingredient of the adverse specific properties such as the relatively low volumetric density and/or the relatively slow vibratory conveyable velocity. Main ingredient two-tier feeder 38a comprises a two-tier rectangular bowl 98. The latter additionally includes a plurality of upper hollows 98a, disposed over a lower row of hollows 94c and partially overlapped the last, and a plurality of upper discharges 98b, disposed over a lower row of main discharges 94e on flank sides under corresponding convex dividers 94f. A motor plate 98d of a vibratory drive 98c (FIG. 15), in this embodiment, has its natural frequency of oscillations approximately near to the frequency of forced oscillations of the assembled with the motor plate unbalancing vibratory motor mass to increase a vibratory force applied to the bowl.

Those who skilled in the art will appreciate the simplicity and effectiveness such an improved vibratory drive, which, due to resonance magnifying the vibratory motion, advantageously increases the throughput capacity of the two-tier feeder particularly provided for such ingredients, when a doubled number of discharges is not effective.

Turning now to FIGS. 5, 6, and 7. A plurality of modular cutoff assemblies 44 is provided to prevent the late ingredient in flight to influence weighing accuracy. As shown, each cutoff assembly 44, rigidly fixed to upper base frame 58b, is flexible attached to corresponding weighing scale module 36 to pass into the latter in succession one stream of the main ingredient and one stream of a plurality of the incorporated ingredients. Generally, cutoff assembly 44 comprises pivotal gate units 44a mounted in a cup unit 44b comprising inlet pieces 44c, an air duct 44d, and an outlet 44e. Initially, gate units 44a close inlet pieces 44c. To feed a particular ingredient stream into weighing scale module 36, an air drive 44f (FIG. 6) of the relative gate unit automatically will open corresponding inlet piece 44c while another gate unit of this cutoff assembly will close an adjacent inlet piece. Control computer system 56 indicates a position of the pivotal gates of the gate units by sensors (not shown).

The cutoff assembly advantageously alleviates an influence of air pressure upon the weight measuring process, because the air duct is arranged outside the gates area, and a quantity of the cross section of outlet 44e is approximately near to a quantity of the cross section of outlet cap 84h of the load-receiving assembly.

Next, as shown in FIGS. 5, 6, and 7, ingredients discharging device 46, provided to transfer the ingredients batches to a mixer in an efficient manner, includes a common chute 46a and an advantageous intermediate connection 46b. A ceiling portion 46c and both pluralities of inlet pieces 46d and air connecting pipes 46e (FIG. 6) isolate the inner space of the common chute from the environment. Further, the common chute comprise an outlet opening 46f (FIG. 7), an activators 46g, and an exhaust discharge 46h. Each inlet piece 46d is flexible assembled to intermediate connection 46b, and the latter is flexible assembled to related outlet cap 84h of load-receiving assembly 84. Outlet opening 46f is mounted to an inlet of a conveying device or directly to an inlet of a mixer (not shown). The activators are periodically switched on to clean the inner surface of common chute 46a. The exhaust discharge is connected to the exhaust of a common ventilation system (not shown). Intermediate connection 46b advantageously eliminates influence of the common chute vibration or shock and weighing machine support frame yielding or a settlement upon the weight measuring process.

Next, as shown in FIGS. 5, 6, and 7, air collecting device 48 includes a plurality of air tubes 48a. Each of the air tubes is flexible connected to the relative air duct of the ingredients cutoff assembly 54 and the air connecting pipe of the common chute. Thus, surplus air is transferred from the weighing scale module into the common chute, and the weighing scale module is supplied with air, while the weighing scale module are emptied in order to alleviate influence of a variation of the air pressure inside the weighing scale module at the weight measuring process.

Next, dust preventing device 50 includes elastic covers 50a, 50b, . . . 50g and clamping bands 50h, 50i, . . . 50n to prevent the dust particles of the flow of ingredients or air flow with dust particles to exhaust to the environment. The elastic covers and the clamping bands are sealable mounted on the weighing machine freely coupled parts of the storage hoppers, the feeders, the tubes, the cutoff assemblies, the weighing hoppers, the outlet caps, the intermediate connection, and the common chute.

Those who skilled in the art will appreciate that such closed and sealed construction of the weighing machine allows to weigh ingredients of the specific properties in an artificial protectable atmosphere and to wash the outside of the weighing machine parts.

Turning now to the Figures, FIG. 5 shows a plurality of auxiliary cutoff assemblies 52 provided for preliminary adjusting the throughput and cutting off the flowing streams of the main ingredient for the particular situation. Known in the art, the auxiliary cutoff assembly can be any suitable construction, for example, a slide valve device. To feed the main ingredient directly to the corresponding weighing scale module, the inlet of auxiliary cutoff assembly 52 is connected to main nozzle 94i (FIG. 12) of the main ingredient feeder, and the outlet of auxiliary cutoff assembly 52 is connected to tube 54a. The last is connected to the relative inlet piece of ingredient cutoff assembly 44. One of the auxiliary cutoff assemblies through tube 54b is connected to the inlet opening of complementary correctional feeder 42g for feeding the main ingredient into assigned weighing scale module 36.

Those who skilled in the art will appreciate that such a device allows more precisely to adjust the main ingredient feeder and to avoid spilling of an ingredient at the repair work.

Figure 5A:
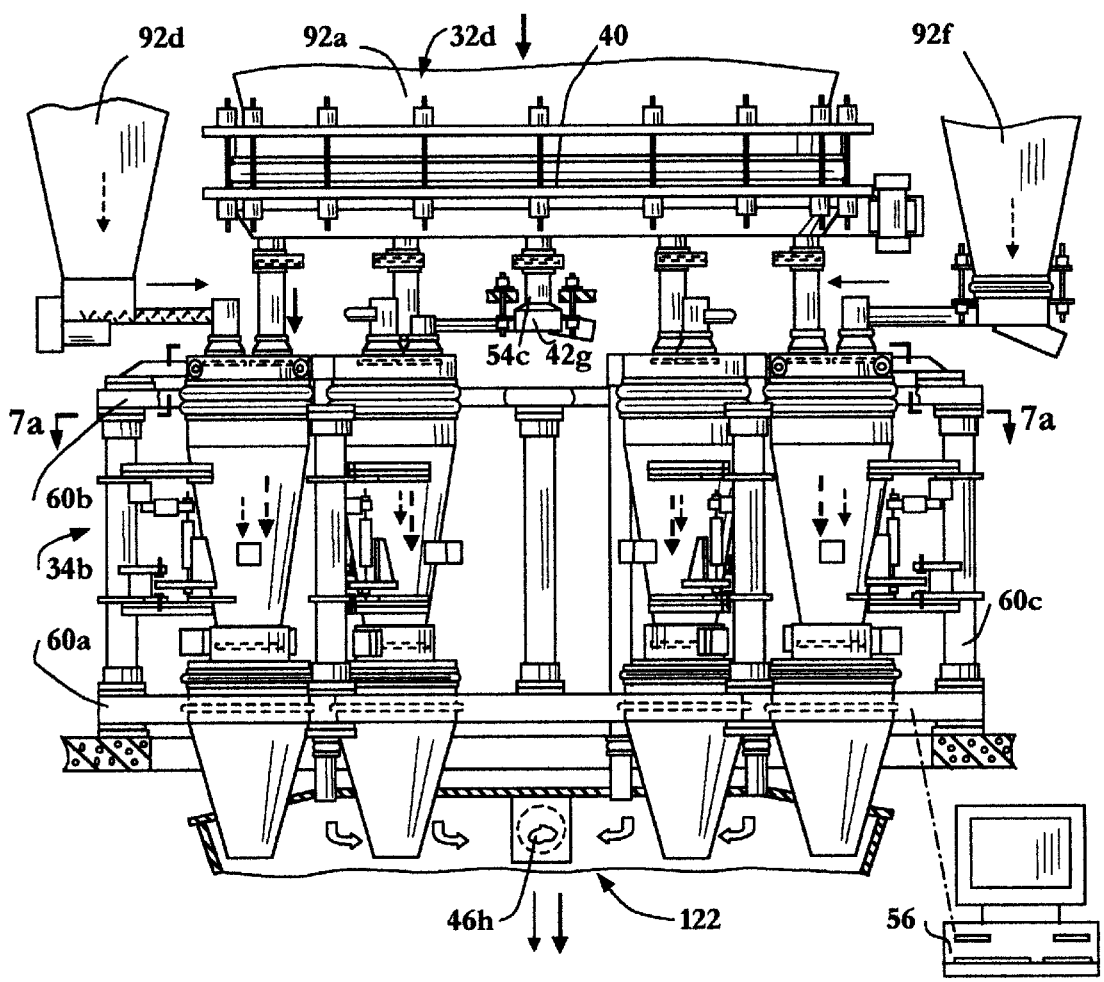
Figure 7A:
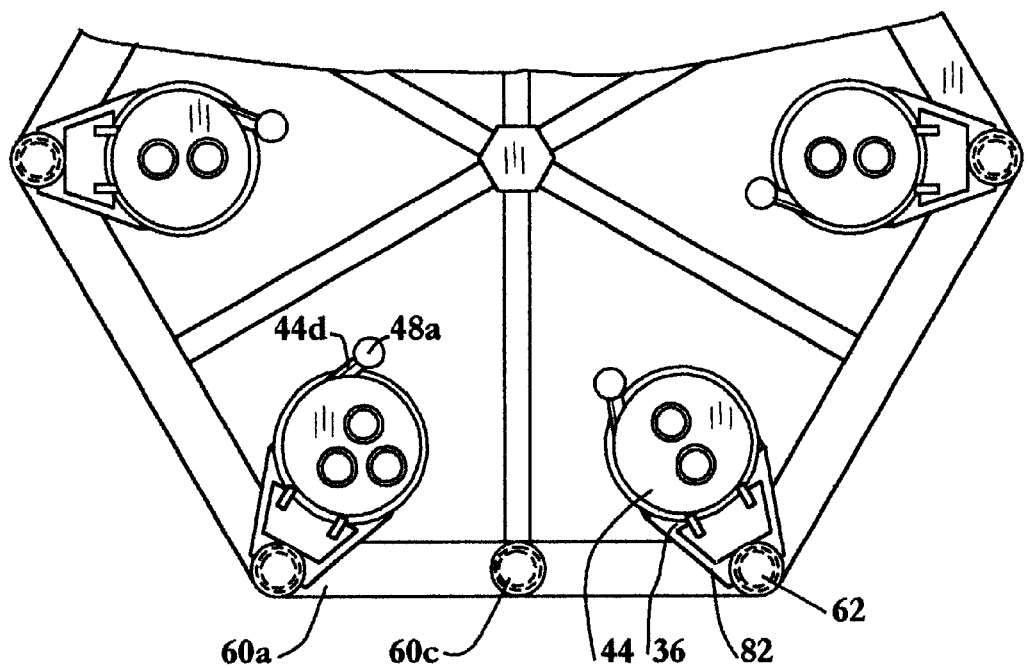

Referring now to FIGS. 5a, 7a, one embodiment incorporating the principles of my method and apparatus is in the form of a circular arrangement of a weighing machine 32d. The latter comprises a circular rigid support frame 34b with a lower and an upper base frames 60a, 60b connected by a rigid upright support structure 60c, a circular vibratory main ingredient feeder 40, a complementary correctional feeder 42g connected with main ingredient feeder 40 through tube 54c, and a circular ingredients discharging device 122. Those who skilled in the art will appreciate that such an embodiment, adopted the main parts of the rectangular arrangement of the weighing machine, allows the customers to choose the weighing apparatus suitable to particular arrangement of the technology equipment.

Figure 12B:
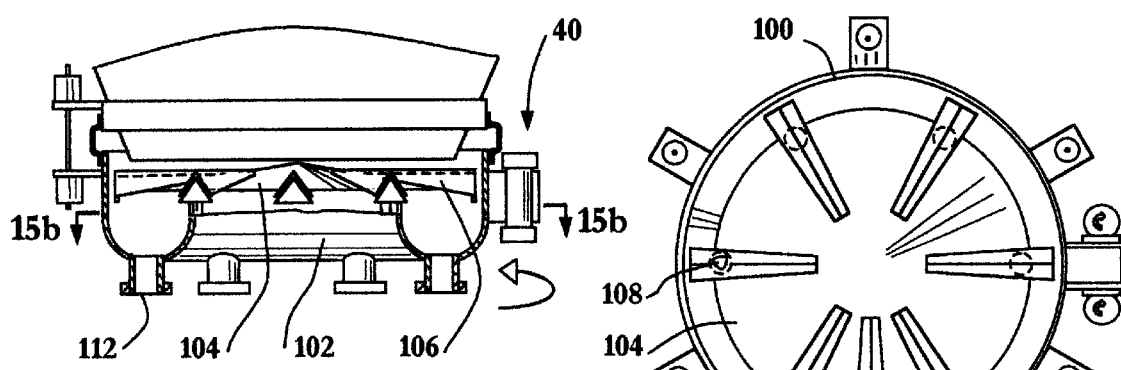
FIG. 12b is a front elevational sectional view of a circular main ingredient feeder for the circular arrangement of the weighing machine.
Figure 14B:
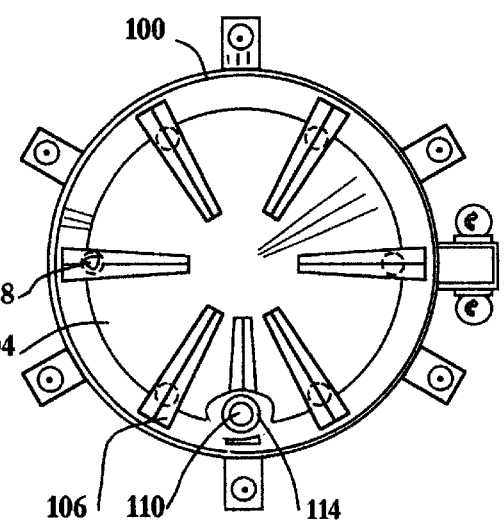
FIG. 14b is a top view of the circular main ingredient feeder shown in FIG. 12b, detailing a circular bowl.
Figure 15B:
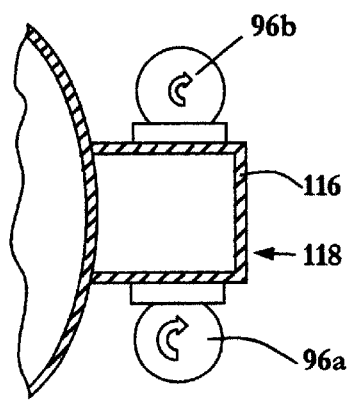
FIG. 15b is a partial cross-sectional view taken along the plane of line 15b—15b in FIG. 12b and detailing a vibratory drive.

Accordingly, referring now to FIGS. 12b, 14b, 15b, a third embodiment of the main ingredient feeder is provided for the circular arrangement of the weighing machine. Main ingredient feeder 40 comprises a welded circular bowl 100 circularly reciprocated by a vibratory drive 118. An inner edge of a tore-shaped bottom 102 of the circular bowl connected to a convex cap 104 having a plurality of dividers 106 disposed radially and consolingly on an edge of the upper side of the convex cap. At the lower part of tore-shaped bottom 102, main discharges 108 and an auxiliary discharge 110 are disposed to pass the streams of the main ingredient to the weighing scale modules. Dividers 106 overlap the discharges to avoid clogging them or uncontrollable flowing streams. Each of a plurality of main nozzles 112 and an auxiliary nozzle 114, surrounding main discharges 108 and auxiliary discharge 110, respectively, is attached with corresponding opening of auxiliary cutoff assembly 52 (FIG. 5). A rigid flange element 116 is welded to circular bowl 100 to assemble a vibratory drive 118 and directly transfer vibration motional force to the circular bowl. Vibratory drive 118 having unbalancing vibratory motors 96a, 96b of the relatively large and the relatively small centrifugal force, respectively, advantageously provides the double range throughput capacity for main ingredient feeder 40. The vibratory motors are disposed so that their motor rotational axes are vertical and parallel to the vertical symmetry plane of the bowl. To alleviate the late, in flight ingredient problem, main ingredient feeder 40 is set at the relatively small throughput by switching on unbalancing vibratory motor 96b. Besides, the former advantageously is so arranged, that each discharges 108 is disposed near the vertical axis of the corresponding weighing hopper of the weighing scale module, whereby require no an additional feeder device to feed the weighing scale module.

Figure 16:
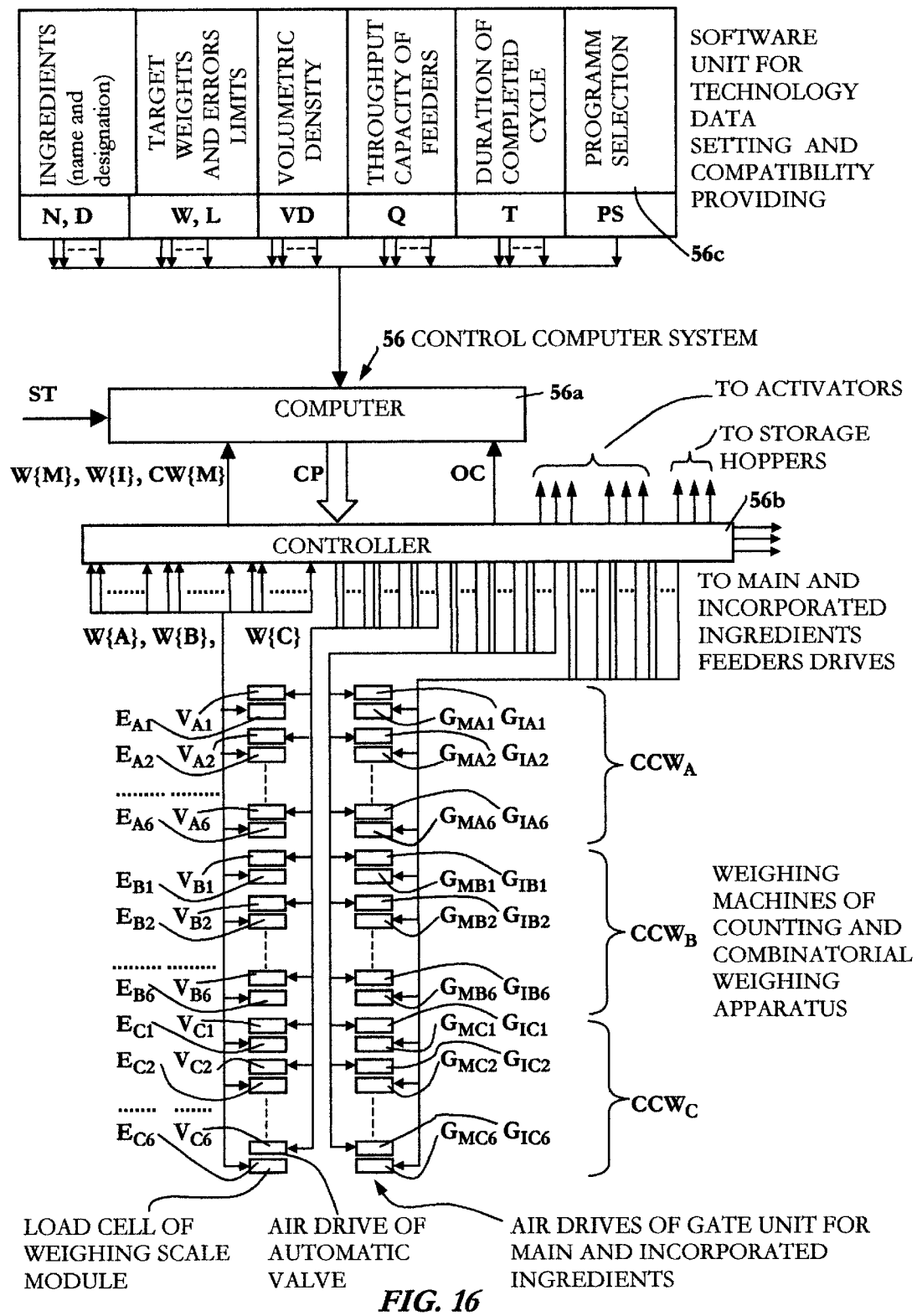
FIG. 16 is a block diagram of the counting and combinatorial weighing apparatus for practicing the method and system of the present invention.

A block diagram of the counting and combinatorial weighing apparatus of FIGS. 4 and 4a for practicing the method and system of the present invention is illustrated in FIG. 16 and shows the circuitry connecting the control computer system to the weighing system. Control computer system 56 is constituted by a computer 56a, a controller 56b, and a software unit 56c or the like. Through the software unit, an operator enters a technology data, which will be stored into the memory of computer 56a.

Control computer system 56 is adapted to store pluralities of weight values W {M} and W {I} according to pluralities of signals W {A}, W {B}, W {C} for each of the main (M) and incorporated (I) ingredients of groups A, B, C provided by load cell sensors $E_{A1}$, $E_{A2}$, . . . $E_{A6}$ of the weighing scale modules of weighing machine $CCW_A$, by load cell sensors $E_{B1}$, $E_{B2}$, . . . $E_{B6}$ of the weighing scale modules of weighing machine $CCW_B$, and by load cell sensors $E_{C1}$, $E_{C2}$, . . . $E_{C6}$ of the weighing scale modules of weighing machine $CCW_C$, respectively, to count the target weights, the total weights, and errors, to inspect errors for each of the M- and I-ingredients, and to find the best combination for each of the M-ingredients of groups A, B, C by computing the combinations based on target values set in the technology data base of computer 56a in the same method as described in connection with FIGS. 1, 2,3, and to store the best combination. When no the best combination is found for any one of the M-ingredients of groups A, B, C, the computer counts the correctional target weight and provides the correctional weighing step by the particular assigned weighing scale module and the complementary correctional feeder.

Before to initiate a weighing cycle of the weighing apparatus, controller 56b obtains and collects all the information about weighing system components, particularly from the sensors of: load cells, automatic valves, main and incorporated ingredients gate units, storage hoppers. Particularly, the information from the load cells sensors is in form of pluralities of the weighing analog signals W {A}, W {B}, W {C}. Controller 56b process these signals, as pluralities of the weighing digital signals W {M} or W {I}, and applies them and the relative signal operation condition OC to computer 56a. When the external start signal ST from the mixer or the like arrives, computer 56a applies the relative control command CP to initiate the weighing cycle to controller 56b. The last responds by opening the gate units of the M-ingredients (by switching on all air drives $G_{MA1}$, $G_{MA2}$, ... $G_{MA6}$; $G_{MB1}$, $G_{MB2}$, ... $G_{MB6}$; $G_{MC1}$, $G_{MC2}$, ... $G_{MC6}$) and switching on unbalancing vibratory motor 96a of the relatively large centrifugal force of the main ingredient feeders drives (not shown). As all the M-ingredients are fed into relative the weighing scale modules, pluralities of weight actual values W {A}, W {B}, W {C} from all the load cell sensors are transferred to the controller for processing and further storing in the memory of computer 56a as a plurality of weight values W {M} of the M-ingredients. The computer, when any weight actual value equals the partial batch target weight for the M-ingredient, applies the relative control command CP to stop to feed the particular weighing scale module to controller 56b. The last responds by closing the gate unit of the M-ingredients (by switching off the corresponding air drive $G_{Mi}$) Computer 56a, when all weight actual values equal the corresponding target weights, and all the gate units of the M-ingredients are closed, applies the relative control command CP to stop the first counting weighing step to controller 56b. The last responds by sequenced switching off unbalancing vibratory motors 96a, opening the automatic valves of the weighing scale modules of the weighing machines $CCW_A$, $CCW_B$, $CCW_C$ (by switching on all the air drives $V_{A1}$, $V_{A2}$, ... $V_{A6}$; $V_{B1}$, $V_{B2}$, ... $V_{B6}$; $V_{C1}$, $V_{C2}$, $V_{C6}$), and further closing these automatic valves. According to a counted number of the counting weighing steps, the computer repeats the described counting weighing step constantly counting and storing the new values of the target weights, totals, and errors. Meanwhile, the controller constantly applied a plurality of the weighing signals W {M}, based on the weighing signals from the weighing machines $CCW_A$, $CCW_B$, $CCW_C$, and the signal OC to the computer.

As all the k counting weighing steps are finished, and all errors, the total weights, and the final combinatorial target weights are counted and stored by computer 56a, the last applies the relative control command CP to initiate the weighing step for I-ingredients to controller 56b. The last responds by opening the gate units of the I-ingredients (by switching on all the air drives $G_{IA1}$, $G_{IA2}$, ... $G_{IA6}$; $G_{IB1}$, $G_{IB2}$, ... $G_{IB6}$; $G_{IC1}$, $G_{IC2}$, ... $G_{IC6}$) and switching on all I-ingredient feeders drives. For this weighing step, all the I-ingredients are weighed according to the program selection mode of the technology data and the initial target weights counted by the computer. As all I-ingredients are fed into the relative weighing scale modules, pluralities of weight actual values W {A}, W {B}, W {C} from all the load cell sensors are transferred to controller 56b for processing and further storing in the memory of computer 56a as a plurality of weight values W {I} of the I-ingredients. When any weight actual value equals the batch target weight for the I-ingredient, computer 56a applies the relative control command CP to stop to feed the particular weighing scale module to controller 56b. The last responds by closing the related gate unit of the I-ingredient (by switching off the corresponding air drive $G_{Ii}$) and switching off the corresponding I-ingredient feeder drive. Computer 56a, when all weight actual values equal the corresponding target weights, and all the gate units of the I-ingredients are closed, applies the relative control command CP to stop this weighing step to controller 56b. The last responds by sequenced opening the automatic valves of the weighing scale modules of the weighing machines $CCW_A$, $CCW_B$, $CCW_C$ and further closing these automatic valves as described above.

As this weighing step is finished, and all errors and the total weights of the I-ingredients are counted and stored by computer 56a, the last applies the relative control command CP to initiate the final combinatorial weighing step for the M-ingredients to controller 56b. The controller responds by opening the gate units of the M-ingredients and switching on unbalancing vibratory motors 96b of the relatively small centrifugal force of all the main ingredient feeders drives. As all the M-ingredients are fed into the relative weighing scale modules, pluralities of weight actual values W {A}, W {B}, W {C} from all the load cell sensors are transferred to the controller 56b for processing and further storing as pluralities of weight values CW {M} of the M-ingredients in the memory of computer 56a. The last, when any weight actual value equals the combinatorial partial batch target weight for the M-ingredient, applies the relative control command CP to stop to feed the particular weighing scale module to controller 56b. The last responds by closing the related gate unit of the M-ingredients (by switching off the corresponding air drive $G_{Mi}$). Computer 56a, when all weight actual values equal the corresponding combinatorial partial batch target weight, and all the gate units are closed, applies the relative control command CP to stop the final combinatorial weighing step and initiate the combinatorial selection to controller 56b. The last responds by switching off unbalancing vibratory motors 96b.

When all weight values CW {M} are stored in computer 56a, the latter searches, for each of the M-ingredients, the best combination of the combinatorial partial batches. The best combination, combining the previous total weight with weights actual values of the selected combinatorial partial batches, gives the final total equal to, slightly less or slightly more than the corresponding fractional target weight. The computer stores the ordinal numbers of the weighing scale modules containing the selected combinatorial partial batches, a combined quantity of the M-ingredient in them, and the final total. For each of the M-ingredients, according to the best combination of the combinatorial partial batches, the controller responds by opening and further closing the automatic valves of the selected weighing scale modules of the weighing machines $CCW_A$, $CCW_B$, $CCW_C$.

When no the best combination is found for the M-ingredients of groups A, B, C, computer 56a applied the command to initiate a correctional weighing step to the controller. The last responds by opening and further closing the automatic valve of the predetermined weighing scale module in the selected for this operation particular weighing machine. Computer 56a, according to weight values obtained after discharging the predetermined weighing scale module, counts the new total and the correctional partial batch target weight and applies the command to finish the correctional weighing step to the controller. The last switches on, in the selected for this operation particular weighing machine, vibratory drives of both the main ingredient feeder and the complementary correctional feeder to feed the predetermined weighing scale module. As the particular M-ingredient is fed into the relative weighing scale module, a weight actual value from the load cell sensor is transferred to controller 56b as the correctional weight value of the M-ingredient for processing and further storing in the memory of computer 56a. The last, when this weight actual value equals the correctional partial batch target weight, applies the relative control command CP to stop to feed the particular weighing scale module to controller 56b. The last responds by switching off vibratory drives of both the main ingredient feeder and the complementary correctional feeder and by opening and further closing the automatic valve of the predetermined weighing scale module in the selected weighing machine.

Figure 17A:
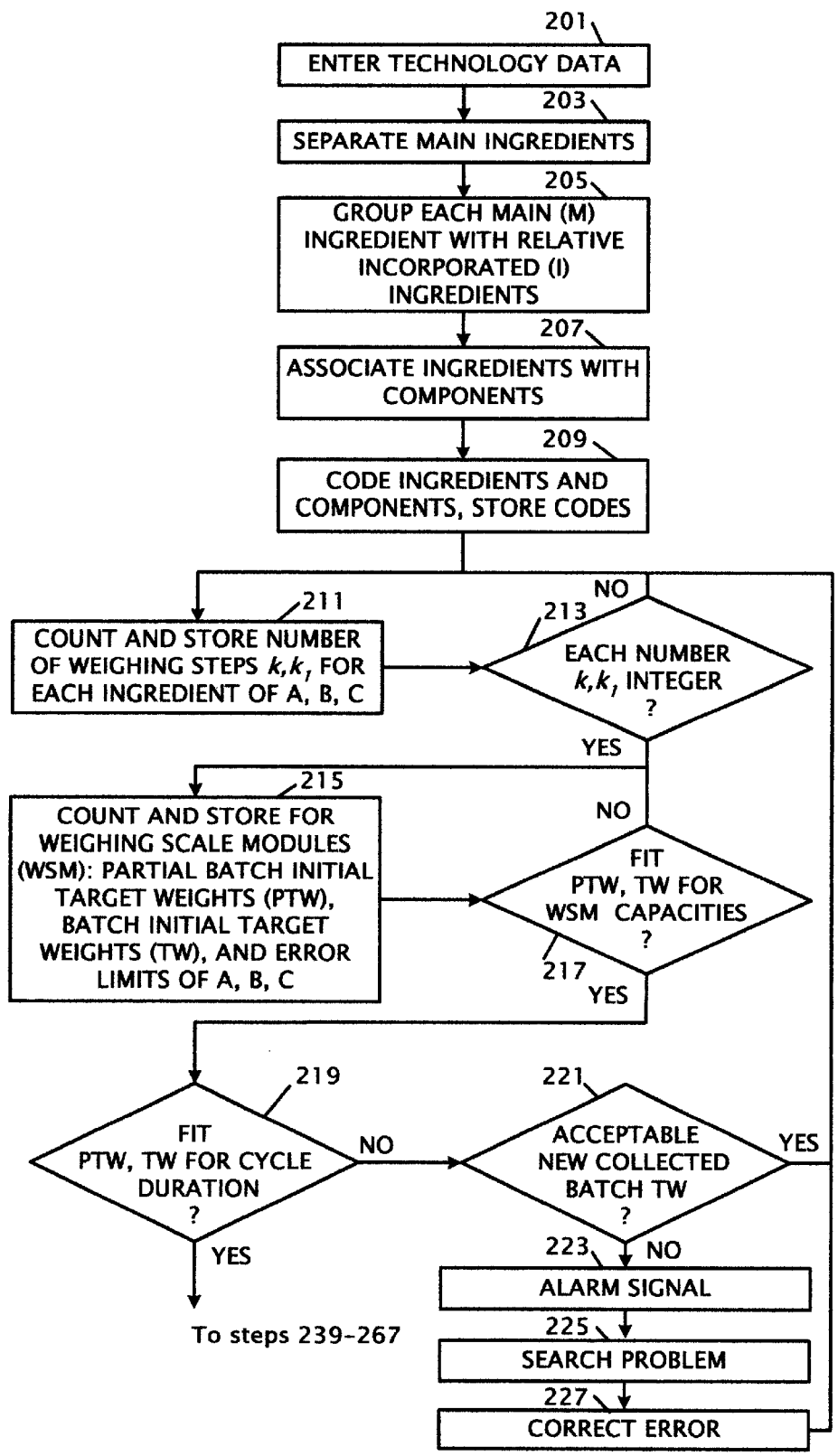

FIGS. 17a–17e are flowchart in detail illustrating a method, by which the counting and combinatorial weighing apparatus operates. Initially, as indicated in FIG. 17a, through the software, an operator enters (step 201) the technology data, which will be stored in the memory of the computer. The name and designation of each of a plurality of all the M- and I-ingredients, each of the corresponding batch fractional target weights, the collected batch target weight, and the volumetric density of each of the M- and I-ingredients are entered according to the formula or prescription of a mixture. The allowable limits of an error of an actual value of the corresponding batch fractional weight and the allowable limits of an error of an actual value of the collected batch weight, the throughput capacity of each of the feeders, the duration of the completed weighing cycle, and a program selection are entered according to the demand of the technology process. The program selection comprises a sequence of operations and a number of the weighing scale modules selected for the combinatorial process. For my particular weighing system, this number equals two. A sequence of weighing and discharging steps for each ingredient and for each of the weighing machines is predetermined in one of the two prime modes: Maximal Filling and Maximal Blending.

In accordance with a first embodiment of my method, the Maximal Filling mode corresponds to a minimal number of weighing steps for each of the M- and I-ingredients, when each of the factional target weights for the I-ingredients is less than the maximal weight capacity of the corresponding weighing scale module. At this mode, each of all the I-ingredients is weighed by the single batch upon the completed weighing cycle before the final combinatorial weighing step for the M-ingredient. If the factional target weight for at least one the I-ingredient is more than the maximal weight capacity of the corresponding weighing scale module the computer shifts the Maximal Filling mode into the Maximal Filling-1 sub mode. At the latter in accordance with a second embodiment of my method, at least one of the I-ingredients is weighed by the partial batches two or more times upon the completed weighing cycle before the combinatorial weighing step of the M-ingredient In accordance with a third embodiment of my method, the Maximal Blending mode corresponds to the same number of weighing steps for each of the M- and I-ingredients, even though each of the fractional weights of the I-ingredients is less than the maximal weight capacity of the corresponding weighing scale module. For this mode, if the counted partial batch target weight for any of the I-ingredients is less than the minimal weight capacity of the corresponding weighing scale module, the computer shifts the Maximal Blending mode to the Maximal Blending-1 sub mode. Then, at least one I-ingredient is weighed at a number of weighing steps less than a number of weighing steps of the M-ingredient upon the completed weighing cycle. If at least one I-ingredient must be weighed at once upon the completed weighing cycle, the computer, accordingly, shifts chosen the Maximal Blending mode into the Maximal Filling-1 sub mode. From the entered data, the computer separates (step 203) all the M-ingredients as having greater weight values to form groups A, B, C of ingredients. These groups correspond to the weighing machines $CCW_A$, $CCW_B$, $CCW_C$ arranged in order of reducing the weight capacity. Next, the computer groups (step 205) each of the M-ingredients, namely AM, BM, CM with the corresponding part of a plurality of the I-ingredients, namely AI, BI, CI. The I-ingredients are combined successively in order of reducing weight values and in accordance with a number of the weighing scale modules set in the design data base of the computer for each of the weighing machines. Thus, three groups of ingredients, namely A, B, C are performed. Each group is constituted of one of the ingredients AM, BM, or CM and of one corresponding plurality of the ingredients AI, BI, or CI. Next, the computer associates (step 207) each of the groups A, B, C with the related weighing machine, the particular weighing scale modules of this weighing machine, storage hoppers, feeders, and gate units. Next, the computer codes (step 209) all the ingredients and components of the weighing system within each of the groups according to the index of the group (the weighing machine), ingredient, and the number of the weighing scale module in the relative weighing machine. Particularly, these codes are related with the suitable designations of the M- and I- ingredients, namely AM, BM, CM; and $AI_1, AI_2, \ldots AI_6$; $BI_1, BI_2, \ldots BI_6$; $CI_1 CI_2, \ldots CI_6$, respectively. All these codes are compatible with the related addresses for the commands and the circuits, provided by the computer and the controller. These codes are stored in the internal memory of the computer to model, operate and remodel the weighing system, according to the conditions of the industrial technological process, initially and upon a change in these conditions, respectively.

For the advanced weighing system, these codes will be able to be utilized in a recognizing unit and a visible representation unit of the computer for the current information of the weighing process. These units, if such being provided, are to identify controlled components of the weighing system, to monitor and display an actual condition of the controlled components, to monitor and display the weighing signals of the weighing scale modules and other information of the weighing process.

Next, the computer counts and further stores (steps 211) numbers k of the counting weighing steps for the ingredients AM, BM, CM and $k_1$ for the ingredients $AI_1, AI_2 \ldots AI_6$; $BI_1, BI_2 \ldots BI_6$; $CI_1, CI_2 \ldots CI_6$, respectively, to obtain the batch predetermined fractional target weights for these ingredients for each of the groups A, B, C in the collected batch. A number k is equal to a value of the batch fractional target weight for the particular M-ingredient divided by both a number n of the weighing scale modules in the relative weighing machine $CCW_A$, $CCW_B$, or $CCW_C$ and a value $W_{max}$ of the maximal limit of the weighing range of the relative weighing scale module. The values $W_{max}$ are stored in the design data base of the computer. A number $k_1$ is equal to a value of the batch fractional target weight for the particular I-ingredient divided by the value $W_{max}$ of the maximal limit of the weighing range of the relative weighing scale module. The computer inspects (steps 213) whether all numbers k and $k_1$ are integers. Otherwise, the computer repeats steps 211 to change into the near greatest integers those numbers of k and $k_1$, that are not whole numbers. Thus, the near greatest integers $k \geq 2$ for the ingredients AM, BM, CM and $k_1 \geq 1$ for the ingredients $AI_1, AI_2 \ldots AI_6$; $BI_1, BI_2 \ldots BI_6$; $CI_1, CI_2 \ldots CI_6$ are obtained and further stored in the internal memory of the computer. The last proceeds the Maximal Filling mode, when all the $k_1=1$, and shifts the Maximal Filling mode into the Maximal Filling-1 sub mode for that weighing machine, where the $k_1>1$. Otherwise, an operator can execute the Maximal Blending mode ($k_1=k$) to weigh the partial batches of any ingredients AI, BI, CI of a substantially lesser value than a value $W_{max}$ of the maximal limit of the weighing range.

Next, for all the modes, the computer counts and further stores (step 215) in the internal memory the partial batch initial target weights for the ingredients AM, BM, CM of the groups A, B, C for all the weighing machines. Each of these values is equal to a 1/(kn) part of the difference between the corresponding batch predetermined fractional target weight and an insuring quantity ($cW_{min}+\Delta$) sufficient for providing the final combinatorial weighing step, where:

n is a number of the weighing scale modules of each of the corresponding weighing machines;

c is a number of the weighing scale modules selected for the combinatorial process;

$W_{min}$ is a value of the minimal limit of the weighing range for the corresponding weighing scale module; and $\Delta$ is a forecasting total value of a positive error of weighing at once on all of the weighing scale modules of the corresponding weighing machine before discharging counted by the computer as a value equal to the product of the naP; where:

a is averaging coefficient of reducing a value of a total error for weighing at once in all the n weighing scale modules of the weighing machine;

P is a value of the allowable limit of a positive weighing error before discharging of the weighing scale module.

By default, a number c of the weighing scale modules selected for the combinatorial process equals two. Accordingly, the insuring quantity is equal to a sum of the doubled value of the minimal limit of the weighing range for the associated weighing scale modules and the forecasting total value of a positive weighing error before discharging in all the weighing scale modules of the corresponding weighing machine. All these parameters are set in the design database of the weighing system.

Next, for the Maximal Filling mode the computer counts and further stores in the internal memory the batch initial target weights for the ingredients $AI_1$, $AI_2$, ... $AI_6$; $BI_1$, $BI_2$, ... $BI_6$; $CI_1$, $CI_2$, ... $CI_6$ of the groups A, B, C for all the weighing machines ($k_1=1$). Each of these values is equal to the difference between the related batch fractional target weight and forecasting value of a positive weighing error in the relative weighing scale module of the corresponding weighing machine. Specifically for the Maximal Filling-1 sub mode, the computer counts and stores the batch initial target weights for some of the ingredients $AI_1$, $AI_2$ ... $AI_6$; $BI_1$, $BI_2$ ... $BI_6$; $CI_1$, $CI_2$ ... $CI_6$ of the groups A, B, C ($k_1=1$) just as described above and for at least one of these I-ingredients the partial batch initial target weight ($k_1 \geq 2$) as a $1/k_1$ part of the value of the related batch fractional target weight.

Next, for the Maximal Blending mode, the computer counts and further stores in the internal memory the partial batch initial target weights for all the ingredients $AI_1$, $AI_2$, ... $AI_6$; $BI_1$, $BI_2$, ... $BI_6$; $CI_1$, $CI_2$, ... $CI_6$ of the groups A, B, C for all the weighing machines ($k_1=k$) as a 1/k part of a value of the related batch fractional target weight. Specifically for the Maximal Blending-1 sub mode, the computer counts and further stores in the internal memory the partial batch initial target weights for some of the ingredients $AI_1$, $AI_2$, ... $AI_6$; $BI_1$, $BI_2$, ... $BI_6$; $CI_1$, $CI_2$, ... $CI_6$ of the groups A, B, C for all the weighing machines just as described above and for at least one of these I-ingredients ($k_1 \geq 2$) as a $1/k_1$ part of a value of the related batch fractional target weight.

Next, the computer counts and stores the error limits for actual values of the ingredients partial batch weights and batch weights. These limits are counted according to the desired allowable limits of errors of the corresponding batch fractional weight and the collected batch weight set into technology data base.

Next, the computer advantageously inspects (step 217) the counted partial batch and batch initial target weights dividing them by a value of the corresponding ingredient volumetric density and comparing with the corresponding weighing scale module volume capacity. If any of the comparing values for the M-ingredients is more than the particular volume capacity, the computer increases an integer k by 1 and counts the new partial batch initial target weight. Accordingly, a new integer k and a new partial batch initial target weight value are stored in the computer internal memory. If any of the comparing values for the I-ingredients is more than the particular volume capacity, the computer increases an integer $k_1$ by 1 and counts a new partial batch initial target weight. Accordingly, a new integer $k_1$ and a new partial batch initial target weight value are stored in the computer internal memory, and the computed mode is shifted to the accordable. Also, the computer advantageously inspects the counted partial batch and batch initial target weights for the I-ingredients comparing against the corresponding value $W_{min}$ of the minimal limit of weighing range. If any of the comparing values for the I-ingredients is less than the particular value $W_{min}$, the computer decreases an integer $k_1$ by 1 and counts a new partial batch initial target weight. Accordingly, a new integer $k_1$ and a new partial batch initial target weight value are stored in the computer internal memory, and the computed mode shifted to the accordable.

Next, the computer inspects (step 219) whether the counted partial batch initial target weights and the batch initial target weights are acceptable for the duration of each of the weighing steps and the completed cycle. Values of the duration are counted based on the relative feeder throughput capacity, weight values, and the predetermined duration of the completed cycle set in technology data base. If all the inspected parameters are acceptable, the computer proceeds next counting weighing steps successfully to obtain the substantially large part of the M-ingredients batch weight. Otherwise, the computer requires (step 221) to permit to count and store new acceptable reduced weight values and repeats steps 211–219, if an operator gives the permit. Otherwise the computer produces (step 223) an alarm signal, searches (step 225) the problem to correct an error. As operator corrects (step 227) an error, the computer repeats steps 211–219.

As all the start parameters of the weighing system are produced, checked and finally stored, the controller switches on the load cell of each of all the weighing scale modules to obtain zero signals. These signals are entered into the computer to be checked. Then the controller checks all the sensors of weighing hoppers, ingredients cutoff assemblies, storage hoppers and forms the combined operation condition signal OC (Weighing System Ready). The last enters into the computer to start the counting and combinatorial weighing cycle, and the last starts, when a mixer start signal arrives (these routine steps are not shown).

Figure 17B:
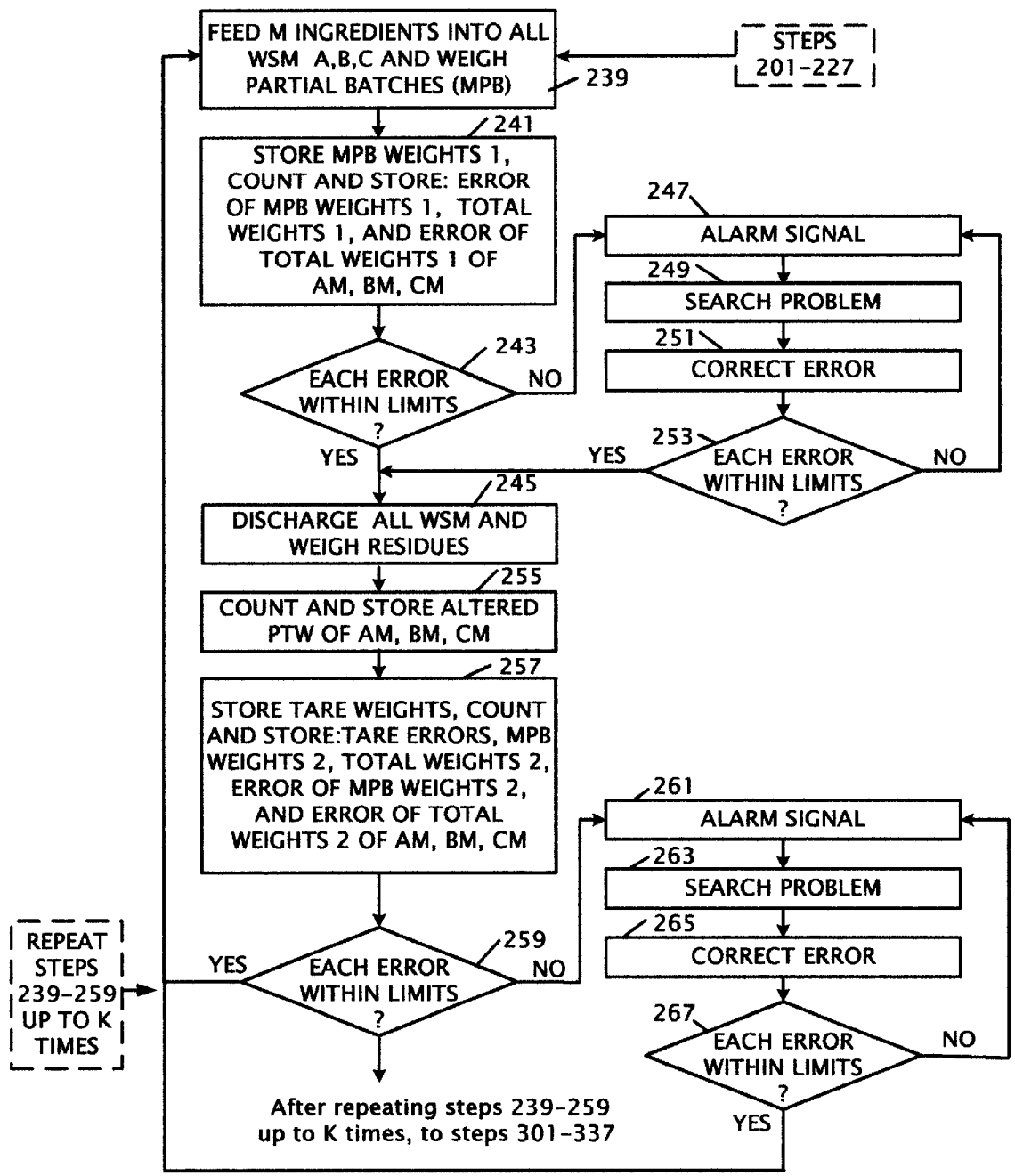

Accordingly, during the step 239 indicated in FIG. 17b, the ingredients AM, BM, CM are fed simultaneously into all the corresponding weighing scale modules of the weighing machines and weighed to obtain the partial batches according to the counted initial target weights. When any current weight value of pluralities W {M} equals the initial target weight the computer via the controller stops feeding, and a weight actual value is registered to be stored. The computer stores (step 241) all weight actual values of pluralities W {M}, counts and stores error values of the partial batch weights, each as the difference between the relative registered weight and the target weight, all the total weights of the ingredients AM, BM, CM, and error values of the total weights. The computer checks (step 243) errors then, if all error values correspond to the allowable limits, proceeds (step 245) to discharge all the weighing scale modules of the weighing machines and to weigh each residue within all the weighing scale modules, counts and stores (step 255) values of the partial batches altered target weights. Each of these altering quantities is equal to a 1/n part of the sum of counted errors in all the weighing scale modules for each of the corresponding weighing machine before discharging. Otherwise, the computer produces (step 247) an alarm signal, searches (step 249) the problem to correct an error. As an operator corrects (step 251) an error, the computer checks (step 253) again whether error values correspond to the allowable limits, and then proceeds step 245. The computer stores (step 257) all tare weights actual values, counts and stores tare errors values, the partial batches weights, errors of the partial batch weights, each as the difference between a relative error registered before discharging and the tare weight, all the total weights of the ingredients AM, BM, CM, and error values of total weights. The computer checks (step 259) errors and then repeats steps 239–259 up to k times, if all error values correspond to the allowable limits. Besides, the computer counts and stores new values according to the new obtained parameters of the weighing process in accordance with the described method. Otherwise, the computer produces (step 261) an alarm signal, searches (step 263) the problem to correct an error. The computer corrects (step 265) an error via the controller switching on the activator of the weighing scale module. Next, the computer checks (step 267) again whether error value corresponds to the allowable limits and then repeats steps 239–259 up to k times.

Figure 17C:
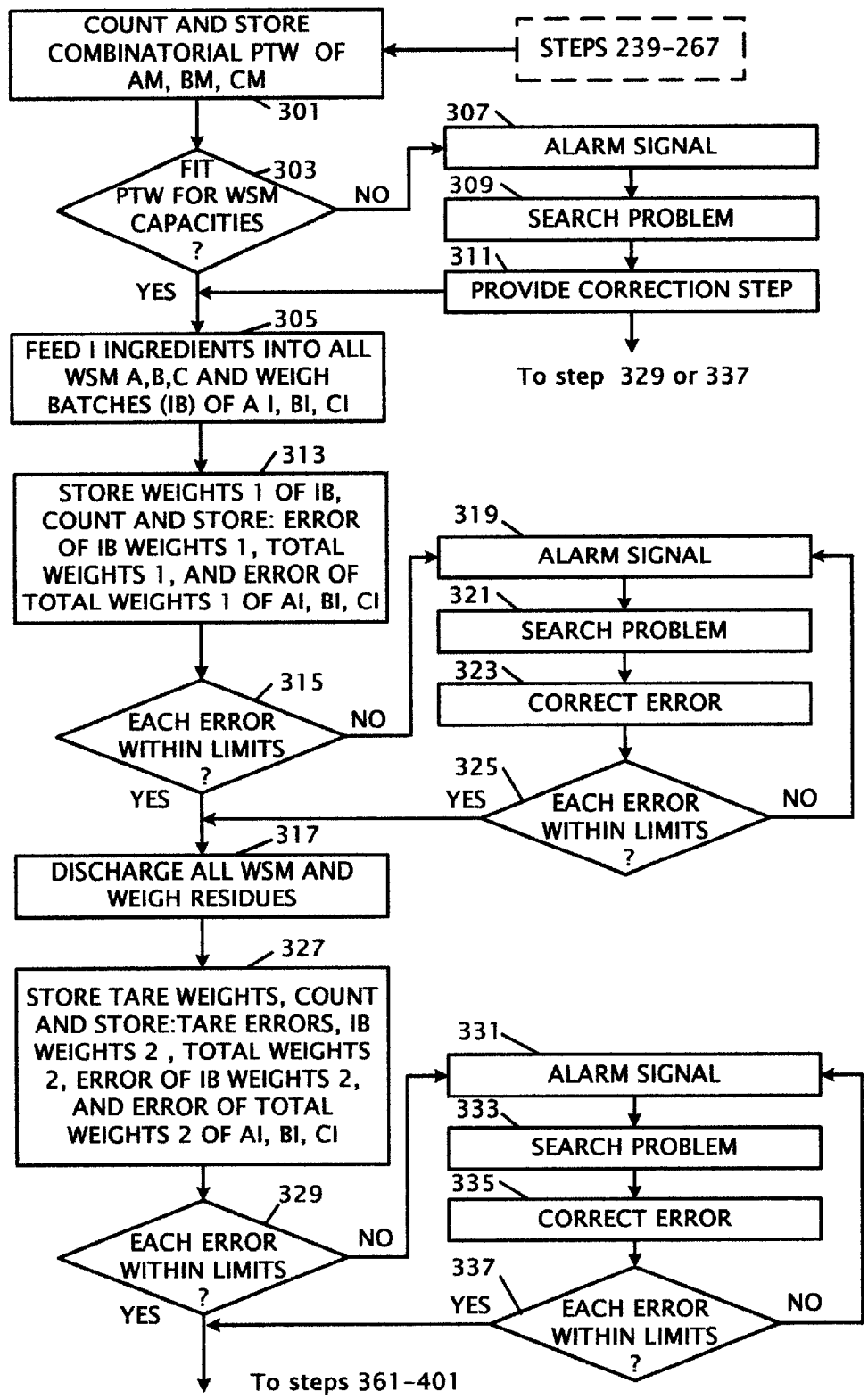

As shown in FIG. 17c, when the substantially large part of the collected batch weight is successfully obtained, the computer counts and stores (step 301) the combinatorial partial batch target weights for all the ingredients AM, BM, CM. Each of these values equals a 1/c part of the difference between the batch fractional target weight for the corresponding M-ingredient and the total weight counted in step 257. A number c of the selected weighing scale modules for the combinatorial process in each of the weighing machines for my particular weighing apparatus equals two. Next, the computer checks (step 303) these values comparing against the corresponding value $W_{min}$ of the minimal limit of weighing range. If any of these values is equal to or more than corresponding value $W_{min}$, the weighing system is ready to obtain the I-ingredients batches weights during a step 305. If any of these values is less than the corresponding value $W_{min}$, the computer produces (step 307) an alarm signal, searches (step 309) the problem, and forms (step 311) the command to provide the correctional step manually after steps 329 or 337. Accordingly, all the I-ingredients are fed (step 305) simultaneously into all the corresponding weighing scale modules of the weighing machines and weighed according to the counted initial target weights. When any current weight value of pluralities W {I} equals the initial target weight, the computer via the controller stops feeding, and a weight actual value is registered to be stored. The computer stores (step 313) all weight actual values of pluralities W {I}, counts and stores error values of the batch weights, each as the difference between the relative registered weight and the fractional target weight, all the total weights, and error values of the total weights. The computer checks (step 315) errors, and then all the weighing scale modules of the weighing machines are discharged (step 317), and each residue within all the weighing scale modules is weighed, if all error values correspond to the allowable limits. Otherwise, the computer produces (step 319) an alarm signal, searches (step 321) the problem to correct an error. As an operator corrects (step 323) an error, the computer checks (step 325) again whether the error value corresponds to the allowable limits and then proceeds step 317. Next, the computer stores (step 327) all tare weights actual values, counts and stores tare errors values, the batch weights, errors of the batch weights, each as the difference between a relative error registered before discharging and the tare weight, all the total weights, and error values of the total weights. The computer checks (step 329) errors, and then proceeds the final combinatorial weighing steps to obtain the M-ingredients batches weights, if all error values correspond to the allowable limits. Otherwise, the computer produces (step 331) an alarm signal, searches (step 333) the problem to correct an error. The computer corrects (step 335) an error via the controller switching on the activator of the weighing scale module. Next, the computer checks (step 337) again whether the error value corresponds to the allowable limits and then proceeds to start the combinatorial process or execute manual correction.

Accordingly, during the step 361 indicated in FIG. 17d, the ingredients AM, BM, CM are fed simultaneously into all the weighing scale modules of the weighing machines and weighed advantageously to obtain the partial batches according to the counted combinatorial partial batch target weights. When any current weight value of pluralities W {M} equals the combinatorial partial batch target weight, the computer via the controller stops feeding, and a weight actual value is registered to be stored. The computer stores (step 363) all weight actual values, counts and stores errors of weight actual values. The computer checks (step 365) errors and then proceeds next combinatorial weighing step namely 367a, or 367b, or 367c, if all error values correspond to the allowable limits. Otherwise, the computer produces (step 369) an alarm signal, searches (step 371) the problem to correct an error. As an operator corrects (step 373) an error, the computer checks (step 375) again whether the error value corresponds to the allowable limits, and then searches (step 367a) the best combination of the combinatorial partial batches for each of the M-ingredients. Each of these combinations, combining the previous total weight with weight actual values of the selected combinatorial partial batches gives the final total equal to or slightly less than the corresponding fractional target weight. When the best combinations for all the weighing machines are found, the computer stores (step 377a) the ordinal numbers of the weighing scales modules containing the selected combinatorial partial batches, a combined quantity of the ingredient AM, BM, CM in them, and the final total of the ingredient AM, BM, CM. Next, the computer checks (step 379a) errors, and then all the selected weighing scale modules of the weighing machines are discharged, and each residue within them is weighed (step 381), if all error values correspond to the allowable limits. Otherwise, the computer produces (step 383) an alarm signal, searches (step 385) the problem to correct (step 387) an error by executing steps 367b, 377b, 379b to obtain the best combinations giving the final totals equal to or slightly more than the fractional weights of the M-ingredients.

Restriction to select the combinations for the ingredients AM, BM, CM, that give only the final total slightly less or slightly more than the fractional weight, is imposed because of the demand to minimize a deviation of the composition of the mixture. If these totals correspond to programmed tolerant values, the computer proceeds (step 381) to discharge all the selected weighing scale modules in the weighing machines. Otherwise, the computer produces (step 383) an alarm signal, searches (step 385) the problem to correct (step 387) an error executing steps 367c, 377c, 379c to obtain the best combinations giving the final totals equal to or slightly less or more than the fractional weights. If these totals correspond to programmed tolerant values, the computer proceeds (step 381) to discharge all the selected weighing scale modules in the weighing machines. Otherwise, the computer produces (step 383) an alarm signal, searches (step 385) the problem to correct (step 387) an error by automatic executing correctional weighing steps 425–467, which will be described in detail below, or the manual correction by an operator. As an operator corrects an error manually, the computer checks (step 389) again whether error value corresponds to the allowable limits and then proceeds (step 381) to discharge all the selected weighing scale modules in the weighing machines. Note, the computer by default proceeds only steps 367c, 377c, 379c, and an operator, if it is desired, can demand through the software unit into the technological data more accurately to execute the searching processes (a, b, or both successively). Next after step 381, the computer stores (step 391) the tare weights, counts and stores tare errors, the combinatorial partial batch weights, the final total weights, and errors of the combinatorial partial batch weights and the final total weights of the ingredients AM, BM, CM. The computer checks (step 393) errors and then purges (step 395) the present combination for ingredients AM, BM, CM, preparing the weighing system to the new cycle, if all error values correspond to the allowable limits. Otherwise, the computer produces (step 397) an alarm signal, searches (step 399) the problem to correct an error. As an operator corrects (step 401) an error manually, the computer checks (step 403) again whether all error values correspond to the allowable limits and then purges (step 395) present combination for ingredients AM, BM, CM, preparing the weighing system to the new cycle.

Figure 17E:
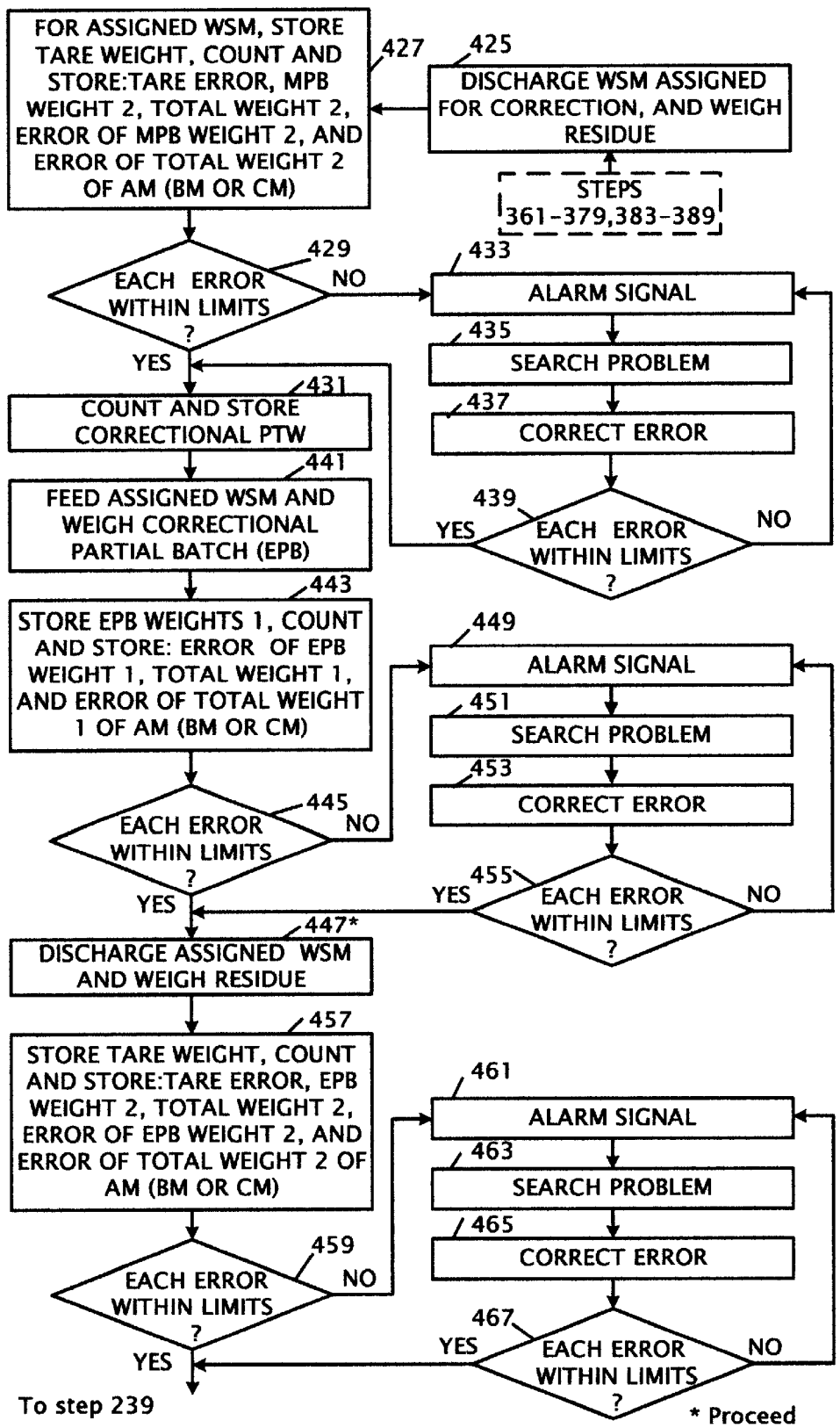

Accordingly, during the step 425 indicated in FIG. 17e, that of the ingredients AM, BM, or CM, whose the combinatorial partial batch weights do not correspond to the best combination, is discharged from the weighing scale module assigned for the correctional weighing steps. Next, residue within this weighing scale module is weighed and the computer stores (step 427) the tare weight, counts and stores values of a tare error, the partial batch weight, the total weight, a partial batch weight error as the difference between a relative registered error before discharging and the tare weight, and a total weight error. The computer checks (step 429) errors, and then the correctional partial batch target weight for the certain ingredient is counted and stored (step 431), if these error values correspond to the allowable limits. Otherwise, the computer produces (step 433) an alarm signal, searches (step 435) the problem to correct an error. The computer corrects (step 437) an error via the controller switching on the activator of the weighing scale module. Next, the computer checks (step 439) again whether error values correspond to the allowable limits and proceeds step 431. Otherwise, the computer repeats (step 433) an alarm signal. In this situation, an operator must search the problem and correct an error manually.

Next during the step 441, the certain ingredient is fed into the assigned weighing scale module and weighed to obtain the partial batch according to the counted correctional partial batch target weight. When current weight value of the certain ingredient weight is equal to the correctional partial batch target weight, the computer via the controller stops feeding. Next, the computer stores (step 443) a weight actual value, counts and stores an error value of the correctional partial batch weight as the difference between the relative registered weight and the target weight, the total weight, and an error of the total weight. The computer checks (step 445) errors and then proceeds (step 447) to discharge the assigned weighing scale module, if error value corresponds to the allowable limits. Otherwise the computer produces (step 449) an alarm signal, searches (step 451) the problem to correct an error. As an operator corrects (step 453) an error, the computer checks (step 455) again whether error value corresponds to the allowable limits and then proceeds (step 447) to discharge the assigned weighing scale module, and the residue is weighed. The computer stores (step 457) the tare weight, counts and stores values of a tare error, the correctional partial batch weight, the total weight, an error of the correctional partial batch weight as the difference between a relative registered error before discharging and the tare weight, and an error of the total weight of the ingredients AM, BM, CM including the correctional total. The computer checks (step 459) errors and then prepares the weighing system to the new cycle, if error values correspond to the allowable limits. Otherwise the computer produces (step 461) an alarm signal, searches (step 463) the problem to correct an error. The computer corrects (step 465) an error via the controller switching on the activator of the assigned weighing scale module, checks (step 467) again whether error value corresponds to the allowable limits, and then prepares the weighing system to the new cycle. Otherwise the computer repeats (step 461) an alarm signal, searches (step 463) the problem to correct an error.

Described correctional steps are executed by default, and in such sequence, the process requires simultaneously with step 447 proceeding the steps 381 of discharging those of the ingredients AM, BM, and CM, whose the weights correspond to the best combination. Note, an operator, if it is desired, can demand through the software unit to execute simultaneously correctional steps for all the ingredients AM, BM, CM. In such sequence, even though only one of these ingredients has no partial batch weights corresponding to the best combination, the correctional weighing steps will be executed for all the ingredients AM, BM, CM by all the assigned weighing scale modules. More over, an operator, if it is desired for the particular case, can demand through the software unit simultaneously to execute the correctional steps for all the ingredients AM, BM, CM excluding the combinatorial process. In such sequence, the correctional partial batch target weights are counted during step 301, as the total weights are counted in step 257, the combinatorial process is changed into the correctional weighing process, which will be executed for all the ingredients AM, BM, CM by all the assigned weighing scale modules after steps 329 or 337. In this case, the computer proceeds to obtain simultaneously the respective correctional partial batch weights by switching on the complementary correctional feeders in the same manner as described above.

Accordingly, the reader will see that the present invention provides, in the industrial weighing system, the counting and combinatorial weighing method and apparatus suitable for obtaining the collected batch of ingredients of relatively large and the relatively small weight, with weight actual values within the tolerance limits of the highest accuracy.

The reader will understand from the foregoing that, for a plurality of ingredients of a relatively large weight and/or volume, with the difficulties to transport smoothly and to weigh accurately, the partial batches are weighed and counted iteratively. The computed rest of this batch is combinatorially weighed after weighing all other ingredients accurately to obtain all the batches fractional target weights.

Furthermore the additional advantages are in that it provides:

the counting and combinatorial weighing method and apparatus suitable for obtaining the weight of the collected batch of ingredients substantially greater than the total weight capacity of all the weighing scale modules of the weighing apparatus;

the counting and combinatorial weighing method and apparatus suitable for obtaining the collected batch of ingredients including ingredients of the adverse specific properties regarding weighing accuracy with weight actual values within the tolerance limits of the highest accuracy;

the counting and combinatorial weighing method and apparatus suitable for obtaining the collected batch of ingredients of the relatively large and the relatively small weights within the weighing scale modules of the relatively small volume capacity and the tare weight with the high resolution and wide measuring range;

the counting and combinatorial weighing method and apparatus suitable for obtaining the collected batch of ingredients substantially to decrease numbers of both the feeders and related weighing scale modules per each ingredient thus to alleviate the cost problem;

the counting and combinatorial weighing method and apparatus suitable for obtaining the collected batch of ingredients to alleviate the deterioration problem by simultaneous weighing an ingredient of the relatively large weight within a plurality of the weighing scale modules;

the expanded application area of the counting and combinatorial weighing method and apparatus for obtaining the collected batch of ingredients with the highest accuracy and the great throughput to the industrial technological processes;

the counting and combinatorial weighing method and apparatus to eliminate granulation or some other kind of preparation of ingredients for the industrial technological processes wherein it is possible and thus farther to decrease the energy and cost problems;

the counting and combinatorial weighing method and apparatus in the industrial weighing processes to prevent dust particles of flows of ingredients to impair the environment;

software for modeling and remodeling weighing system easy to operate and accurately to respond upon a change in the technological conditions of the industrial technological process;

the advantageous feeder, forming a plurality of flowing streams of the main ingredient, directly connected with the associated storage hopper and all of the weighing scale modules of the weighing machine substantially to simplify the weighing system;

the advantageous feeder, forming a plurality of flowing streams of the main ingredient, directly connected with the associated storage hopper and all of the weighing scale modules of the weighing machine to enhance the storage hopper and thus to improve the weighing process;

the advantageous feeder, forming a plurality of flowing streams of the main ingredient of the relatively lower volumetric density and lower movement velocity substantially to increase the feeder throughput capacity;

the advantageous feeder, forming a plurality of flowing streams of the main ingredient, suitable for various arrangements of the weighing system;

the advantageous vibratory drive to increase the throughput capacity of the main ingredient feeder and thus to decrease the energy and cost problems;

the advantageous vibratory drive to decrease the throughput capacity of the main ingredient feeder for feeding the partial batch into the associated weighing scale modules upon final combinatorial and/or correctional weighing steps;

for a plurality of incorporated ingredients, a plurality of feeders, directly connected with the relative weighing scale modules of the weighing machine in series with main ingredient feeder substantially to reduce a number of the weighing scale modules per each ingredient;

the rigid support frame of the weighing machine for supporting each of a plurality of the weighing scale modules detachably connected to and easy be detached from the support frame preserving its rigidity;

a plurality of the weighing scale modules of the relatively small size and thus small inner surface and height, for weighing the substantially small partial batches of ingredients in an iterative manner, to alleviate the problems of ingredient sticking and the late ingredient in flight;

the weighing scale module, which is self-sufficient to integrate the load receiving assembly and the pillar being a part of the weighing machine support frame, to afford an adjustment, a test, and the metrological verification prior to assembly with the other weighing machine components;

the self-sufficient weighing scale module, which comprises the simple overload-preserving devices for diverting the excessively large forces away from the load cell and other related parts at transportation and exploitation;

the self-sufficient weighing scale module, which easy being attached to or detached from the weighing machine support frame;

for the weighing scale module in the cup unit, the air duct and the outlet cap, which are so arranged to alleviate advantageously an influence of the air pressure upon the weight measuring process;

the complementary correctional feeder for feeding the partial batch into the associated weighing scale modules upon the final combinatorial and/or correctional weighing steps with the substantially low throughput capacity. As it will be realized, the invention is capable of other different embodiments, and its several details are capable of modification in various, obvious aspects all without departing from the invention. For instance, there are possibilities to provide:

visual performing both the design and technology data and the graphical image of the weighing system;

visual performing the graphical image of the weighing system, in an imitation mode, and units for dynamic imitation all weighing signals in a real time scale;

at least one of the weighing scale modules with the double range load cell;

flexible elements for the overload protection and tare compensation for the force-transmitting device;

a common chute as a multi ingredient weighing hopper directly, within the last, to weigh additional ingredients during weighing other ingredients within the weighing scale modules;

chock absorber devices for the weighing machine support frame and for cutoff assemblies to decrease the vibration influence upon the measuring process;

an inert fluid supply of the weighing scale modules through the air collector to weigh specific ingredients;

a bypass valve for the air collector to alleviate an air static problem upon the measuring process, when an inert fluid supply is provided;

dust separating devices to clean the exhaust air and to feed the dust particles separated there into a common chute for utilization. However, there are additional possibilities to modify the counting and combinatorial weighing method and system:

for a particular situation in a suitable manner, to reject any one or more of the described processed steps and/or invert the order of them;

to weigh a batch of at least one of a plurality of the incorporated ingredients and the partial batches of other incorporated ingredients alternately in succession with weighing the partial batches of a main ingredient;

when no the best combination is found for the main ingredients of the groups A, B, C, to search another combination for these main ingredients, preserving a constant ratio as prescribed proportionality of the fractional weights, for new slightly changed, in accordance with the preset limits, the collected batch target weight;

in the counting and combinatorial weighing method, to provide an advanced mode involving all the incorporated ingredients in the combinatorial process, to count their nearest common coefficient of a deviation of weight actual values from the fractional target weights, to count the new altered collected batch target weight and the new altered combinatorial partial target weight for the main ingredients based on this nearest common coefficient thus to increase weighing accuracy;

in the weighing machine, to eliminate any feeder gate, if the adverse effect is not taken;

in the apparatus, to provide only one weighing machine, if the main ingredient is single.

for a plurality of the ingredients comprising the ingredients of dual features such as substantial predominance of a fractional batch volume caused by an extreme low volumetric density of the ingredient at a relatively small fractional batch weight, in computer preparing the technology data, to separate the main ingredients by means of the comparison of volume values of the ingredients of this plurality.

I claim:

1. A counting and combinatorial weighing method for obtaining a predetermined target weight collected batch of a plurality of different types of predetermined fractional target weight main and incorporated ingredients batches for mixing them together, said main ingredients are of substantial predominance of said predetermined fractional target weight, a corresponding volume, and of adverse specific properties regarding weighing accuracy, said method comprising the steps of:

(a) providing a weighing system comprising a plurality of weighing machines, each of said weighing machines being provided for a corresponding group of said ingredients including at least one of said main ingredients and a plurality of said incorporated ingredients, and providing for each of said weighing machines mountable rigid support frame means to support attached parts of said weighing machines;

a plurality of weighing scale modules, each of said weighing scale modules forming and weighing simultaneously in a series partial batches of said at least one the same main ingredient for counting and combinatorial weighing steps and alternately a batch of said at least one different incorporated ingredient for counting weighing steps;

at least one of said weighing scale modules predetermined for correctional weighing steps when no a best combination is found in said different combinatorial weighing step for a certain type of said main ingredients;

at least one main ingredient feeder means forming a plurality of flowing streams of said main ingredient directly to feed each of the weighing scale modules for said counting and combinatorial weighing steps;

a plurality of incorporated ingredient feeder means, each of said incorporated ingredient feeder means forming a flowing stream of said incorporated ingredient directly to feed the weighing scale module for said weighing step before the combinatorial weighing step for said main ingredient;

a plurality of cutoff means for cutting off the flowing streams of said main and incorporated ingredients;

ingredients discharging means;

a plurality of air collecting means;

a plurality of dust preventing means; and a plurality of auxiliary cutoff means for preliminary adjusting the throughput of said main ingredients feeder means, and cutting off the flowing streams of said main ingredient for a particular situation;

(b) providing a plurality of storage hopper means for said main and incorporated ingredients;

conveyor means for transferring the collected batch of said plurality of ingredients to a mixer; and control computer means for modeling and control of said weighing system, said control computer means providing software means for (b1) setting a technology data and a program selection for said weighing system into the technology data base of said control computer means and (b2) providing a unit-to-unit compatibility of said control computer means and said weighing system;

(c) modeling said weighing system, said modeling comprising steps of computing start parameters of a weighing process and an inspection of said start parameters and the unit-to-unit compatibility of said control computer means and said weighing system, said start parameters providing a minimal number of counting weighing steps and, accordingly, maximal initial target values for each of said main and incorporated ingredients to obtain said predetermined fractional target weights;

(d) weighing each of said main ingredients within the weighing scale modules of said corresponding weighing machine simultaneously according to the partial batch initial target weight of said start parameters computing in said step (c);

(e) discharging the main ingredients from said weighing scale modules;

(f) computing partial batch altered target weights for all of said main ingredients for each of all, excluding combinatorial, sequenced weighing steps of a completed cycle; each altering quantity of said partial batch altered target weight is equal to an average of a corresponding total error quantity of said previous counting weighing step;

(g) repeating alternately, in succession, the steps of weighing each of said main ingredients within the weighing scale modules of said corresponding weighing machine according to said partial batch altered target weights simultaneously, the steps (e) and (f) in said sequence according to a number of the counting weighing steps of said start parameters counted in said step (c);

(h) computing combinatorial partial batch target weights for the main ingredients for said combinatorial weighing step of a completed weighing cycle;

(i) weighing each of said incorporated ingredients within the corresponding weighing scale module of said weighing machine simultaneously according to the initial target weight of said start parameters counted in said step (c);

(j) discharging the incorporated ingredients from said weighing scale modules;

(k) weighing each of said main ingredients within the weighing scale modules of all said corresponding weighing machines simultaneously for the combinatorial weighing step according to said combinatorial partial batch target weights;

(l) selecting among all of the weighing scale modules with said main ingredient filled in the combinatorial weighing step in each of said weighing machines, provided for the groups of said ingredients, the best combinations of said combinatorial partial batches, each of said combinations, combining the previous total weight with weights actual values of the selected combinatorial partial batches, gives the final total equal to said batch fractional target weight set for this type or closest to said corresponding batch fractional target weight within the preset allowable limits; and (m) discharging said main ingredients from these weighing scale modules of said weighing machines corresponding to the combination obtained for each type of said main ingredients, whereby the collected batch composed of all said main ingredients partial batches and said incorporated ingredients batches of weight actual values within the tolerance limits of the highest accuracy at a minimal number of said counting weighing steps is obtained.

2. The counting and combinatorial weighing method according to claim 1, wherein said step (a) further providing:

(a) for said combinatorial weighing step, the relatively small throughput of said main ingredient feeder means;

(b) for said correctional weighing step,
 (b1) at least one additional flowing stream of said main ingredient feeder means having the relatively substantially small throughput; and
 (b2) at least one complementary correctional feeder means for feeding the correctional partial batch of said main ingredient into said corresponding weighing scale module provided in strip 1(*a*).

3. The counting and combinatorial weighing method according to claims 1, wherein said step (c) further comprising:

(a) manual setting said technology data comprising a name, a designation, values of said plurality of different types of said main and incorporated ingredients, and a program selection, said values comprising: said batch fractional target weights and the allowable limits of an error of said batch fractional target weights, said collected batch target weight and the allowable limits of an error of said collected batch target weight, a volumetric density of each of said ingredients, the throughput capacity of each of said ingredients feeder means, and the duration of said completed weighing cycle, said program selection comprising a sequence of operations and a number of said weighing scale modules selected for a combinatorial process;

(b) computer preparing said technology data, said computer preparing further comprising steps of
 separating all the main ingredients within said plurality of different types of said main and incorporated ingredients;
 grouping the plurality of different types of said main and incorporated ingredients for a plurality of said groups, each of said groups includes said at least one main ingredient and incorporated ingredients from the plurality of different types of said main and incorporated ingredients;
 associating each of said groups with said corresponding weighing machine, and associating each of all the ingredients of said group with said corresponding weighing scale module, storage hopper means, and main and incorporated ingredients feeder means;
 coding said groups, ingredients, associated storage hopper means, main and incorporated ingredients feeder means, weighing machines, and weighing scale modules, setting a plurality of codes into an internal memory of said control computer means;

(c) computing:
 a number k of said counting weighing steps for each of the main ingredients of said groups according to the corresponding parameters of said weighing system set in both the design and technology data bases of said control computer means;
 a number $k_1$ of said weighing steps for each of the incorporated ingredients of said groups according to the corresponding parameters of said weighing system set in both said design and technology data bases;
 the partial batch initial target weight for each of said main ingredients, respectively, each of said weighing scale modules sequentially weighs k times a $1/(kn)$ part of a value equal to the difference between the batch fractional target weight for said main ingredient and an insuring quantity sufficient for providing said final combinatorial weighing step,
 where: n is a number of the weighing scale modules for each of said corresponding weighing machines set in the design data base;
 the batch initial target weight for each of said incorporated ingredients, respectively, at an integer $k_1=1$, each of said weighing scale modules sequentially weighs a value approximately equal to the difference between the batch fractional target weight for said corresponding incorporated ingredient and a forecasting value of a positive error of weighing on said weighing scale module set in the design data base for each of said corresponding weighing machines; and
 the allowable limits of an error of said partial batch weight before discharging and after discharging said weighing scale module and the allowable limits of an error of the total weight before discharging and after discharging said weighing scale modules;

(d) setting all of values of the partial batch initial target weight for each of said main ingredients and the batch initial target weight for each of said incorporated ingredients into the internal memory of said control computer means; and (e) inspecting the partial batch initial target weight for each of said main ingredients and the batch initial target weight for each of said incorporated ingredients according to the minimal and maximal limits of a weighing range and the nominal volume capacity of said corresponding weighing scale module, set in both said design and technology data bases;

said program selection;

the duration of each of said weighing steps and said completed weighing cycle according to counted values of said batch target weight, said partial batch target weight, the throughput capacity of said main and incorporated ingredients feeder means, and the predetermined duration of said completed weighing cycle set in both said design and technology data bases; and the unit-to-unit compatibility of said control computer means and said weighing system; said inspecting further provides repeating said steps (c) when no proven establishing is found in said steps.

4. The counting and combinatorial weighing method according to claim 3, wherein said insuring quantity is counted as a quantity of ($cW_{min}+\Delta$), where $W_{min}$ is a value of the minimal limit of the weighing range for said corresponding weighing scale module set in the design data base of said control computer means;

$\Delta$ is a forecasting total value of a positive error of weighing at once on all of the weighing scale modules of said corresponding weighing machine before discharging set in the design data base of said control computer means; and c is a number of the weighing scale modules selected within said corresponding weighing machine for said combinatorial process.

5. The counting and combinatorial weighing method according to claims 1, wherein said step (h) further provides a calculation of the combinatorial partial batch target weight for said main ingredient as a 1/c part of a value equal to the difference between the batch fractional target weight and a total actual value of all the kn partial batch weights of said main ingredient.

6. The counting and combinatorial weighing method according to claims 1 further performing the following steps when no the best combination is found in said step (I) for the certain type of said main ingredients:

discharging the certain combinatorial partial batch of main ingredient from said weighing scale module being provided for the correctional weighing step of said corresponding weighing machine;

computing the correctional target weight for said certain main ingredient; said correctional target weight is counted as a value equal to the difference between the batch fractional target weight and a total actual value of all the (kn +1) partial batch weights of said certain main ingredient;

weighing the correctional partial batch of said certain main ingredient within said weighing scale module being discharged before; and discharging the correctional partial batch from said weighing scale module.

7. A counting and combinatorial weighing method for obtaining a predetermined target weight collected batch of a plurality of different types of predetermined fractional target weight main and incorporated ingredients batches for mixing them together, said main ingredients are of substantial predominance of said predetermined fractional target weight, a corresponding volume, and of adverse specific properties regarding weighing accuracy, said method comprising the steps of:

(a) providing a weighing system comprising a plurality of weighing machines, each of said weighing machines being provided for a corresponding group of said ingredients including at least one of said main ingredients and a plurality of said incorporated ingredients, and providing for each of said weighing machines mountable rigid support frame means to support attached parts of said weighing machines;

a plurality of weighing scale modules, each of said weighing scale modules forming and weighing simultaneously in a series partial batches of said at least one the same main ingredient for counting and combinatorial weighing steps and alternately a batch or a partial batch of said at least one different incorporated ingredient for counting weighing steps;

at least one of said weighing scale modules predetermined for correctional weighing steps when no a best combination is found in said combinatorial weighing step for a certain type of said main ingredients;

at least one main ingredient feeder means, forming a plurality of flowing streams of said main ingredient directly to feed each of the weighing scale modules for said counting and combinatorial weighing steps;

a plurality of incorporated ingredient feeder means, each of said incorporated ingredient feeder means forming a flowing stream of said incorporated ingredient to feed directly the weighing scale module for said counting weighing steps before the combinatorial weighing step for said main ingredient;

a plurality of cutoff means for cutting off the flowing streams of said main and incorporated ingredients;

ingredients discharging means;

a plurality of air collecting means;

a plurality of dust preventing means; and a plurality of auxiliary cutoff means for preliminary adjusting the throughput of said main ingredient feeder means, and cutting off the flowing streams of said main ingredient for a particular situation;

(b) providing a plurality of storage hopper means for said main and incorporated ingredients;

conveyor means for transferring the collected batch of said plurality of ingredients to a mixer; and control computer means for modeling and control of said weighing system, said control computer means providing software means for (b1) setting a technology data, a program selection for said weighing system into the technology data base of said control computer means and (b2) providing a unit-to-unit compatibility of said control computer means and said weighing system;

(c) modeling said weighing system, said modeling comprising steps of computing start parameters of a weighing process and an inspection of said start parameters and the unit-to-unit compatibility of said control computer means and said weighing system, said start parameters providing a minimal number of counting weighing steps and, accordingly, maximal initial target values for each of said main and incorporated ingredients to obtain said predetermined fractional target weights;

(d) weighing each of said main ingredients within the weighing scale modules of said corresponding weighing machine simultaneously according to the partial batch initial target weight of said start parameters computing in said step (c);

(e) discharging the main ingredients from said weighing scale modules;

(f) computing partial batch altered target weights for all of said main ingredients for each of all, excluding combinatorial, sequenced weighing steps of a completed cycle; each altering quantity of said partial batch altered target weight is equal to an average of a corresponding total error quantity of the previous counting weighing step;

(g) repeating the steps of weighing each of said main ingredients within the weighing scale modules of said corresponding weighing machine according to said partial batch altered target weights simultaneously, the steps (e) and (f) in said sequence according to a number of the counting weighing steps of said start parameters counted in said step (c);

(h) computing combinatorial partial batch target weights for the main ingredients for said combinatorial weighing step of a completed weighing cycle;

(i) weighing each of said incorporated ingredients within the corresponding weighing scale module of said weighing machine simultaneously according to the batch initial target weight or the partial batch initial target weight of said start parameters counted in said step (c);

(j) discharging the incorporated ingredients from said weighing scale modules;

(k) computing partial batch altered target weights for all of said corresponding incorporated ingredients for each of all sequenced weighing steps of a completed cycle; each altering quantity of said partial batch altered target weight is equal to a corresponding error quantity of said previous counting weighing step;

(l) repeating the steps of weighing each of said incorporated ingredients within the corresponding weighing scale modules of said corresponding weighing machine according to said partial batch altered target weights simultaneously, the steps 0) and (k) in said sequence according to a number of the counting weighing steps of said start parameters counted in said step (c);

(m) weighing each of said main ingredients within the weighing scale modules of all said corresponding weighing machines simultaneously for the combinatorial weighing step according to said combinatorial partial batch target weights;

(n) selecting among all of the weighing scale modules with said main ingredient filled in the combinatorial weighing step in each of said weighing machines, provided for the groups of said ingredients, the best combinations of said combinatorial partial batches, each of said combinations, combining the previous total weight with weights actual values of the selected combinatorial partial batches, gives the final total equal to said batch fractional target weight set for this type or closest to said corresponding batch fractional target weight within the preset allowable limits; and (o) discharging said main ingredients from these weighing scale modules of said weighing machines corresponding to the best combination obtained for each type of said main ingredients, whereby the collected batch composed of all said main ingredients partial batches and said incorporated ingredients batches and partial batches of weight actual values within the tolerance limits of the highest accuracy at a minimal number of said counting weighing steps is obtained.

8. The counting and combinatorial weighing method according to claim 7, wherein said step (a) further providing:

(a) for said combinatorial weighing step, the relatively small throughput of said main ingredient feeder means;

(b) for said correctional weighing step,
(b1) at least one additional flowing stream of said main ingredient feeder means having the relatively substantially small throughput; and
(b2) at least one complementary correctional feeder means for feeding the correctional partial batch of said main ingredient into said corresponding weighing scale module.

9. The counting and combinatorial weighing method according to claims 7, wherein said step (c) further comprising:

(a) manual setting said technology data comprising a name, a designation, values of said plurality of different types of said main and incorporated ingredients, and a program selection, said values comprising: said batch fractional target weights and the allowable limits of an error of said batch fractional target weights, said collected batch target weight and the allowable limits of an error of said collected batch target weight, a volumetric density of each of said ingredients, the throughput capacity of each of said ingredients feeder means, and the duration of said completed weighing cycle, said program selection comprising a sequence of operations and a number of said weighing scale modules selected for a combinatorial process;

(b) computer preparing said technology data, said computer preparing further comprising steps of
separating all the main ingredients within said plurality of different types of said main and incorporated ingredients;
grouping the plurality of different types of said main and incorporated ingredients for a plurality of said groups, each of said groups includes said at least one main ingredient and incorporated ingredients from the plurality of different types of said main and incorporated ingredients;
associating each of said groups with said corresponding weighing machine, and associating each of all the ingredients of said group with said corresponding weighing scale module, storage hopper means, and main and incorporated ingredients feeder means; and
coding said groups, ingredients, associated storage hopper means, main and incorporated ingredients feeder means, weighing machines, and weighing scale modules, setting a plurality of codes into an internal memory of said control computer means;

(c) computing:
a number k of said counting weighing steps for each of the main ingredients of said groups according to the corresponding parameters of said weighing system set in both said design and technology data bases of said control computer means, respectively;

a number $k_1$ of said counting weighing steps for each of the incorporated ingredients of said groups according to the corresponding parameters of said weighing system set in both said design and technology data bases;

the partial batch initial target weight for each of the main ingredients, respectively, each of said weighing scale modules sequentially weighs k times a 1/kn) part of a value equal to the difference between the batch fractional target weight for said main ingredient and an insuring quantity sufficient for providing said final combinatorial weighing step, where: n is a number of the weighing scale modules for each of said corresponding weighing machines set in the design data base;

the batch initial target weight for at least some of said incorporated ingredients, respectively, at an integer $k_1=1$, at least some of said weighing scale modules sequentially weigh a value approximately equal to the difference between the batch fractional target weight for said corresponding incorporated ingredient and a forecasting value of a positive error of weighing on said weighing scale module set in the design data base for each of said corresponding weighing machines;

the partial batch initial target weight for at least one of said incorporated ingredients, respectively, when an integer $k_1 \leq 2$, at least one of said weighing scale modules sequentially weighs a $1/k_1$ part of a value equal to the batch fractional target weight for said incorporated ingredient set in the technology data base; and the allowable limits of an error of said partial batch weight and batch weight, respectively, before discharging and after discharging said weighing scale module and the allowable limits of an error of the total weight before discharging and after discharging said weighing scale module;

(d) setting all of said values of partial batch initial target weight for each of said main ingredients and the batch or the partial batch initial target weight, respectively, for each of said incorporated ingredients into the internal memory of said control computer means; and (e) inspecting the partial batch initial target weight for each of said main ingredients and the partial batch or batch initial target weight for each of said incorporated ingredients, respectively, according to the minimal and maximal limits of a weighing range and the nominal volume capacity of said corresponding weighing scale module, set in both said design and technology data bases;

said program selection;

the duration of each of said weighing steps, and said completed weighing cycle according to counted values of said batch target weight, said partial batch target weight, the throughput capacity of said main and incorporated ingredients feeder means, and the predetermined duration of said completed cycle set in both said design and technology data bases; and the unit-to-unit compatibility of said control computer means and said weighing system; said inspecting further provides repeating said steps (c) when no proven establishing is found in said steps.

10. The counting and combinatorial weighing method according to claim 9, wherein said insuring quantity is counted as a quantity of $(cW_{min}+\Delta)$, where: $W_{min}$ is a value of the minimal limit of the weighing range for said corresponding weighing scale module set in the design data base of said control computer means;

$\Delta$ is a forecasting total value of a positive error of weighing at once on all of the weighing scale modules of said corresponding weighing machine before discharging set in the design data base of said control computer means; and c is a number of the weighing scale modules selected within said corresponding weighing machine for said combinatorial process.

11. The counting and combinatorial weighing method according to claims 7, wherein said step (h) further provides a calculation of the combinatorial partial batch target weight for said main ingredient as a 1/c part of a value equal to the difference between the batch fractional target weight and a total actual value of all the kn partial batch weights of said main ingredient.

12. The counting and combinatorial weighing method according to claims 7, further performing the following steps when no the best combination is found in said step (n) for the certain type of said main ingredients:

discharging the certain main ingredient from said weighing scale module being provided for the correctional weighing step of said corresponding weighing machine;

computing the correctional target weight for said certain main ingredient; said correctional target weight is counted as a value equal to the difference between the batch fractional target weight and a total actual value of all the (kn +1) partial batch weights of said certain main ingredient;

weighing the correctional partial batch of said certain main ingredient within said weighing scale module being discharged before; and discharging the correctional partial batch from said weighing scale module.

13. A counting and combinatorial weighing method for obtaining a predetermined target weight collected batch of a plurality of different types of predetermined fractional target weight main and incorporated ingredients batches for mixing them together, said main ingredients are of substantial predominance of said predetermined fractional target weight, a corresponding volume, and of adverse specific properties regarding weighing accuracy, said method comprising the steps of:

(a) providing a weighing system comprising a plurality of weighing machines, each of said weighing machines being provided for the corresponding group of said ingredients including at least one of said main ingredients and a plurality of said incorporated ingredients, and providing for each of said weighing machines mountable rigid support frame means to support attached parts of said weighing machines;

a plurality of weighing scale modules, each of said weighing scale modules forming and weighing simultaneously in a series partial batches of said at least one the same main ingredient for counting and combinatorial weighing steps and alternately partial batches of said at least one different incorporated ingredient for a counting weighing steps;

at least one of said weighing scale modules predetermined for correctional weighing steps when no a best combination is found in said combinatorial weighing step for a certain type of said main ingredients;

at least one main ingredient feeder means, forming a plurality of flowing streams of said main ingredient directly to feed each of the weighing scale modules for said counting and combinatorial weighing steps;

a plurality of incorporated ingredient feeder means, each of said incorporated ingredient feeder means forming a flowing stream of said incorporated ingredient directly to feed the weighing scale module for said counting weighing steps before the combinatorial weighing step for said main ingredient;

a plurality of cutoff means for cutting off the flowing streams of said main and incorporated ingredients;

ingredients discharging means;

a plurality of air collecting means;

a plurality of dust preventing means; and a plurality of auxiliary cutoff means for preliminary adjusting the throughput of said main ingredient feeder means, and cutting off the flowing streams of said main ingredient for a particular situation;

(b) providing a plurality of storage hopper means for said main and incorporated ingredients;

conveyor means for transferring the collected batch of said plurality of ingredients to a mixer; and control computer means for modeling and control of said weighing system, said control computer means providing software means for (b1) setting a technology data, a program selection for said weighing system into the technology data base of said control computer means and (b2) providing a unit-to-unit compatibility of said control computer means and said weighing system;

(c) modeling said weighing system, said modeling comprising steps of computing start parameters of a weighing process and an inspection of said start parameters and the unit-to-unit compatibility of said control computer means and said weighing system, said start parameters providing a minimal number of counting weighing steps and, accordingly, maximal initial target values for each of said plurality of main ingredients and adequate initial target values of said plurality of incorporated ingredients to obtain said predetermined fractional target weights and preliminary blending of said partial batches;

(d) weighing each of said main ingredients within the weighing scale modules of said corresponding weighing machine simultaneously according to a partial batch initial target weight of said start parameters computing in said step (c);

(e) discharging the main ingredients from said weighing scale modules;

(f) weighing each of said incorporated ingredients within the corresponding weighing scale module of said weighing machine simultaneously according to a partial batch initial target weight of said start parameters counted in said step (c);

(g) discharging the incorporated ingredients from these weighing scale modules;

(h) computing partial batch altered target weights for all of said main ingredients for each of all, excluding combinatorial, sequenced weighing steps of a completed cycle, and partial batch altered target weights for all of said incorporated ingredients for each of all sequenced weighing steps of a completed cycle; each altering quantity of said partial batch altered target weight of said main ingredient is equal to an average of a corresponding total error quantity of the previous counting weighing step, each altering quantity of said partial batch altered target weight of said incorporated ingredient is equal to a corresponding error quantity of said previous counting weighing step;

(i) repeating in an alternate manner the steps of weighing each of said main ingredients within the weighing scale modules of said corresponding weighing machine according to said partial batch altered target weights simultaneously and said steps (e) with the steps of weighing each of said incorporated ingredients within the corresponding weighing scale module of said corresponding weighing machine according to said partial batch altered target weights simultaneously, steps (g), and steps (h) in said sequence according to a number of the counting weighing steps of said start parameters counted in said step (c);

(j) computing combinatorial partial batch target weights for the main ingredients for said combinatorial weighing step of a completed weighing cycle;

(k) weighing each of said main ingredients within the weighing scale modules of all said corresponding weighing machines simultaneously for the combinatorial weighing step according to said combinatorial partial batch target weights;

(l) selecting among all of the weighing scale modules with said main ingredient filled in the combinatorial weighing step in each of said weighing machines, provided for the groups of said ingredients, the best combinations of said combinatorial partial batches, each of said combinations, combined the previous total weight with weights actual values of the selected combinatorial partial batches, gives the final total equal to said batch fractional target weight set for this type or closest to said corresponding batch fractional target weight within the preset allowable limits; and (m) discharging said main ingredients from these weighing scale modules of said weighing machines corresponding to the best combination obtained for each type of said main ingredients, whereby the collected batch composed of all said main and incorporated ingredients partial batches of weight actual values within the tolerance limits of the highest accuracy, at a minimal number of said counting weighing steps, for each of said main ingredients, and preliminary blending is obtained.

14. The counting and combinatorial weighing method according to claim 13, wherein said step (a) further providing:

(a) for said combinatorial weighing step, the relatively small throughput of said main ingredient feeder means;

(b) for said correctional weighing step (b1) at least one additional flowing stream of said main ingredient feeder means having the relatively substantially small throughput; and (b2) at least one complementary correctional feeder means for feeding the correctional partial batch of said main ingredient into said corresponding weighing scale module.

15. The counting and combinatorial weighing method according to claims 13, wherein said step (c) further comprising:

(a) manual setting said technology data comprising a name, a designation, values of said plurality of different types of said main and incorporated ingredients, and a program selection, said values comprising: said batch fractional target weights and the allowable limits of an error of said batch fractional target weights, said collected batch target weight and the allowable limits of an error of said collected batch target weight, a volumetric density of each of said ingredients, the throughput capacity of each of said ingredients feeder means, and the duration of said completed weighing cycle, said program selection comprising a sequence of operations and a number of said weighing scale modules selected for a combinatorial process;

(b) computer preparing said technology data, said computer preparing further comprising steps of separating all the main ingredients within said plurality of different types of said main and incorporated ingredients;

grouping the plurality of different types of said main and incorporated ingredients for a plurality of said groups, each of said groups includes said at least one main ingredient and incorporated ingredients from the plurality of different types of said main and incorporated ingredients;

associating each of said groups with said corresponding weighing machine, and associating each of all the ingredients of said group with said corresponding weighing scale module, storage hopper means, and main and incorporated ingredients feeder means; and coding said groups, ingredients, associated storage hopper means, main and incorporated ingredients feeder means, weighing machines, and weighing scale modules, setting a plurality of codes into an internal memory of said control computer means;

(c) computing:

a number k of said counting weighing steps for each of the main ingredients of said groups according to the corresponding parameters of said weighing system set in both the design and technology data bases of said control computer means;

a number $k_1$ of said counting weighing steps for each of the incorporated ingredients of said groups according to the corresponding parameters of said weighing system set in both said design and technology data bases;

the partial batch initial target weight for each of the main ingredients, respectively, each of the weighing scale modules sequentially weighs k times a 1/(kn) part of a value equal to the difference between the batch fractional target weight for said main ingredient and an insuring quantity sufficient for providing said final combinatorial weighing step, where: n is a number of the weighing scale modules for each of said corresponding weighing machines set in the design data base;

the partial batch initial target weight for each of the incorporated ingredients, respectively, each of the weighing scale modules alternately weighs a $1/k_1$ part of a value equal to the batch fractional target weight for said incorporated ingredient set in the technology data base at $k_1 \leq k$; and the allowable limits of an error of the partial batch weight before discharging and after discharging said weighing scale module and the allowable limits of an error of the total weight before discharging and after discharging said weighing scale module;

(d) setting all of values of the partial batch initial target weight for each of said main ingredients and the partial batch initial target weight for each of said incorporated ingredients into the internal memory of said control computer means;

(e) inspecting the partial batch initial target weight for each of said main and incorporated ingredients according to the minimal and maximal limits of a weighing range and the nominal volume capacity of said corresponding weighing scale module, set in both said design and technology data bases, respectively;

said program selection;

the duration of each of said weighing steps and said completed weighing cycle according to counted values of said partial batch target weight, the throughput capacity of said main and incorporated feeder means, and the predetermined duration of said completed cycle set in both said design and technology data bases; and the unit-to-unit compatibility of said control computer means and said weighing system, said inspecting further provides repeating said steps (c) when no proven establishing is found in said steps.

16. The counting and combinatorial weighing method according to claim 15, wherein said insuring quantity is counted as a quantity of $(cW_{min}+\Delta)$, where: $W_{min}$ is a value of the minimal limit of the weighing range for said corresponding weighing scale module set in the design data base of said control computer means;

$\Delta$ is a forecasting total value of a positive error of weighing at once on all of the weighing scale modules of said corresponding weighing machine before discharging set in the design data base of said control computer means; and c is a number of the weighing scale modules selected within said corresponding weighing machine for said combinatorial process.

17. The counting and combinatorial weighing method according to claims 13, wherein said step (j) further provides a calculation of the combinatorial partial batch target weight for said main ingredient as a 1/c part of a value equals to the difference between the batch fractional target weight and a total actual value of all the kn partial batch weights of said main ingredient.

18. The counting and combinatorial weighing method according to claims 13 further performing the following steps when no the best combination is found in said step (l) for the certain type of said main ingredients:

discharging the certain main ingredient from said weighing scale module being provided for the correctional weighing step of said corresponding weighing machine;

computing the correctional target weight for said certain main ingredient; said correctional target weight is counted as a value equal to the difference between the batch fractional target weight and a total actual value of all the (kn +1) partial batch weights of said certain main ingredient;

weighing the correctional partial batch of said certain main ingredient within said weighing scale module being discharged before; and discharging the correctional partial batch from said weighing scale module.

19. A counting and combinatorial weighing apparatus for obtaining a predetermined target weight collected batch of a plurality of different types of predetermined fractional target weight main and incorporated ingredients batches for mixing them together, said main ingredients are of substantial predominance of said predetermined fractional target weight, a corresponding volume, and of adverse specific properties regarding weighing accuracy, said counting and combinatorial weighing apparatus comprising:

(a) a plurality of weighing machines, each of said weighing machines for a corresponding group of said ingredients, including at least one of said main ingredients and a plurality of said incorporated ingredients, each of said weighing machines arranged to accommodate a plurality of storage hopper means of the corresponding group of said ingredients, comprising:

mountable rigid support frame means to support attached parts of said weighing machine, said support frame means comprising two lower and upper horizontally spaced base frames and an upright support structure detachably rigidly connected said base frames;

a plurality of weighing scale modules, each of said weighing scale modules forming and weighing in a series partial batches of said at least one the same main ingredient for counting and combinatorial weighing steps and alternately a batch of said at least one different incorporated ingredient for a weighing step, the weight/volume capacity of said weighing scale module approximately is equal to the maximal target weight/volume of said partial batch and substantially smaller than the maximal batch fractional target weight/volume of said main ingredient, respectively;

at least one of said weighing scale modules predetermined for correctional weighing steps when no a best combination is found in said combinatorial weighing step for a certain type of said main ingredients;

at least one main ingredient feeder means, forming a plurality of flowing streams of said main ingredient directly to feed each of the weighing scale modules for said counting and combinatorial weighing steps, said main ingredient feeder means is arranged to transfer directly said main ingredient from the associated storage hopper means into said corresponding weighing scale modules according to the predetermined duration of a completed weighing cycle;

a plurality of incorporated ingredient feeder means, each of said incorporated ingredient feeder means forming a flowing stream of said incorporated ingredient directly to feed the weighing scale module for said weighing step before the combinatorial weighing step for said main ingredient, each of said incorporated ingredient feeder means is arranged to transfer directly said incorporated ingredient from the associated storage hopper means into said corresponding weighing scale module according to the predetermined duration of completed weighing cycle;

a plurality of cutoff means for cutting off the flowing stream of said main and incorporated ingredients providing to prevent said late ingredients in flight to influence weighing accuracy and to prevent dust particles of flows of said ingredients and a surplus air replaced from said weighing scale modules to exhaust to the environment, each of said cutoff means being provided for said at least one main and one different incorporated ingredients, said cutoff means comprising cup means and at least one gate means, said gate means comprising an air drive, said cup means comprising a plurality of inlet pieces for flowing streams of said main and incorporated ingredients, outlet means, and air duct means, said outlet means being disposed coaxially over and flexible attached to said weighing scale module, said air duct means being arranged out of position of said gate means to avoid an influence of air pressure upon the weight measuring process;

ingredients discharging means to accommodate said ingredient batches to transfer them to a mixer efficiently and to transfer air flows collected from said weighing scale modules to a common ventilation system, said ingredients discharging means comprising common chute means and a plurality of intermediate connections, said common chute means comprises a ceiling portion, a plurality of inlet pieces, a plurality of air connecting pipes, an outlet opening, activator means, and exhaust discharge, each of said inlet pieces is flexible assembled with said corresponding intermediate connection, said intermediate connection being flexible assembled with said corresponding weighing scale module, said plurality of air connecting pipes is positioned on said ceiling portion to collect said air flows, said activator means is positioned on at least one side wall of said common chute means to eliminate a residue of said ingredients, said outlet opening is positioned in the lower part of said common chute to transfer said ingredients to an inlet of said mixer, and said exhaust discharge is connected with an exhaust of said common ventilation system;

a plurality of air collecting means to transfer a surplus air replaced from the weighing scale modules at weighing into said ingredients discharging means and from the ingredients discharging means into said weighing scale modules at discharging to prevent a variation of air pressure inside said weighing scale module to influence measuring accuracy, said air collecting means comprising a plurality of air tubes, each of said air tubes is flexible connected with the air duct of said corresponding cup means and the air connecting pipe of said common chute means;

a plurality of dust preventing means to prevent dust particles of flows of said ingredients and said surplus air replaced from said weighing scale modules and from said ingredients discharging means to exhaust to the environment, said dust preventing means comprising a plurality of elastic covers and a plurality of clamping bands, said elastic covers and related clamping bands being sealable mounted on the freely coupled parts of said weighing machine, wherein particles of flows of said ingredients and the dust particles of said surplus air may enter the environment; and a plurality of auxiliary cutoff means for preliminary adjusting the throughput of said main ingredients feeder means and for cutting off the flowing streams of said main ingredient for a particular situation, each of said auxiliary cutoff means comprises tube means to transfer the flowing streams of said main ingredient to said cutoff means directly, said auxiliary cutoff means being attached with said main ingredient feeder means and the corresponding inlet piece of said cutoff means through said tube means;

(b) a plurality of storage hopper means for said main and incorporated ingredients;

(c) conveyor means for transferring said collected batch of said plurality of ingredients to said mixer; and (d) control computer means for modeling and control of said weighing system, said control computer means comprising software means for (d1) setting a technology data and a program selection for said weighing system into the technology data base of said control computer means and (d2) providing a unit-to-unit compatibility of said control computer means and said weighing system, said control computer means provided for (d3) counting target parameters, actual values of a weighing process, and a best combination of the combinatorial partial batches for each of the main ingredients, each of said combinations, combining the previous total weight with weights actual values of the selected combinatorial partial batches, gives the final total equal to the corresponding fractional target weight, and (d4) obtaining the partial batches weights of said main ingredients, the batches or partial batches weights of said incorporated ingredients, and the combinatorial partial batches weights for each type of said main ingredients or the correctional partial batch for each type of said main ingredients when no the best combination is found for the certain type of said main ingredients, whereby the collected batch composed of all said main ingredients partial batches and said incorporated ingredients batches with weight actual values within the tolerance limits of the highest accuracy and a minimal number of weighing steps is obtained.

20. The counting and combinatorial weighing apparatus according to claim 19(a), wherein said weighing scale module comprising:

a load cell to weigh said main ingredient partial batch and alternately said incorporated ingredient batch, said load cell has the weight capacity sufficient to measure the partial batch weight substantially smaller than the batch fractional target weight of said main ingredient with great resolution and accuracy;

pillar means being a part of the upright support structure of the support frame means for said weighing machine comprising a pair of movable flat-sided hub flanges, said hub flange comprising an attachment or a plate to attach any suitable aid carrier means to roll conveniently each one of said weighing scale modules from one place to another, an upper end of said pillar means and said upper hub flange being accomplished so that said upper flange will be able to move down along said upper end, advantageously to move or remove the weighing scale module from said weighing machine, the hub flanges of said pillar means are attached to both said base frames to form the support frame of said weighing machine;

a support arm to mount said load cell;

a pair of flat lower and upper plates spaced apart horizontally for connection of said pillars means to movable parts of said weighing scale module to restrict their movement, each of said lower and upper plates has, accordingly, flange elements for said connection, the flange elements of said lower plate are disposed in a vertical coaxially relative to the flange elements of said upper plate;

a brace, and a rib with said lower plate together forming rigid structure for restriction of a movement of the movable parts of said weighing scale module, said pillar means is accomplished to be rigid upon loading of a maximal allowable weight;

a load-receiving structure to form and transfer out said main ingredient partial batch and alternately said incorporated ingredient batch, said load-receiving structure comprising a weighing hopper with an automatic valve;

two pairs of flat lower and upper plates spaced apart horizontally for connection of the load-receiving structure to said pillar means to restrict a movement of said load-receiving structure, each of said flat plates has, accordingly, a flange element for said connection, the flange elements of said lower plates are disposed in a vertical coaxially relative to the flange elements of said upper plates;

activators automatically to clean an inner surface of said weighing hopper;

a force-output element and a rib welded to said weighing hopper to form together a rigid structure for transferring the weight of said weighing hopper to said load cell;

outlet cap means to avoid an influence of air pressure upon the weight measuring process, a quantity of the cross section of said outlet cap means is approximately near to a quantity of the cross section of the outlet means of said cup means;

said load-receiving structure is accomplished for the possibility to move said weighing scale module out of said weighing machine for restoration;

first force-transmitting means to be suspended on the top face of the force-input element of said load cell mounted on the support arm of said pillar to flexible and reliable support the related force-output element of said load-receiving structure, comprising a connection member comprising at least one slit;

spherical washers; and nuts;

second force-transmitting means comprising two pairs of leaf springs means spaced apart on horizontal planes and are detachably fixed at one end to the lower and upper plates of said pillar means and another end to the lower and upper plates of said load-receiving structure, respectively, to transmit a pair of forces exerted by a moment of combined weight of said load-receiving structure and said partial batch to said pillar means to balance said load-receiving structure, said leaf springs means further comprising flange elements provided for rigid connection said pillar means to said load-receiving structure through said leaf springs means to restrict a movement of said load-receiving structure for transportation;

first overload-preserving means for protection against damage by any abnormal forces applied to said first force-transmitting means comprising screw stops;

lock nuts;

screwed rings, each of said screwed rings comprising a screw to set said screwed ring;

a threaded aperture to set said screw stops; and a thrust collar;

each of the screwed rings with said screw stop is extended vertically through the threaded aperture of said lock nut, the lower plate and the brace of said pillar means, respectively, so that the force-output element of said load-receiving structure are confined between the heads of said screw stops, said screwed rings advantageously are adopted for transportation position, to be set the heads of said screw stops to said force-output element tightly and, accordingly, said lock nuts to the lower plate and the brace of said pillar means tightly, besides, the thrust collar of said screwed ring is spaced a short distance D out of lock nut, and for normal position, to be set the heads of said screw stops at a short distance D to said force-output element, said lock nuts tightly to the lower plate and the brace of said pillar means, respectively, besides, the thrust collar of said screwed rings is set tightly to each of said lock nuts, and said short distance D is approximately equal to the maximal allowed deformation of the force-input element of said load cell, each of said screw stops, screwed rings, and lock nuts is sufficient to preserve said fully assembled weighing scale module from damage;

second overload-preserving means for protection against damage by any abnormal forces applied to said first and second force-transmitting means comprising a plurality of aid beams and abutment stops so arranged that for transportation position to form a whole rigid structure with said pillar means, leaf springs means, and load-receiving structure and for normal position to recover flexibility of said leaf springs means;

whereby said weighing scale module alleviates the problems of ingredient sticking and the late ingredient in flight, is self-sufficient to divert excessively large forces away from the load cell, the connection member, and the leaf springs means at transportation and exploitation, to afford an adjustment, a test, and the metrological verification prior to assembly with the other weighing machine components, and to be easy attached to or detached from said weighing machine support frame.

21. The combinatorial weighing apparatus according to claim 19, wherein said main ingredient feeder means directly being detachably connected to a corresponding storage hopper or bin and through pluralities of cutoff means to said weighing scale modules, comprising:

(a) for the rectangular of two rows arrangement of said weighing scale modules in said weighing machine (a)1. a rectangular bowl being reciprocated comprising a gable-shaped bottom, said gable-shaped bottom having a plurality of hollows and convexities forming together a wave-shaped surface, a number of said hollows is equal to a number of said weighing scale modules being associated;

a partition fixed along an edge of a gable parallel to the flank sides of said rectangular bowl;

a plurality of convex dividers, said convex dividers are disposed over said hollows on the flank sides of said rectangular bowl and partially overlapped said hollows;

a plurality of main discharges and at least one auxiliary discharge, each of said main discharges is disposed on the flank side of said rectangular bowl under said convex divider approximately near the vertical axis of the weighing hopper of said weighing scale module, respectively;

a plurality of nozzles, each of said nozzles surrounds said main discharge and being attached to the opening of said auxiliary cutoff means for feeding said main ingredient through said cutoff means directly to said weighing scale module, respectively;

an auxiliary nozzle surrounding said auxiliary discharge, said auxiliary nozzle being attached to the opening of said auxiliary cutoff means, respectively, for feeding said main ingredient for said correctional weighing steps; and a rigid flange portion, welded to said partitions and said gable-shape bottom, said flange portion is enabled directly to transfer motional force to said rectangular bowl; and (a)2. a vibratory drive, having two unbalancing vibratory motors of a relatively large and a relatively small centrifugal force, respectively;

a motor plate attached to the unbalancing vibratory motor of said relatively large centrifugal force;

a flange unit attached to the unbalancing vibratory motor of said relatively small centrifugal force and rigidly fixed to the flange portion of said rectangular bowl to support said vibratory drive;

a pair of leaf springs rigidly fixed at their ends to said motor plate and to said flange unit, respectively; and shock absorber means mounted on said flange unit to except the overflexion of said leaf springs, when said vibratory drive is turned off, said unbalansing vibratory motors are disposed so that their rotational axes are on the vertical symmetry plane of said rectangular bowl, and said leaf springs are disposed symmetrically to said rotational axes; or (b) for a circular arrangement of weighing scale modules in weighing machine, (b)1. a circular bowl being circular reciprocated comprising a tore-shaped bottom;

a convex cap welded to the inner edge of said tore-shaped bottom;

a plurality of convex dividers, said convex dividers are disposed on the lower part of said convex cap radially and consolingly relatively to the edge of said convex cap;

a plurality of main discharges and at least one auxiliary discharge, each of said main discharges and said auxiliary discharge are disposed peripherally at the lower part of said tore-shaped bottom under said convex divider, each of said main discharges is positioned approximately near the vertical axis of the weighing hopper of said weighing scale module, respectively;

a plurality of nozzles, each of said nozzles surrounds said main discharge and being attached to the opening of said auxiliary cutoff means for feeding said main ingredient through said auxiliary cutoff means directly to said weighing scale module, respectively;

an auxiliary nozzle surrounding said auxiliary discharge, said auxiliary nozzle being attached to the opening of said auxiliary cutoff means for feeding said main ingredient for said correctional weighing steps; and a rigid flange element welded to said tore-shaped bottom, said flange element is enabled directly to transfer motional force to said circular bowl; and (b)2. a vibratory drive having two unbalancing vibratory motors of a relatively large and a relatively small centrifugal force, respectively, said unbalancing vibratory motors being attached to said flange element are so disposed that their rotational axes are on vertical symmetry planes parallel the vertical symmetry plane of said circular bowl;

whereby said main ingredient feeder means advantageously is enabled to feed said plurality of weighing scale modules, directly connected with the storage hopper and all the weighing scale modules of said weighing machine substantially to simplify weighing system and to enlarge a discharge of the storage hopper thus to avoid the bridge problem inside the storage hopper and to increase the volume capacity or to decrease a height of the storage hopper, and provided said advantageous vibratory drive to increase the throughput capacity of said main ingredient feeder, thus to decrease energy and cost problems, and to decrease said throughput capacity for feeding the combinatorial and/or correctional partial batch into said associated weighing scale modules.

22. The counting and combinatorial weighing apparatus according to claim 21(*a*), wherein said main ingredient feeder means is executed as main ingredient two-tier feeder means, wherein:

(a) said rectangular bowl executed as a two-tier rectangular bowl additionally comprising a plurality of upper hollows disposed over a lower row of said hollows and partially overlapped the lower row of said hollows, respectively; and a plurality of upper discharges disposed over a lower row of said main discharges on said flank sides under said convex dividers, respectively; and (b) the motor plate of said vibratory drive is so executed that natural frequency of oscillations of said motor plate is approximately near to the frequency of forced oscillations of mass of said unbalancing vibratory motor on said motor plate;

whereby said main ingredient two-tier feeder means advantageously is enabled to increase the throughput for said main ingredient having relatively lower volumetric density or lower movement velocity in said rectangular bowl.

23. The counting and combinatorial weighing apparatus according to claim 19, further comprising (a) at least one complementary correctional feeder means of the relatively substantially small throughput capacity for feeding the correctional partial batch of said main ingredient into said associated weighing scale module and (b) said additional auxiliary cutoff means for transferring the flowing stream of said main ingredient from said main ingredient feeder means to said complementary correctional feeder means connected to the tube means of said auxiliary cutoff means and to the corresponding inlet piece of said cutoff means;

whereby the correctional partial batch of said main ingredient, upon said correctional weighing step, advantageously is obtained.

\* \* \* \* \*

UNITED STATES PATENT AND TRADEMARK OFFICE
CERTIFICATE OF CORRECTION

PATENT NO. : 6,268,571 B1
DATED : July 31, 2001
INVENTOR(S) : Benyukhis, David

It is certified that error appears in the above-identified patent and that said Letters Patent is hereby corrected as shown below:

Column 5,
Line 56, delete "2" and substitute -- 2 are --.

Column 6,
Line 16, delete "9 is." and substitute -- 9 is --.

Column 9,
Line 10, delete "Numerals 2," and substitute -- Numerals 2, 2 ... --.
Line 15, after "2f" insert -- . --.
Line 37, after "2f" insert -- . --.

Column 10,
Line 30, delete "$W_{aa}$." and substitute -- $W_{aa}$ --.

Column 11,
Line 16, delete "$W_{aa},W_{ba},W_{aa}$" and substitute -- $W_{aa},W_{ba},W_{ca}$--.
Line 35, delete "$W_{aa}$." and substitute -- $W_{aa}$ --.
Line 42, delete "$W_{aa},W_{ba}$," and substitute -- $W_{aa'}$, $W_{ba'}$, --.
Line 61, delete "$W_{aa}$, $W_{ba}$, and $W_{ca}$," and substitute -- $W_{aa'}$, $W_{ba'}$, and $W_{ca'}$ --.

Column 14,
Line 10, delete "coupled" and substitute -- are coupled --.

Column 18,
Line 62, delete "comprise" and substitute -- comprises --.

Column 19,
Line 16, delete "module are" and substitute -- module is --.

Column 20,
Line 31, delete "discharges" and substitute -- discharge --.
Line 59, delete "1, 2,3" and substitute -- 1, 2, 3 --.

Column 21,
Line 5, delete "process" and substitute -- processes --.

Column 23,
Line 51, after "ingredient" insert -- . --.

Column 25,
Line 22, delete "$\Delta$is" and substitute -- $\Delta$ is --.

UNITED STATES PATENT AND TRADEMARK OFFICE
CERTIFICATE OF CORRECTION

PATENT NO. : 6,268,571 B1
DATED : July 31, 2001
INVENTOR(S) : Benyukhis, David

It is certified that error appears in the above-identified patent and that said Letters Patent is hereby corrected as shown below:

Column 27,
Line 5, after " weight " insert -- , --.

Column 34,
Line 18, delete "said different" and substitute -- said --.
Line 27, delete "incorporated" and substitute -- different incorporated --.
Line 28, delete "feed the" and substitute -- feed the associated --.
Line 32, delete "and" and substitute -- and incorporated ingredient --.
Line 33, delete "incorporated ingredient".

Column 35,
Line 64, delete "strip" and substitute -- step --.
Line 66, delete "claims 1" and substitute -- claim 1 --.

Column 37,
Line 46, delete "claims 1" and substitute -- claim 1 --.
Line 53, delete "claims 1" and substitute -- claim 1 --.
Line 54, delete "(I)" and substitute -- (1) --.

Column 39,
Line 48, delete "0)" and substitute (j) --.

Column 40,
Line 24, delete "claims 7" and substitute -- claim7 --.

Column 41,
Line 8, delete "1/kn)" and substitute -- 1/(kn) --.
Line 28, delete "$k_1 \leq 2$" and substitute -- $k_1 \geq 2$ --.
Lines 54-64, position all text of these lines two characters right.

Column 42,
Line 14, delete "claims 7" and substitute -- claim 7 --.
Line 21, delete "claims 7" and substitute -- claim 7 --.
Line 56, position all text of this line two characters right.
Line 62, delete "for a" and substitute -- for --.

Column 44,
Line 61, delete "claims 13" and substitute -- claim 13 --.

UNITED STATES PATENT AND TRADEMARK OFFICE
CERTIFICATE OF CORRECTION

PATENT NO. : 6,268,571 B1
DATED : July 31, 2001
INVENTOR(S) : Benyukhis, David

It is certified that error appears in the above-identified patent and that said Letters Patent is hereby corrected as shown below:

<u>Column 45,</u>
Line 58, delete "$k_{1 \leq k \text{ and}}$" substitute -- $k_1 \leq k$ and --.

<u>Column 46,</u>
Line 12, delete "incorporated" and substitute -- incorporated ingredients --.
Line 36, delete "claims 13" and substitute -- claim 13 --.
Line 38, delete "equals" and substitute -- equal --.
Line 43, delete "claims 13" and substitute -- claim 13 --.

<u>Column 47,</u>
Lines 42-52, position all text of these lines two characters right.
Line 54, delete "stream" and substitute -- streams --.

<u>Column 49,</u>
Line 46, delete "module" and substitute -- module to or --.

<u>Column 50,</u>
Lines 12-20, position all text of these lines two characters right.

<u>Column 53,</u>
Line 7, delete "and/or" and substitute -- partial batch and /or --.
Line 13, delete "bowl" and substitute -- bowl is --.

Signed and Sealed this

Thirteenth Day of August, 2002

*Attest:*

JAMES E. ROGAN
*Attesting Officer*     *Director of the United States Patent and Trademark Office*